United States Patent [19]

Altmanshofer et al.

[11] Patent Number: 5,442,406

[45] Date of Patent: Aug. 15, 1995

[54] WIDE SCREEN TELEVISION

[75] Inventors: Robert D. Altmanshofer, Carmel; Enrique Rodriguez-Cavazos; Donald H. Willis, both of Indianapolis; Nathaniel H. Ersoz, Brownsburg; Barth A. Canfield, Indianapolis, all of Ind.

[73] Assignee: Thomson Consumer Electronics, Inc., Indianapolis, Ind.

[21] Appl. No.: 941,435

[22] PCT Filed: May 29, 1991

[86] PCT No.: PCT/US91/03740

§ 371 Date: Oct. 28, 1992

§ 102(e) Date: Oct. 28, 1992

[30] Foreign Application Priority Data

Jun. 1, 1990 [GB] United Kingdom ............... 9012326

[51] Int. Cl.⁶ .............................................. H04N 9/74
[52] U.S. Cl. .................................... 348/588; 348/565; 348/445; 348/913
[58] Field of Search ............. 358/140, 11, 22, 22 PIP, 358/183, 180; H04N 4/74, 5/445, 5/48, 5/44; 348/445, 588, 565, 564, 913

[56] References Cited

U.S. PATENT DOCUMENTS

| 4,385,324 | 5/1983 | Shioda et al. | 358/237 |
|---|---|---|---|
| 4,399,462 | 8/1983 | Balopole et al. | 358/183 |
| 4,556,906 | 12/1985 | Dischert et al. | 358/180 |
| 4,729,012 | 3/1988 | Jose et al. | 358/11 |
| 4,878,117 | 10/1989 | Ikehira et al. | 358/183 |
| 4,958,229 | 9/1990 | Guillon et al. | 358/180 |
| 4,991,012 | 2/1991 | Yoshino | 358/183 |
| 5,136,398 | 8/1992 | Rodriguez-Cavazos et al. | 358/242 |

FOREIGN PATENT DOCUMENTS

| 0162501 | 11/1985 | European Pat. Off. | H04N 5/262 |
|---|---|---|---|
| 0339675 | 2/1989 | European Pat. Off. | |
| 0357144 | 3/1990 | European Pat. Off. | H04N 5/44 |
| 57-208772 | 12/1982 | Japan | H04N 5/44 |
| 63-26174 | 2/1988 | Japan | H04N 5/46 |
| 62-263781 | 5/1988 | Japan | H04N 5/46 |
| 63-146672 | 6/1988 | Japan | |
| 63-185173 | 7/1988 | Japan | H04N 5/46 |
| 63-193779 | 8/1988 | Japan | H04N 5/46 |
| 63-146671 | 10/1988 | Japan | H04N 5/45 |
| 89/00369 | 1/1989 | WIPO | H04N 5/43 |

*Primary Examiner*—Victor R. Kostak
*Assistant Examiner*—Nathan J. Flynn
*Attorney, Agent, or Firm*—Joseph S. Tripoli; Joseph J. Laks; Harvey D. Fried

[57] ABSTRACT

A video display has a first format display ratio. A mapping circuit maps an adjustable picture display are on the video display. A signal processor generates first and second video signals from input video signals having one of different format display ratios. A switching circuit selectively couples video signal sources as the input video signals. The signal processor can manipulate data from the input video signals by selective interpolation and cropping. A synchronizing circuit synchronizes the first and second signal processors with the mapping circuit. A selecting circuit selects as an output video signal between one of the first and second processed video signals and a combination of the first and second processed video signals. A control circuit controls the mapping circuit, the first and second signal processors and the selecting circuit to adjust in format display ratio and image aspect ratio each picture represented in the output video signal. One of the different format display ratios of the input video signals can be the same as the first format display ratio of the video display. The mapping circuit can comprise a raster generating circuit for a cathode ray tube or an address matrix generator for a liquid crystal display.

21 Claims, 53 Drawing Sheets

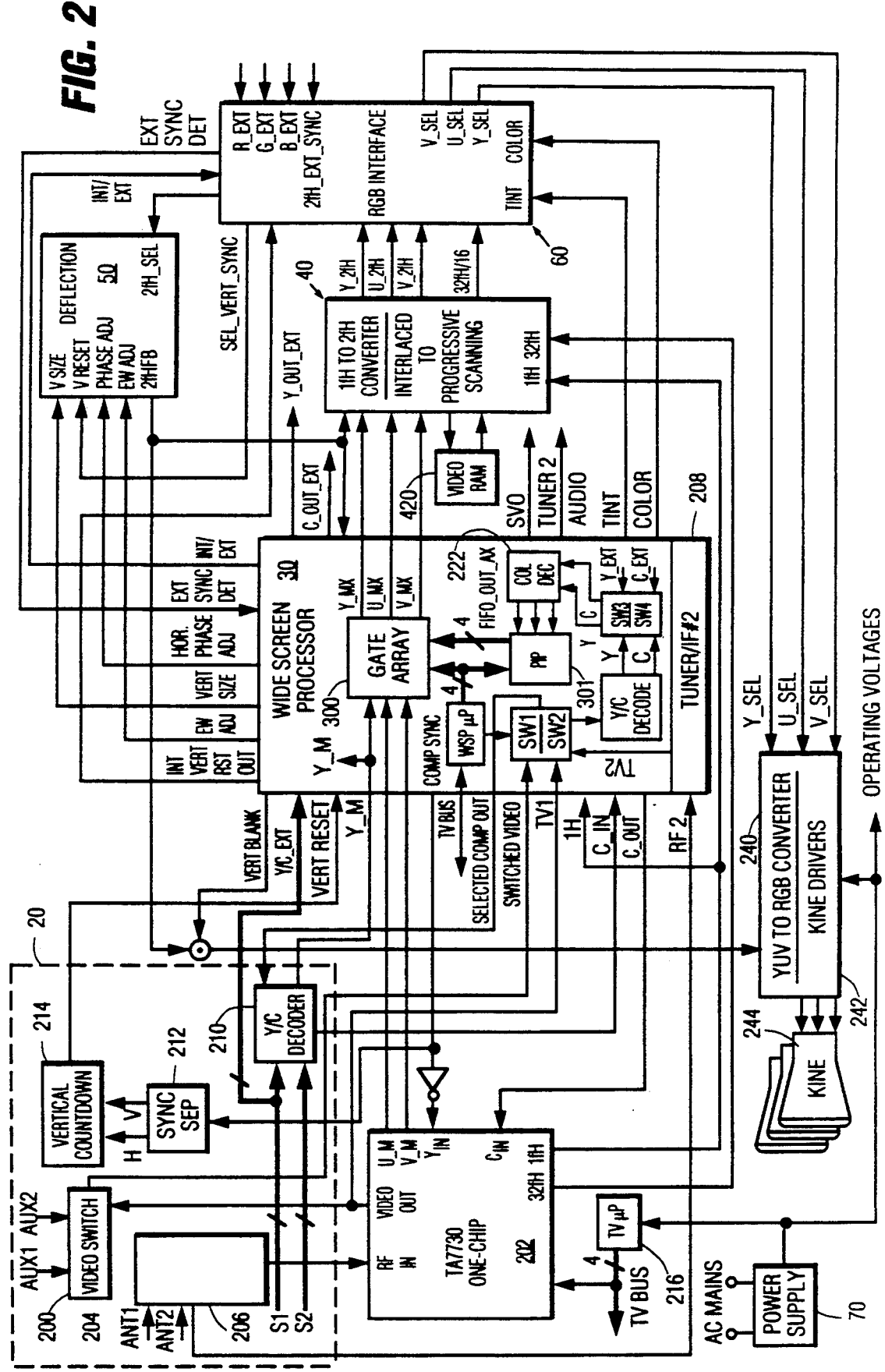

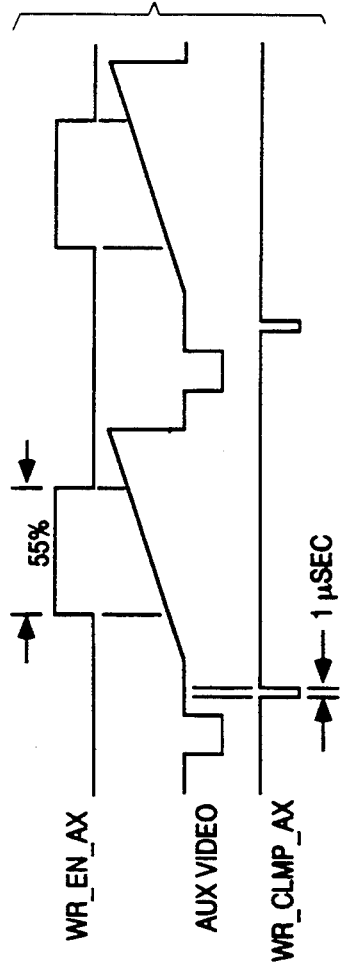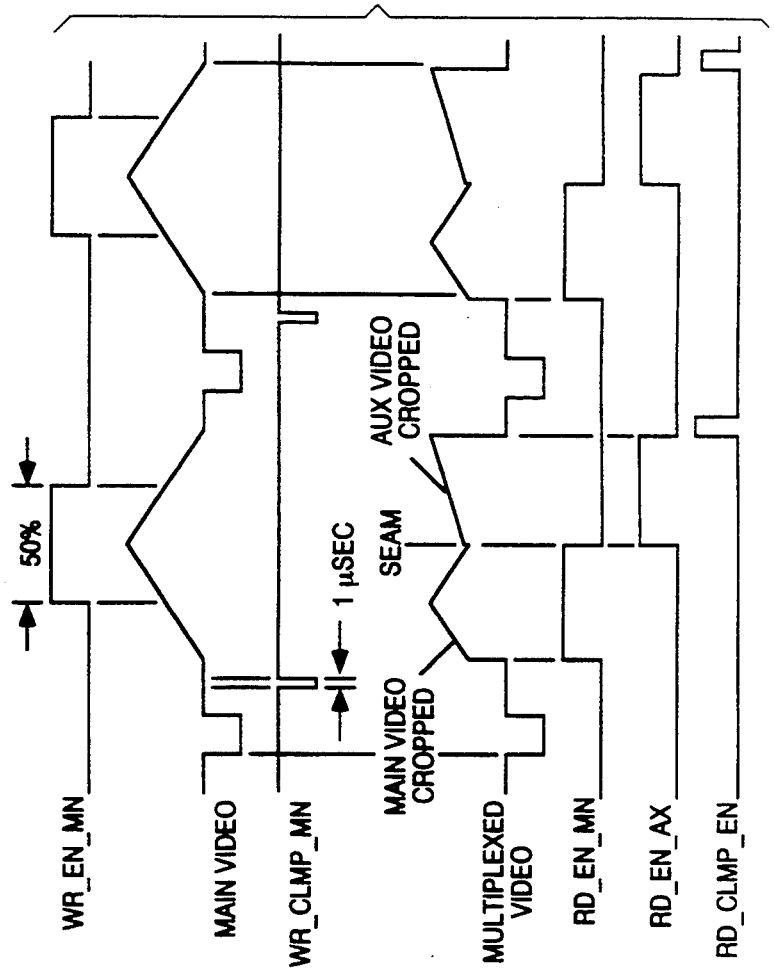

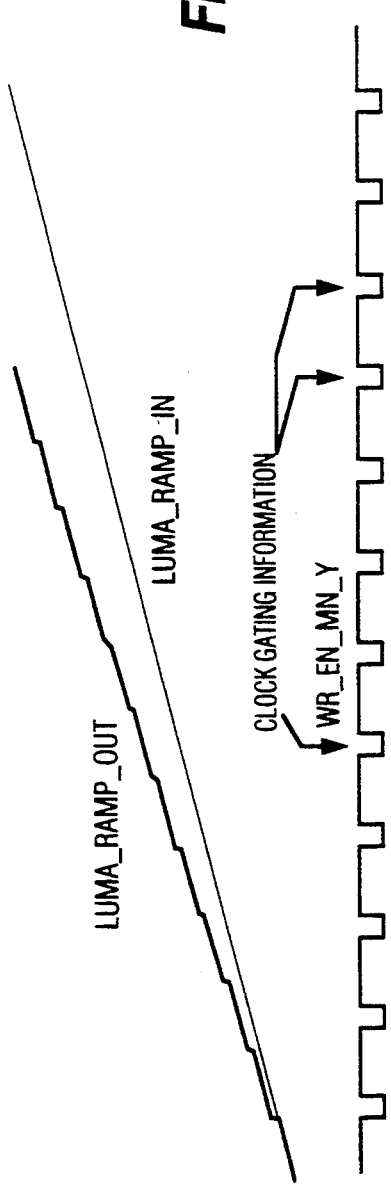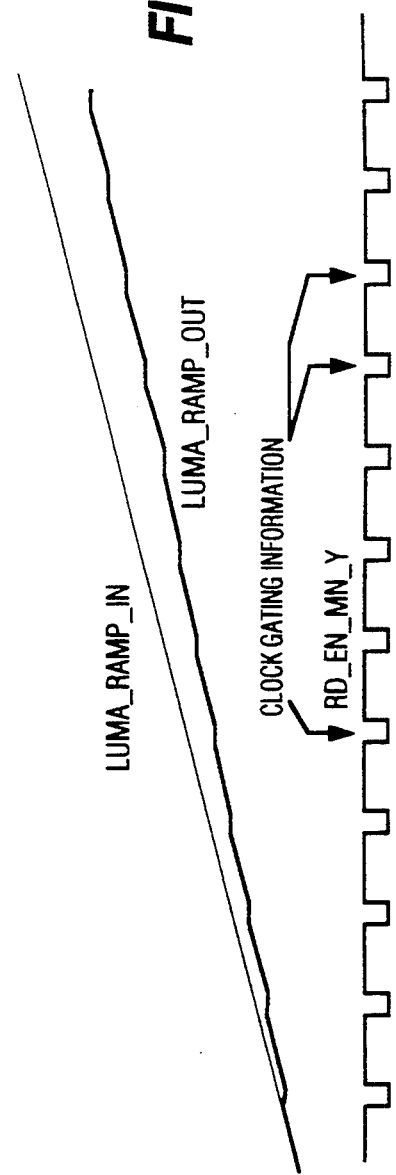

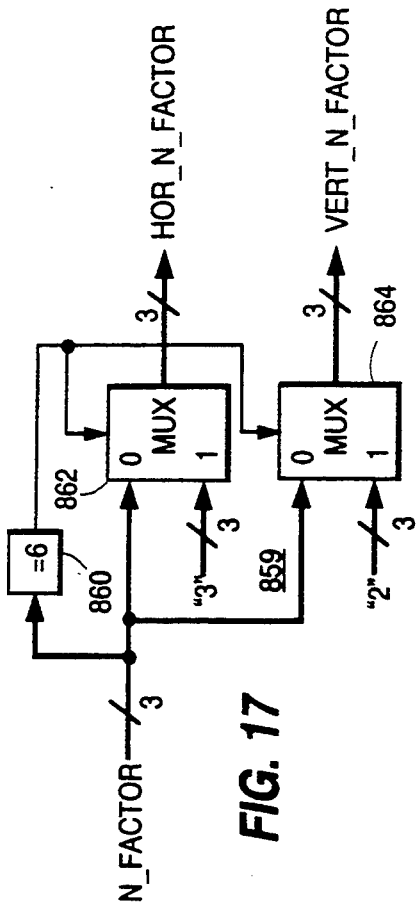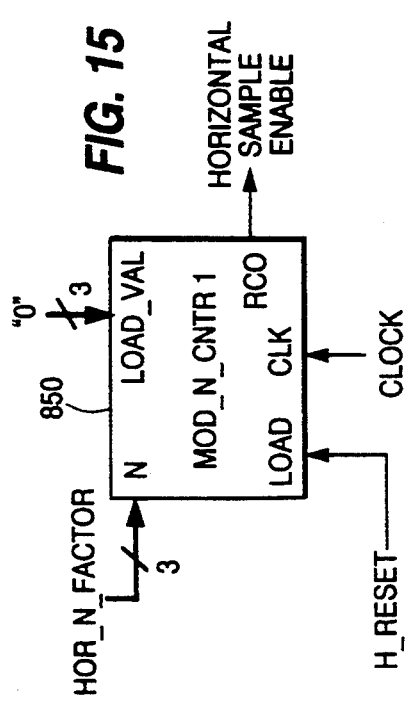

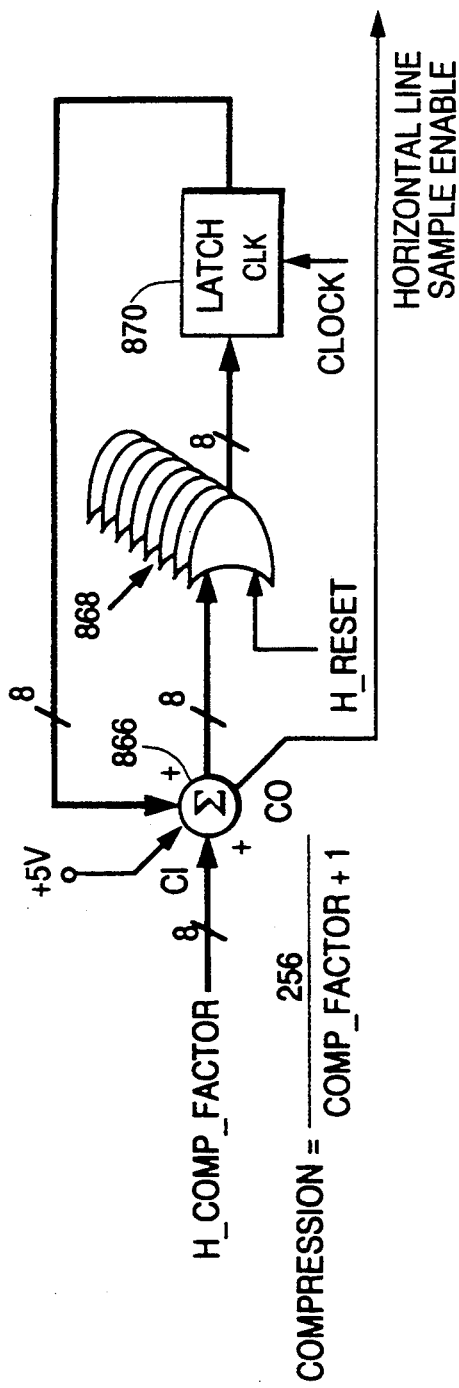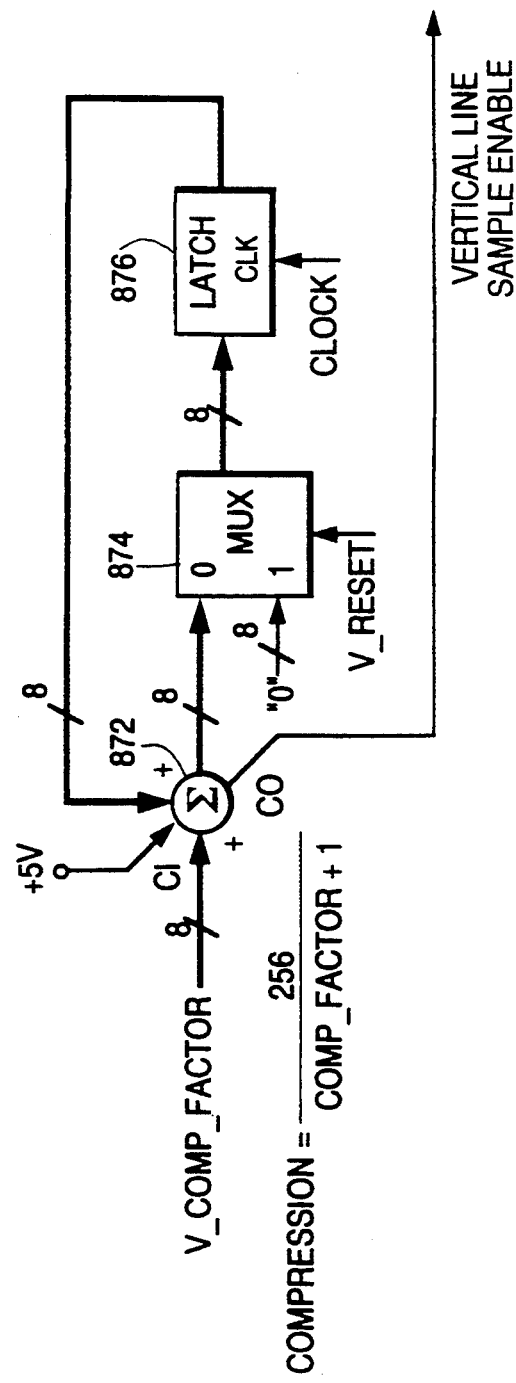

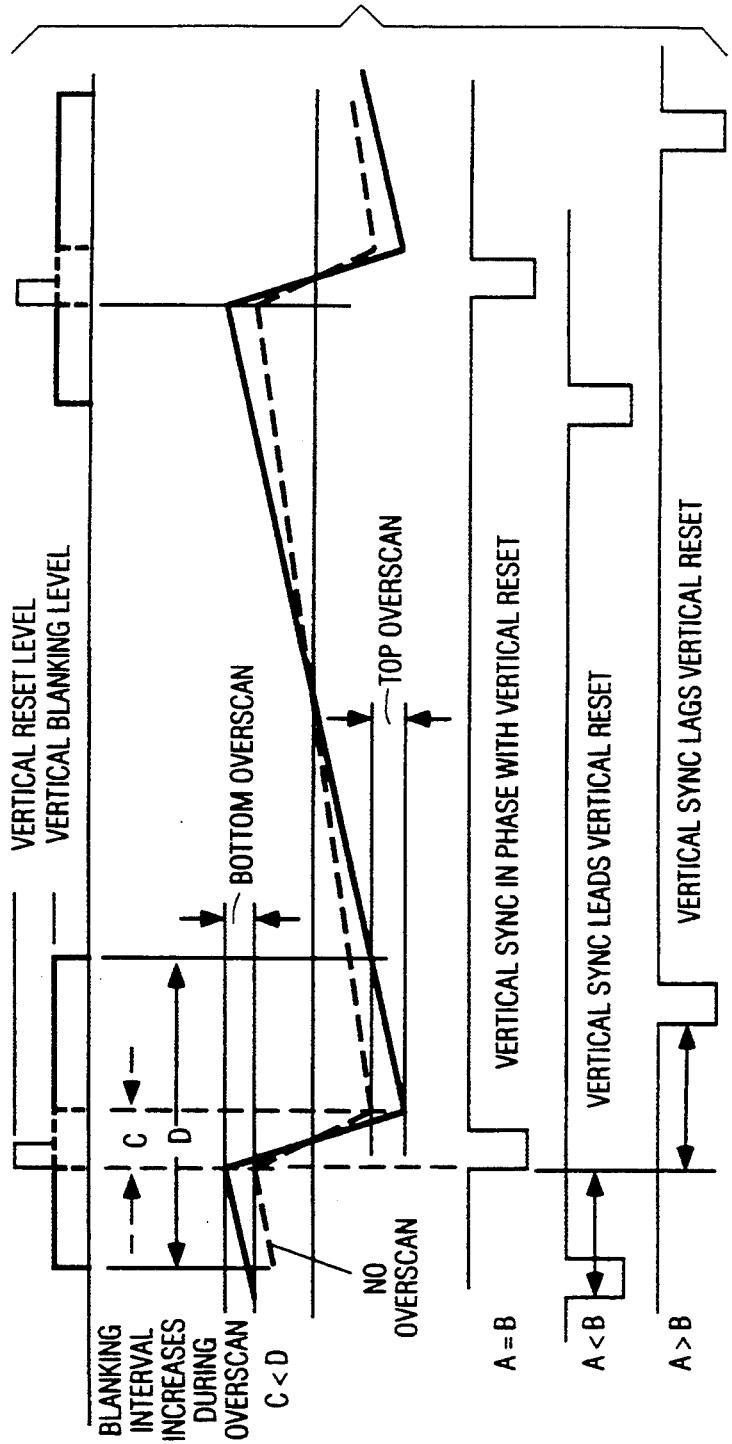
FIG. 23
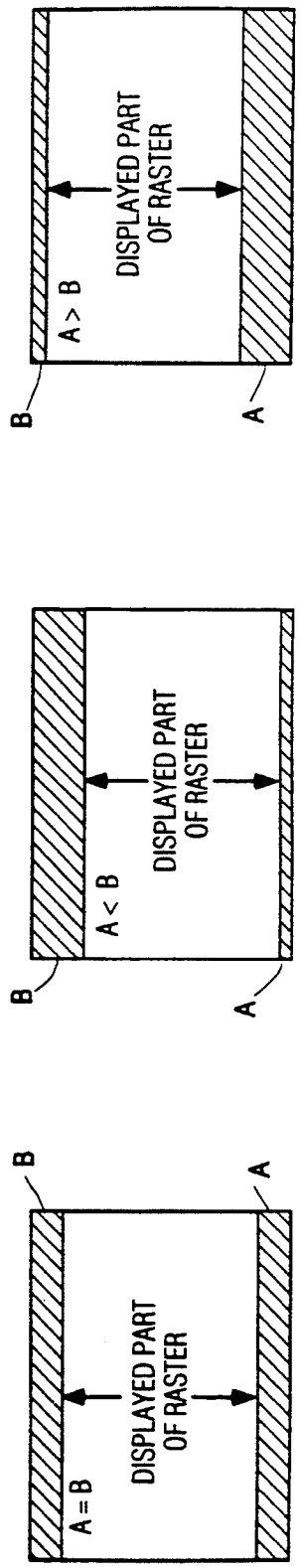
FIG. 24 (c)
FIG. 24 (b)
FIG. 24 (a)

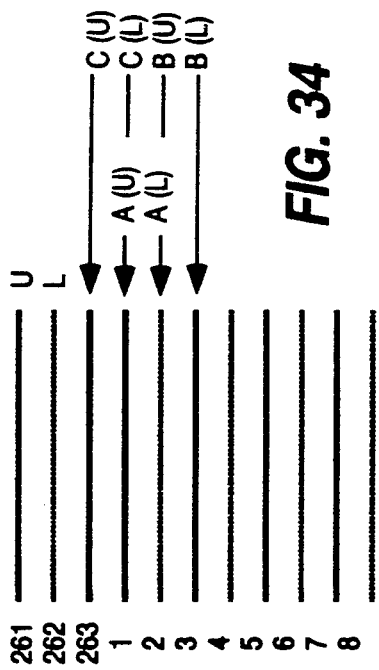
FIG. 33
| MODE | DECISION EDGE POSITION |
|---|---|
| A | 2 ≤ POS < 1 |
| B | 3 ≤ POS < 2 |
| C | 1 ≤ POS < 263 |
FIG. 34
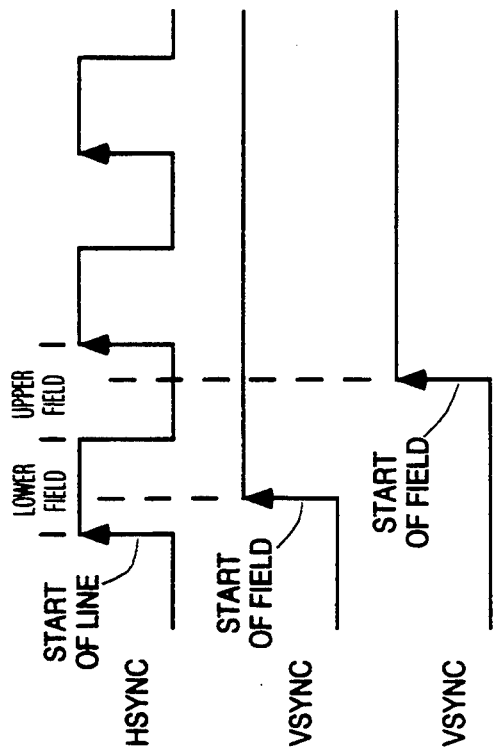
FIG. 35(a)
FIG. 35(b)
FIG. 35(c)

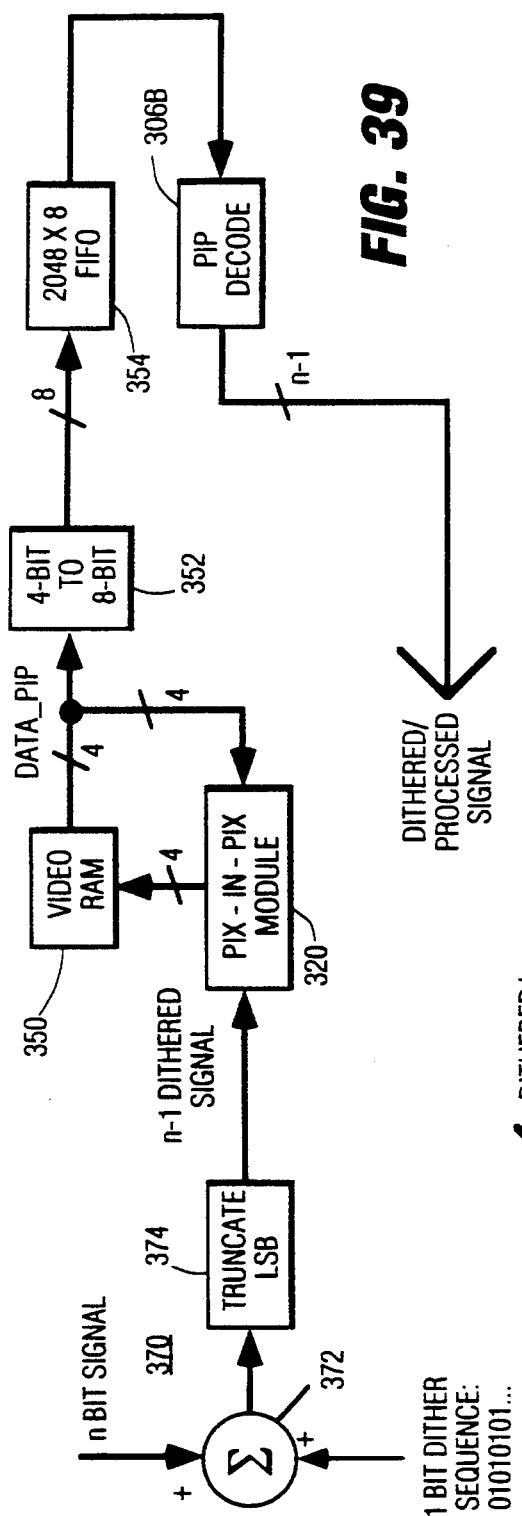
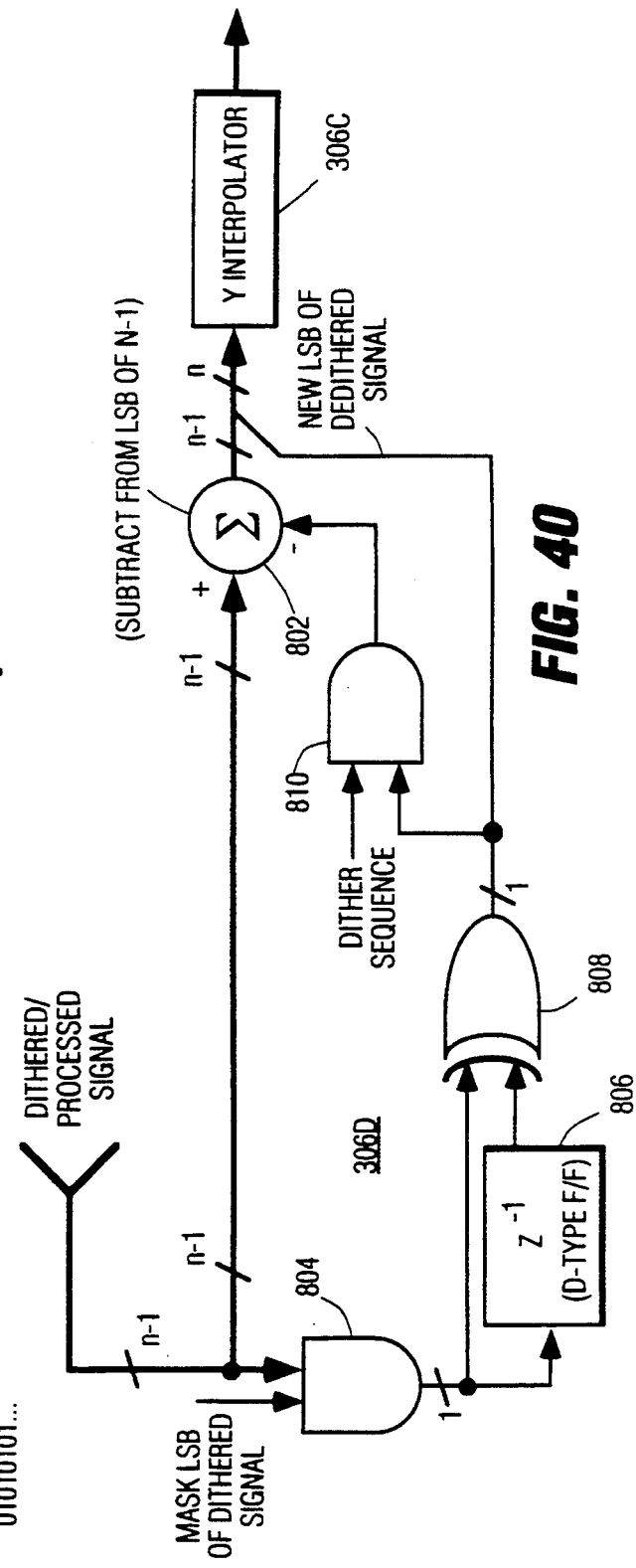
FIG. 39
FIG. 40

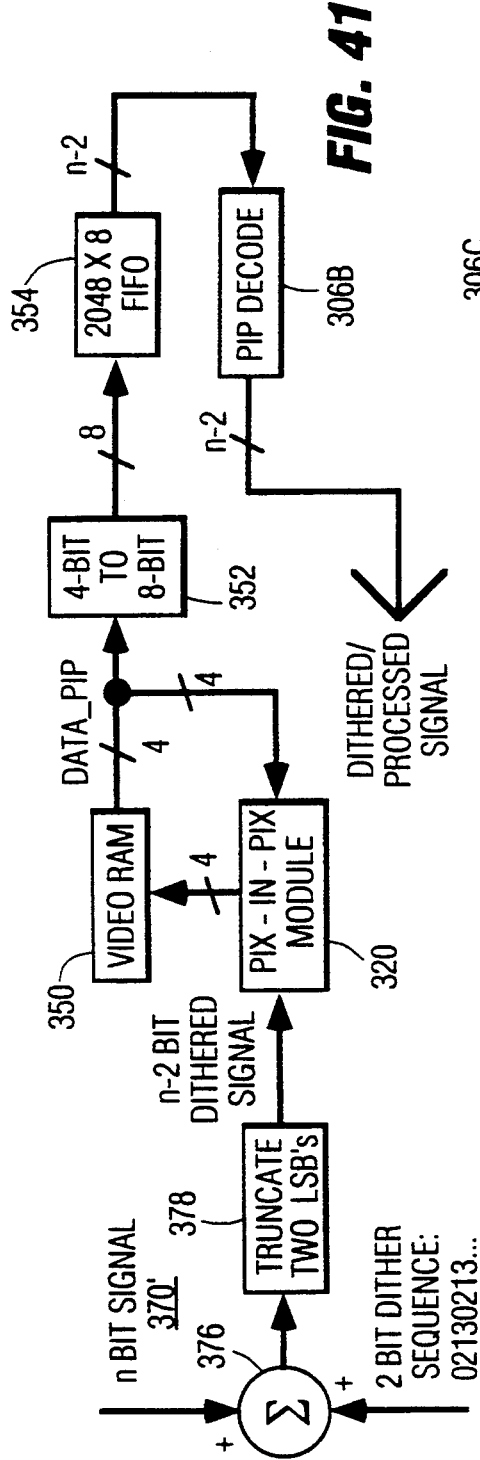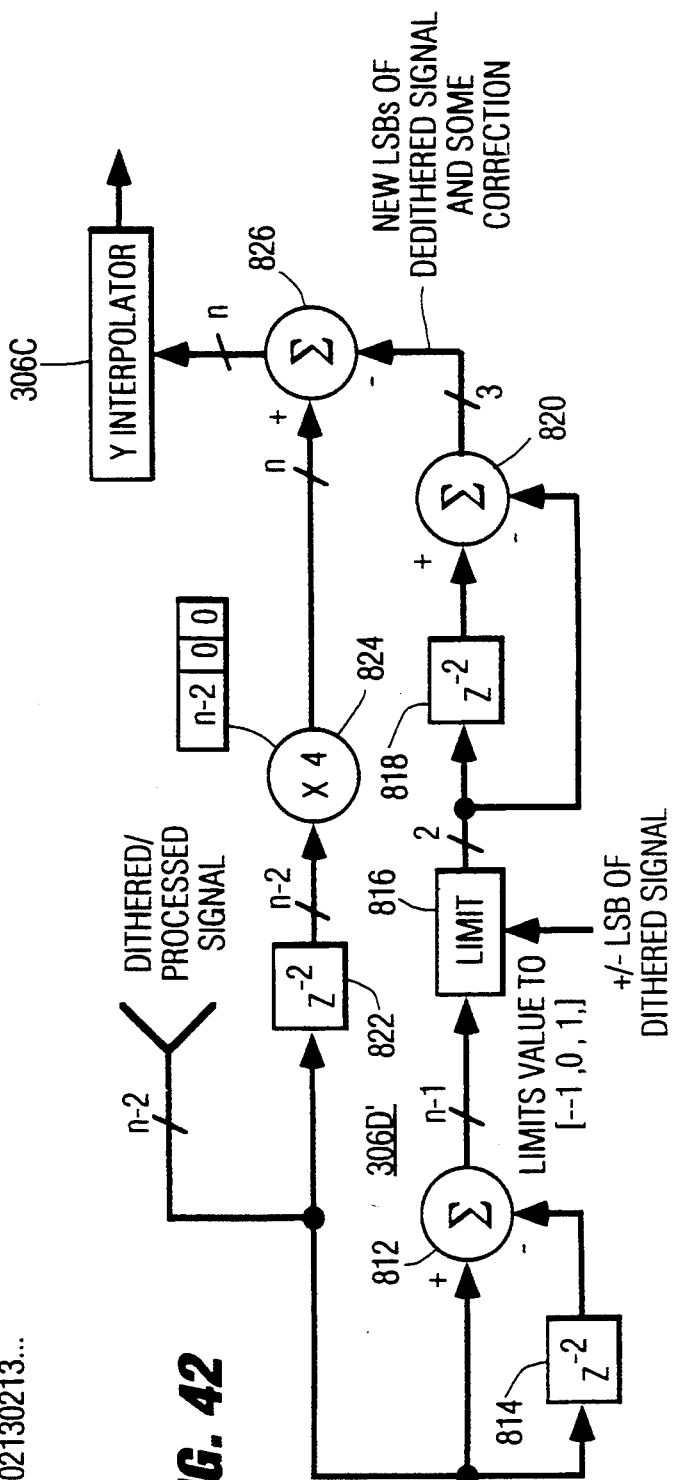

| FIELD | LINE | 1-BIT DITHER 1 PIXEL SKEW | 2-BIT DITHER 1 PIXEL SKEW | 2-BIT DITHER 2 PIXEL SKEW |
|---|---|---|---|---|
| 1 | 1 | 0 1 0 1 0 1 0 1 . . . | 0 2 1 3 0 2 1 3 . . . | 0 2 1 3 0 2 1 3 . . . |
| 2 | 264 | 1 0 1 0 1 0 1 0 . . . | 3 0 2 1 3 0 2 1 . . . | 1 3 0 2 1 3 0 2 . . . |
| 1 | 2 | 0 1 0 1 0 1 0 1 . . . | 0 2 1 3 0 2 1 3 . . . | 0 2 1 3 0 2 1 3 . . . |
| 2 | 265 | 1 0 1 0 1 0 1 0 . . . | 3 0 2 1 3 0 2 1 . . . | 1 3 0 2 1 3 0 2 . . . |
| 1 | 3 | 0 1 0 1 0 1 0 1 . . . | 0 2 1 3 0 2 1 3 . . . | 0 2 1 3 0 2 1 3 . . . |
| 2 | 266 | 1 0 1 0 1 0 1 0 . . . | 3 0 2 1 3 0 2 1 . . . | 1 3 0 2 1 3 0 2 . . . |

*FIG. 43*

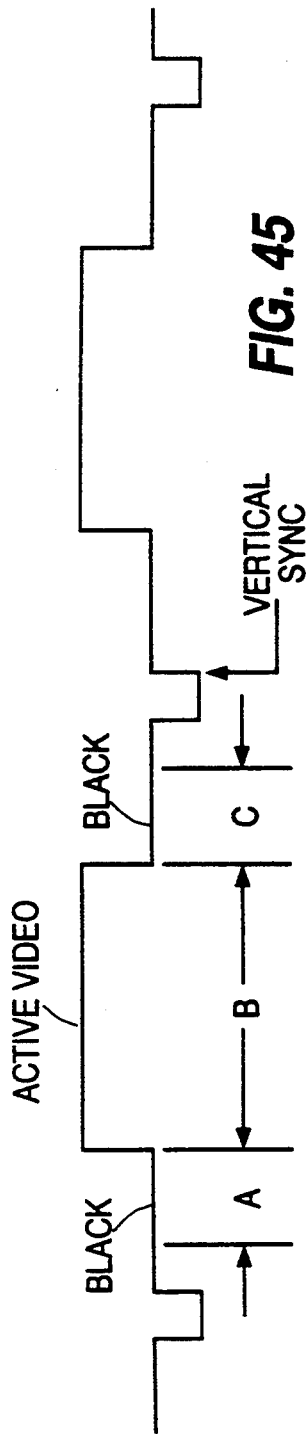
FIG. 45
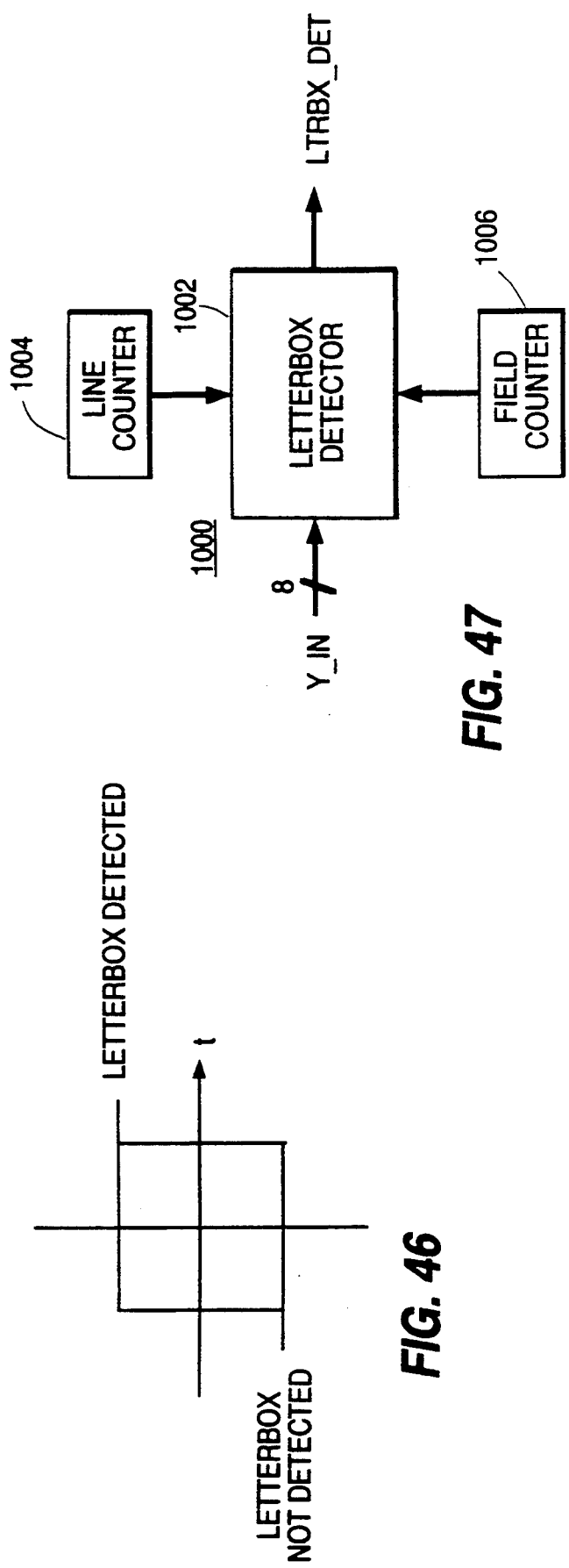
FIG. 47
FIG. 46

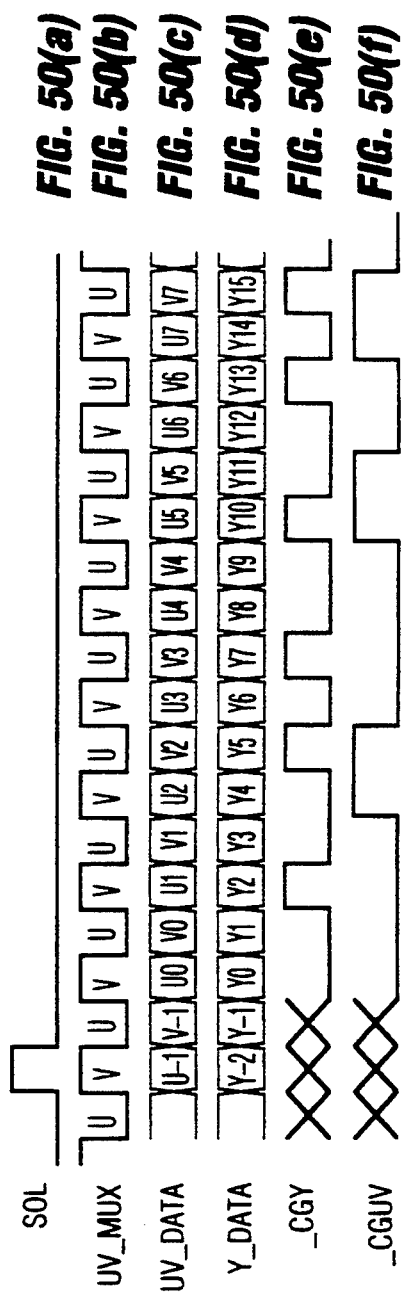

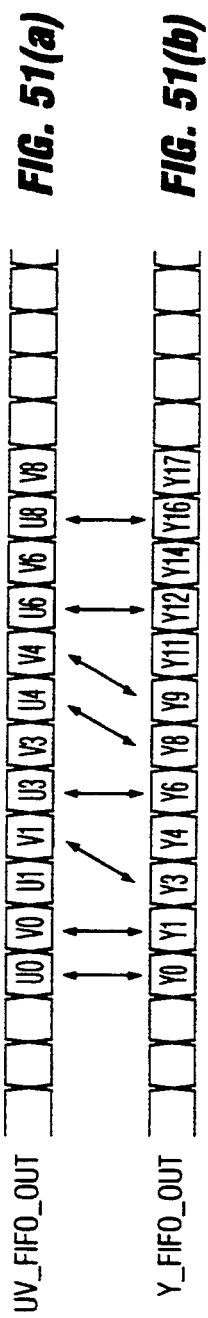

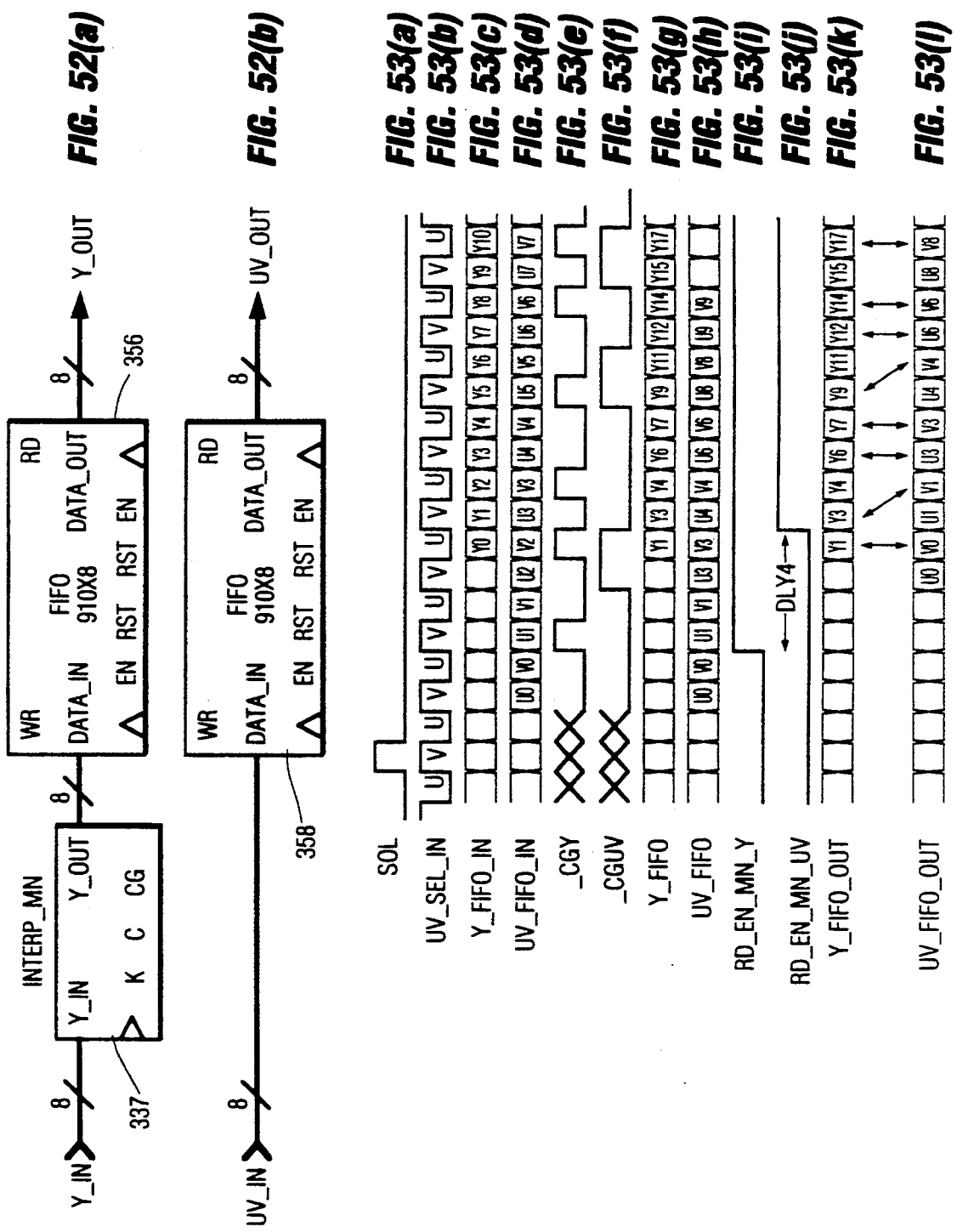

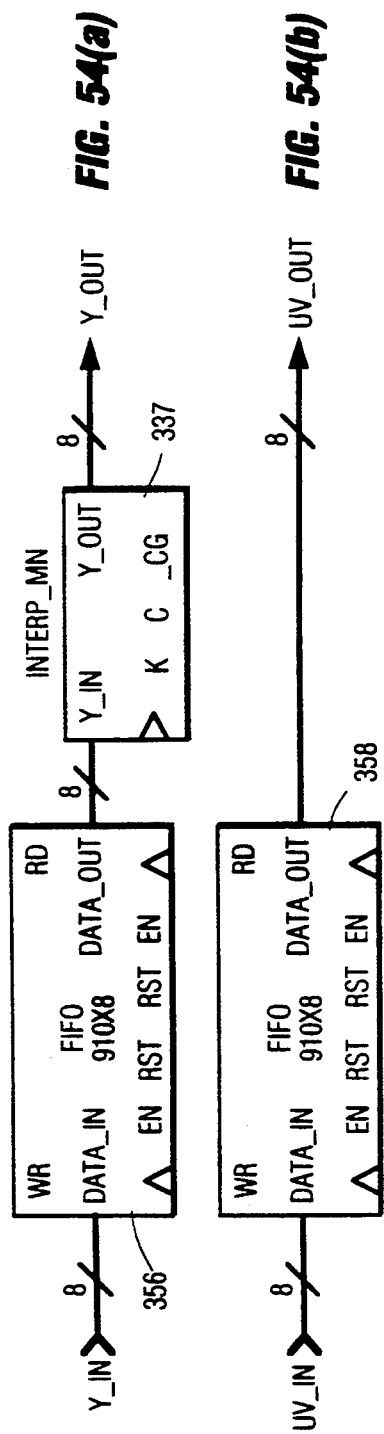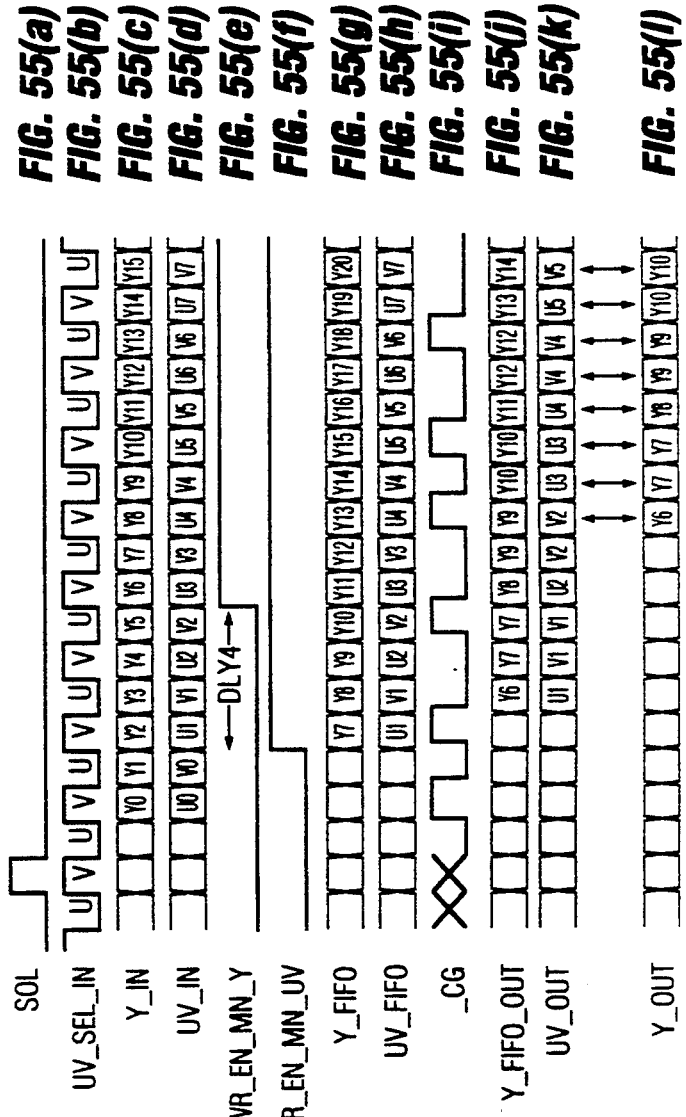

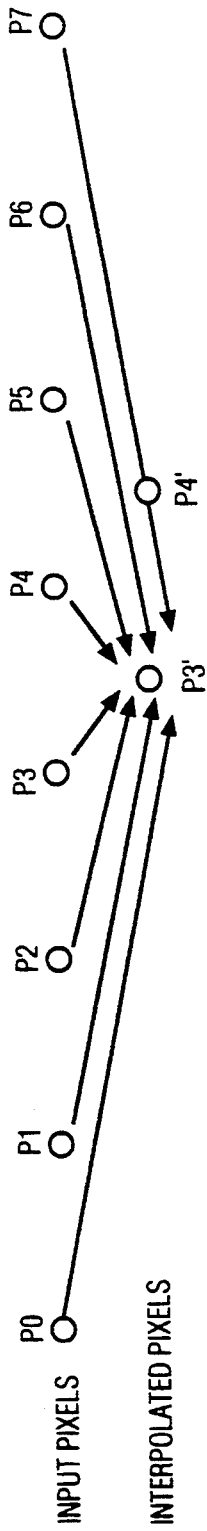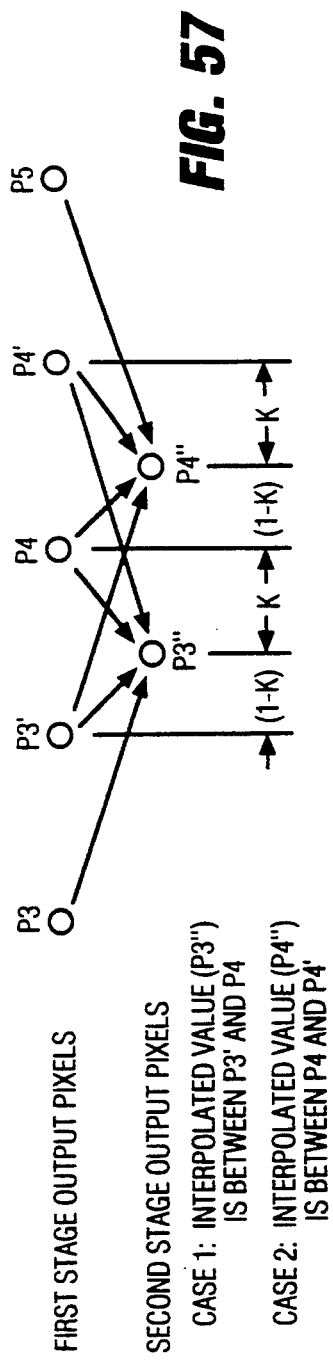

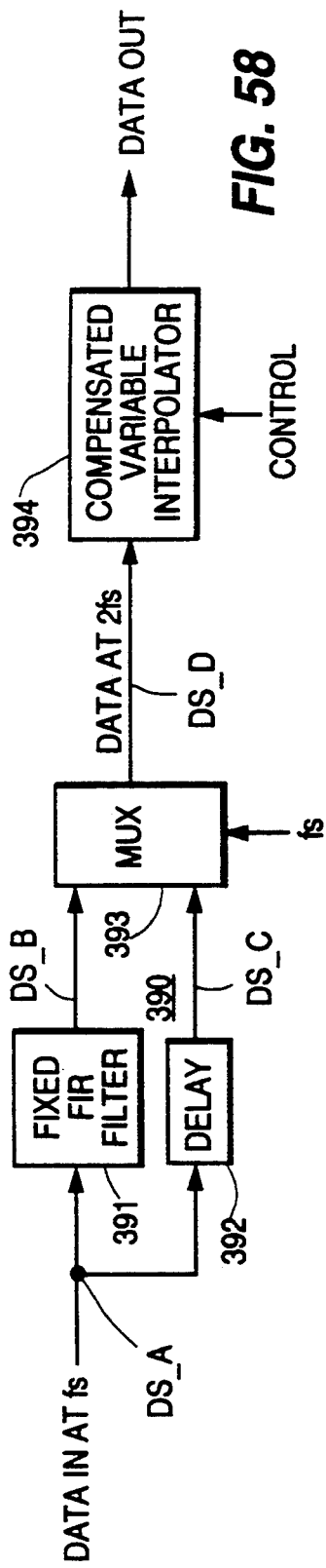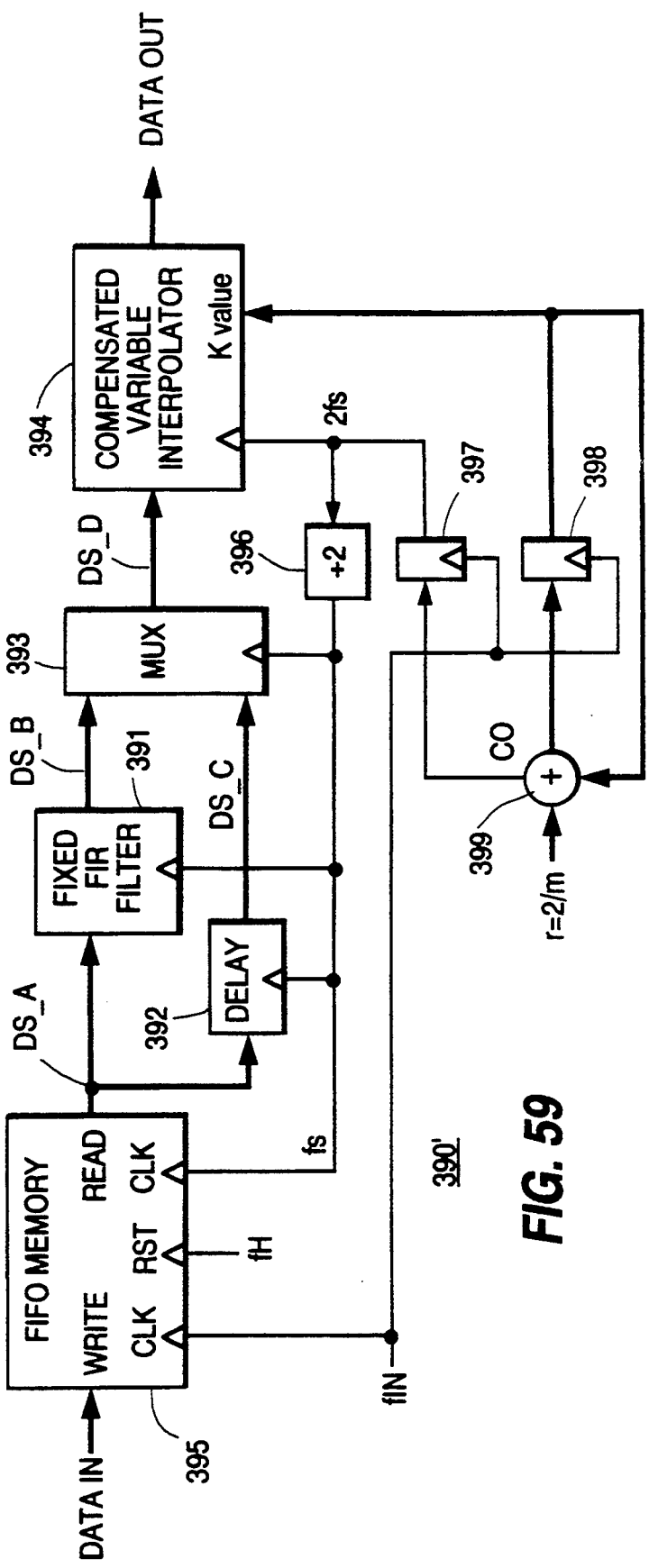
FIG. 58
FIG. 59

| K | ENCODED $K = a_4, a_3,$ $a_2, a_1, a_0$ | $C' = a_3,$ $a_2, a_1, a_0$ |
|---|---|---|
| 0 | 00000 | 0000 |
| 1 | 00001 | 0001 |
| 2 | 00010 | 0010 |
| 3 | 00011 | 0011 |
| 4 | 00100 | 0100 |
| 5 | 00101 | 0101 |
| 6 | 00110 | 0110 |
| 7 | 00111 | 0111 |
| 8 | 01000 | 1000 |
| 9 | 10111 | 0111 |
| 10 | 10110 | 0110 |
| 11 | 10101 | 0101 |
| 12 | 10100 | 0100 |
| 13 | 10011 | 0011 |
| 14 | 10010 | 0010 |
| 15 | 10001 | 0001 |
| 16 | 10000 | 0000 |

| K | $C = [(a_3 + a_2), (a_1 + a_3), (a_0 + a_3)] = b_2 b_1 b_0$ |
|---|---|
| 0, 16 | 0 |
| 1, 15 | 1 |
| 2, 14 | 2 |
| 3, 13 | 3 |
| 4, 12 | 4 |
| 5, 11 | 5 |
| 6, 10 | 6 |

NOTE FOR
K = 7, 8, 9
C = 7

FIG. 68

| K • 1/16 | C • 1/128 |
|----------|-----------|
| 0, 16    | 0         |
| 1, 15    | 2         |
| 2, 14    | 8         |
| 3, 13    | 10        |
| 4, 12    | 12        |
| 5, 11    | 12        |
| 6, 10    | 14        |
| 7, 9     | 14        |
| 8        | 14        |

WIDE SCREEN TELEVISION

The invention relates to the field of televisions, for example those televisions having a wide display format ratio screen, which must interpolate video data to implement various display formats. Most televisions today have a format display ratio, horizontal width to vertical height, of 4:3. A wide format display ratio corresponds more closely to the display format ratio of movies, for example 16:9. The invention is applicable to both direct view televisions and projection televisions.

Televisions having a format display ratio of 4.3, often referred to as 4×3, are limited in the ways that single and multiple video signal sources can be displayed. Television signal transmissions of commercial broadcasters, except for experimental material, are broadcast with a 4×3 format display ratio. Many viewers find the is 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. Such problems are solved in a wide screen television according to this invention. A wide screen television according to various inventive arrangements is capable of providing high resolution, single and multiple picture displays, from single and multiple sources having similar or different format ratios, and with selectable display format ratios.

Televisions with a wide display format ratio can be implemented in television systems displaying video signals both at basic or standard horizontal scanning rates and multiples thereof, as well as by both interlaced and noninterlaced scanning. Standard NTSC video signals, for example, are displayed by interlacing the successive fields of each video frame, each field being generated by a raster scanning operation at a basic or standard horizontal scanning rate of approximately 15,734 Hz. The basic scanning rate for video signals is variously referred to as $f_H$, 1 $f_H$, and 1H. The actual frequency of a 1$f_H$ signal will vary according to different video standards. In accordance with efforts to improve the picture quality of television apparatus, systems have been developed for is displaying video signals progressively, in a noninterlaced fashion. Progressive scanning requires that each displayed frame must be scanned in the same time period allotted for scanning one of the two fields of the interlaced format. Flicker free AA–BB displays require that each field be scanned twice, consecutively. In each case, the horizontal scanning frequency must be twice that of the standard horizontal frequency. The scanning rate for such progressively scanned or flicker free displays is variously referred to as $2f_H$ and 2H. A $2f_H$ scanning frequency according to standards in the United States, for example, is approximately 31,468 Hz.

A wide screen television according to the inventive arrangements taught herein has all of the capabilities and advantages described above. A video display has a first format display ratio, for example 16×9. A mapping circuit maps an adjustable picture display are on the video display. First and second signal processors generate first and second selectively interpolated video signals from input video signals having one of different format display ratios, for example 4×3 and 16×9. The interpolation of the input video signals can result in expansion or compression of the input video signals. The first and second signal processors can also selectively crop the input video signals. Overall, the input video signals can be selectively cropped, interpolated, both cropped and interpolated and neither cropped nor interpolated. A switching circuit selectively couples video signal sources as the input video signals. A synchronizing circuit synchronizes the first and second signal processors with the mapping circuit. A selecting circuit selects as an output video signal between one of the first and second processed video signals and a combination of the first and second processed video signals. A control circuit controls the mapping circuit, the first and second signal processors and the selecting circuit to adjust in format display ratio and image aspect ratio each picture represented in the output video signal. One of the different format display ratios of the input video signals can be the same as the first format display ratio of the video display. The mapping circuit can comprise a raster generating circuit for a cathode ray tube or an address matrix generator for a liquid crystal display. The display system may further comprise a circuit for converting interlaced video signals to a noninterlaced format, two internal tuners and a plurality of external jacks. In one inventive arrangement, the picture display area is adjustable only vertically and the first and second signal processing circuits interpolate the video signals only horizontally.

FIGS. 1(a)–1(i) are useful for explaining different display formats of a wide screen television.

FIG. 2 is a block diagram of a wide screen television in accordance with aspects of this invention and adapted for operation at $2f_H$ horizontal scanning.

FIGS. 9 and 10 are timing diagrams useful for explaining the generation of the display format shown in FIG. 1(d), using fully cropped signals.

FIG. 11(b) illustrates waveforms useful for explaining video compression in the main signal path of FIG. 11(a).

FIG. 11(c) illustrates waveforms useful for explaining video expansion in the main signal path of FIG. 11(a).

FIG. 15, FIG. 16 and FIG. 17 are block diagrams of the decimation section of the timing and control section shown in FIG. 14.

FIG. 18 is a table of values used for controlling the decimation section shown in FIGS. 10–12.

FIGS. 19(a) and 19(b) are block diagrams of fully programmable, general purpose decimation circuits for controlling horizontal and vertical compression ratios respectively.

Figure 20:
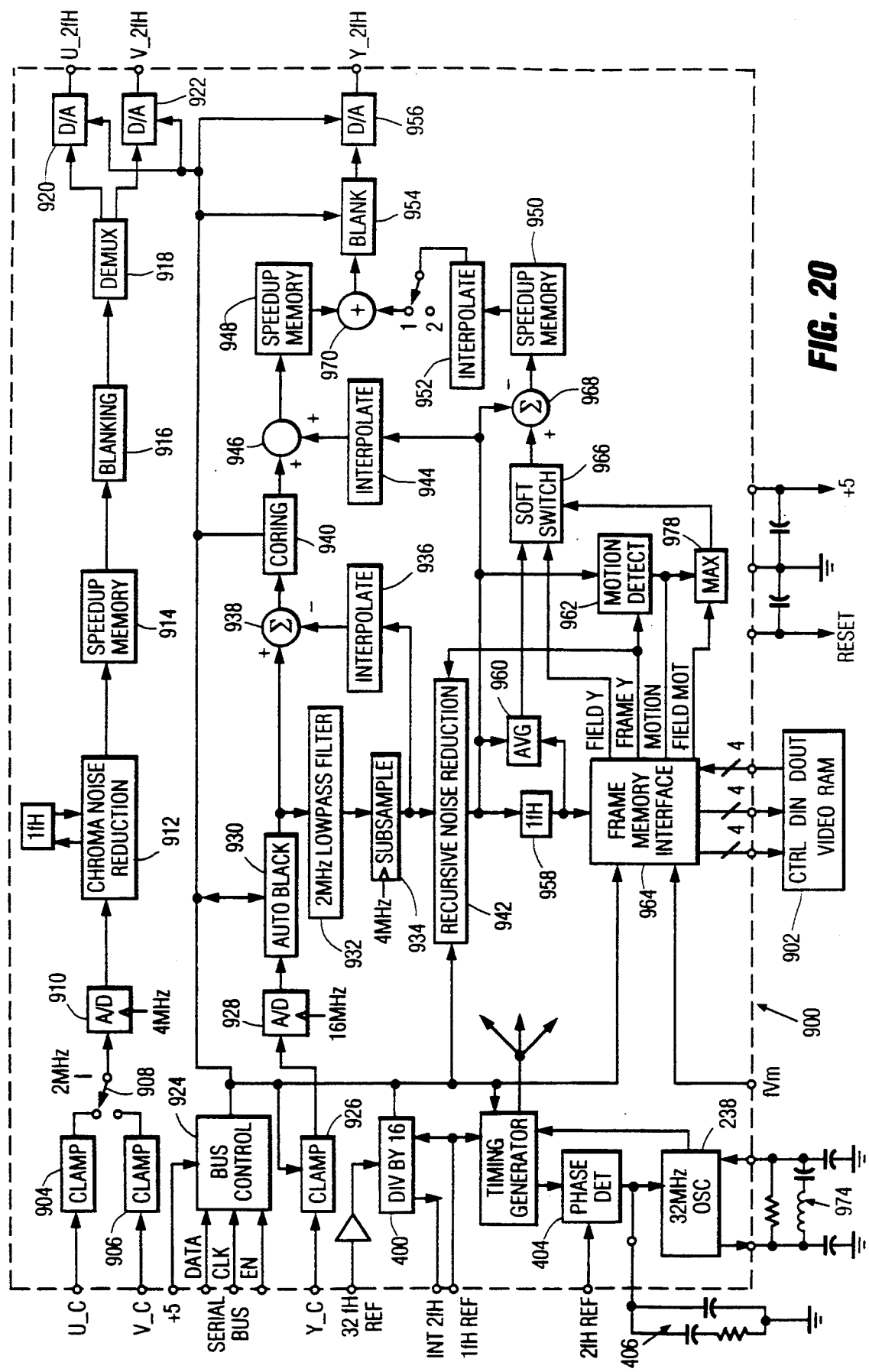

FIG. 20 is a block diagram of the interlaced to progressive scanning conversion circuit shown in FIG. 2.

Figure 21:
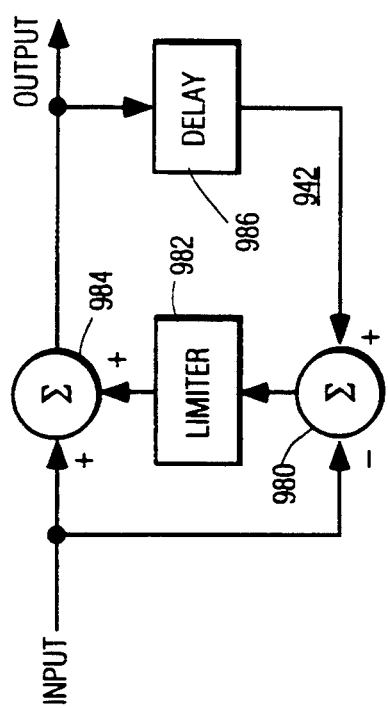

FIG. 21 is a block diagram of the noise reduction circuit shown in FIG. 20.

Figure 22:
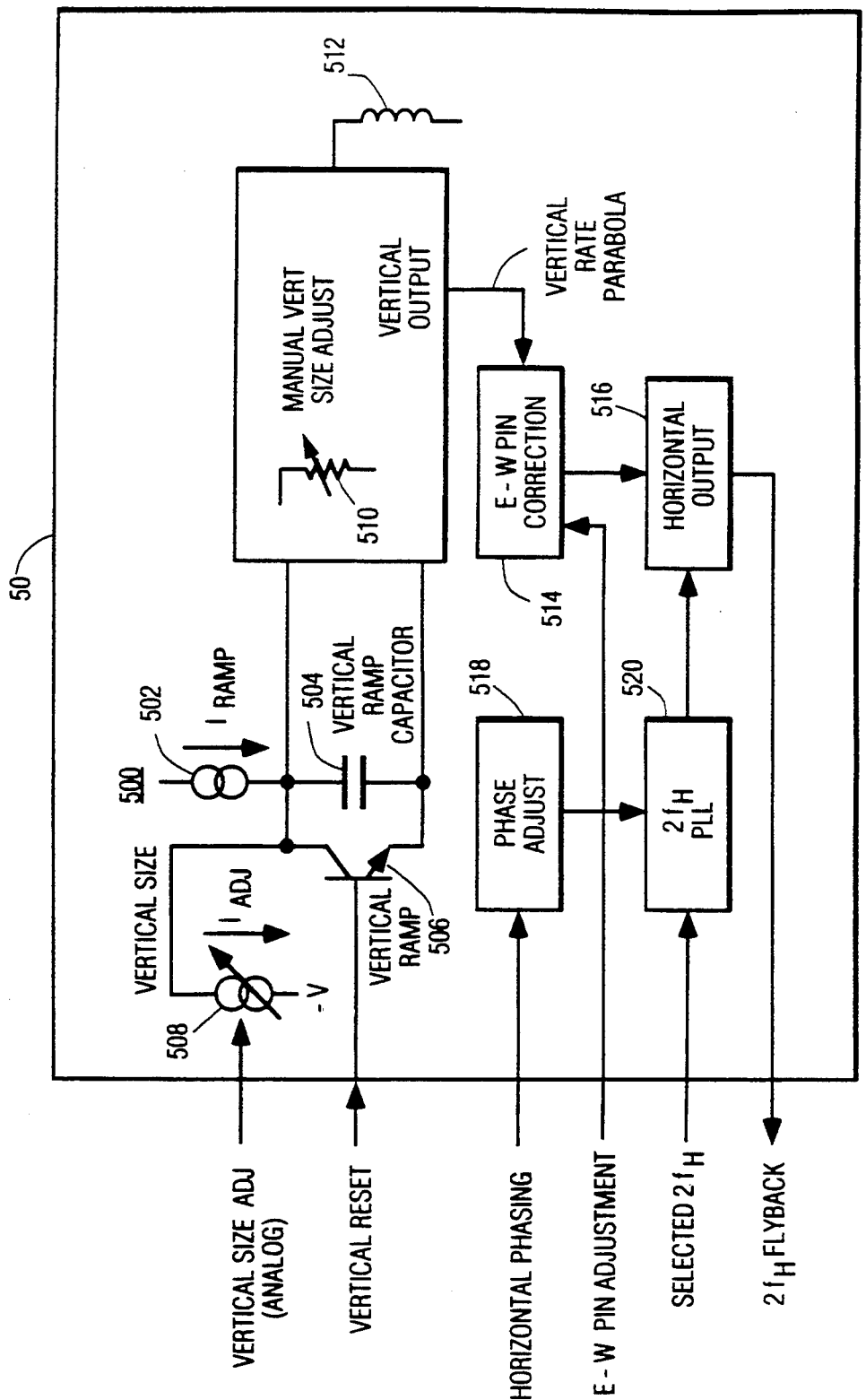

FIG. 22 is a combination block and circuit diagram for the deflection circuit shown in FIG. 2.

FIG. 23 is a timing diagram useful for explaining implementation of vertical panning.

FIGS. 24(a)–24(c) are diagrams of display formats useful for explaining the timing diagram of FIG. 23.

Figure 25:
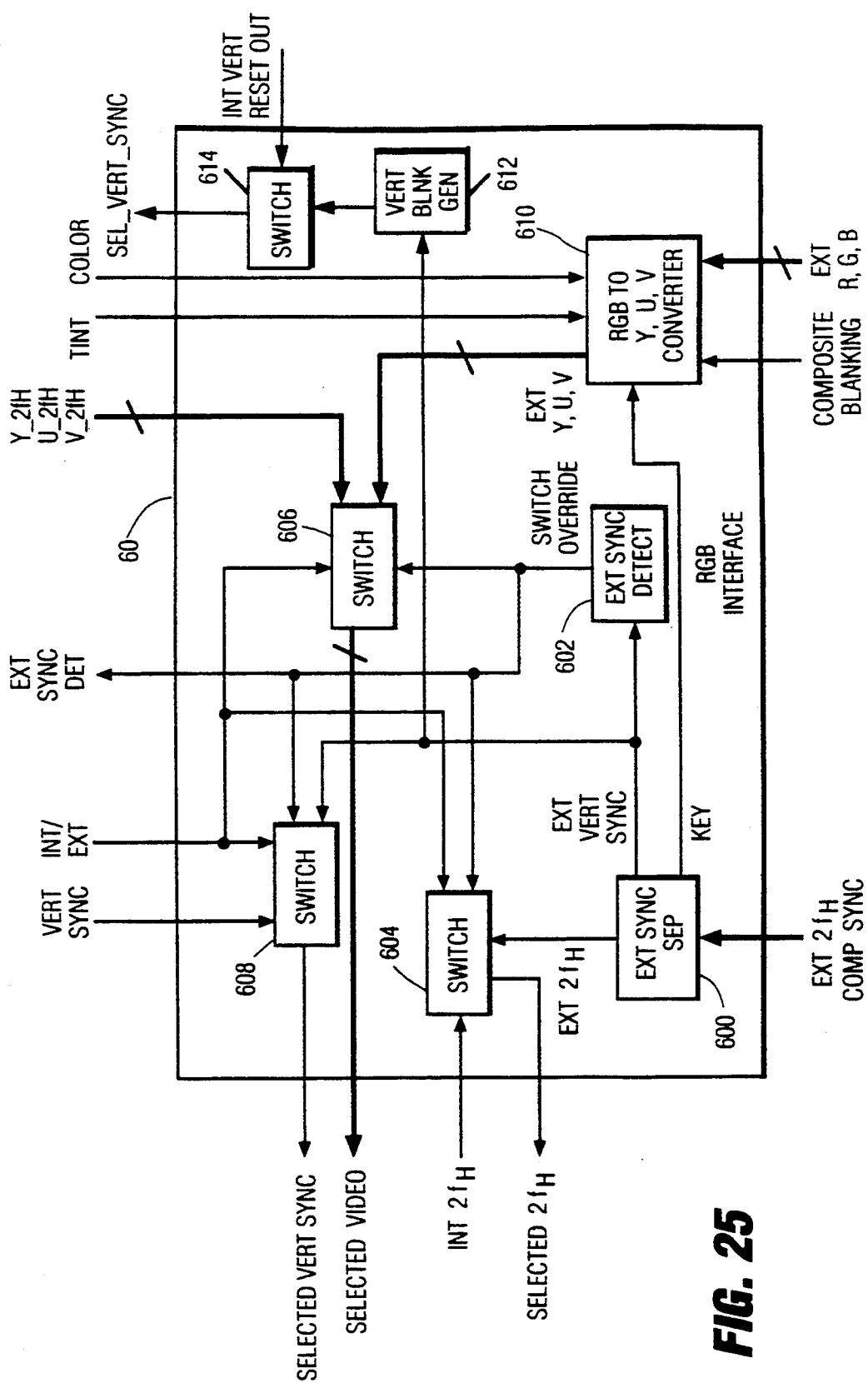

FIG. 25 is a block diagram of the RGB interface shown in FIG. 2.

Figure 26:
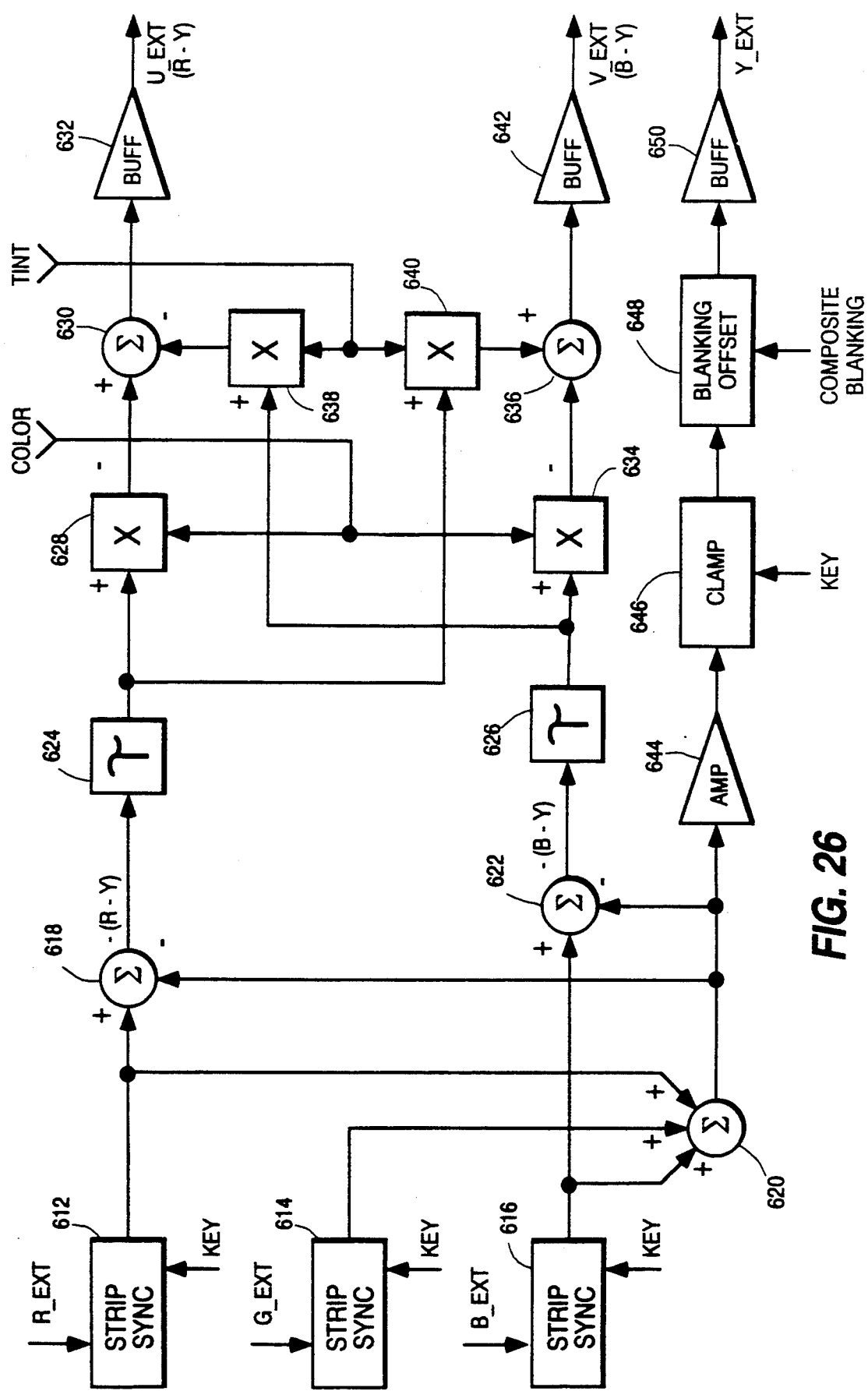

FIG. 26 is a block diagram of the RGB to Y, U, V converter shown in FIG. 25.

Figure 27:
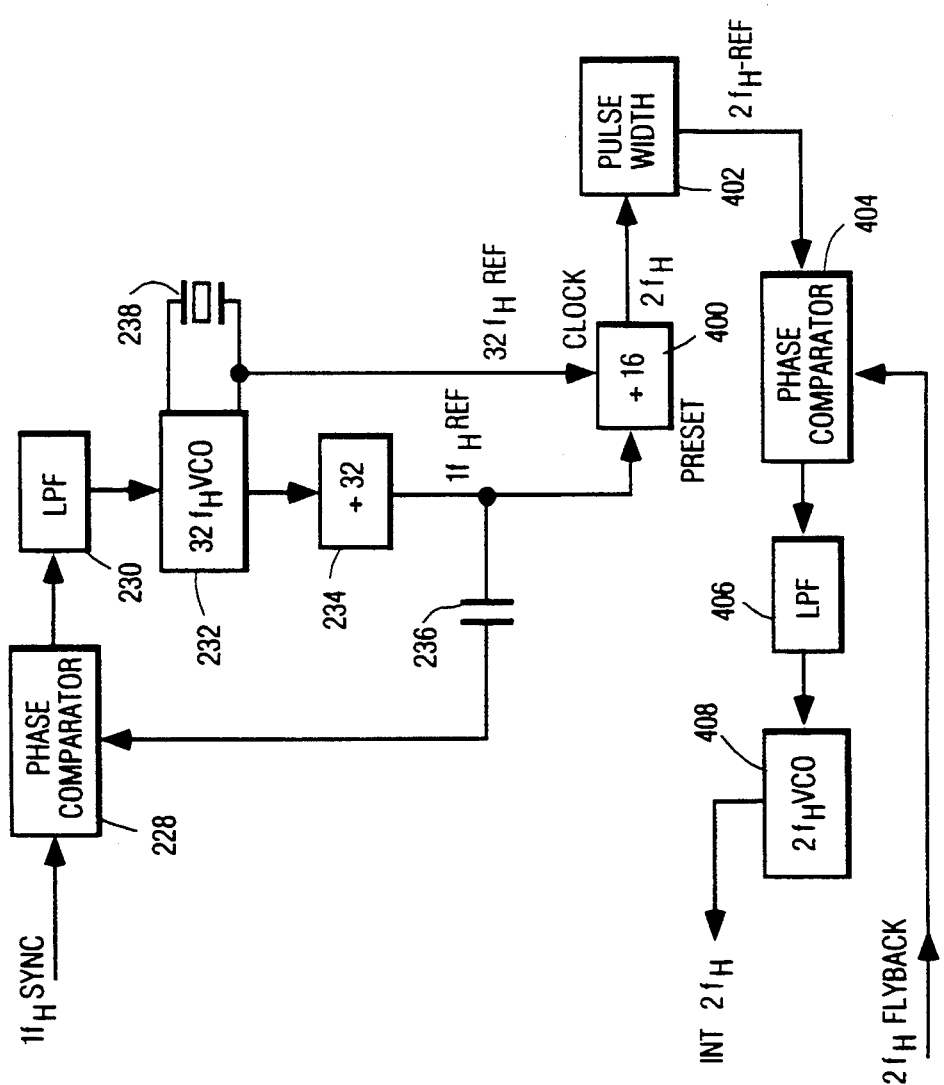

FIG. 27 is a block diagram of a circuit for generating the internal $2f_H$ signal in the $1f_H$ to $2f_H$ conversion.

Figure 8:
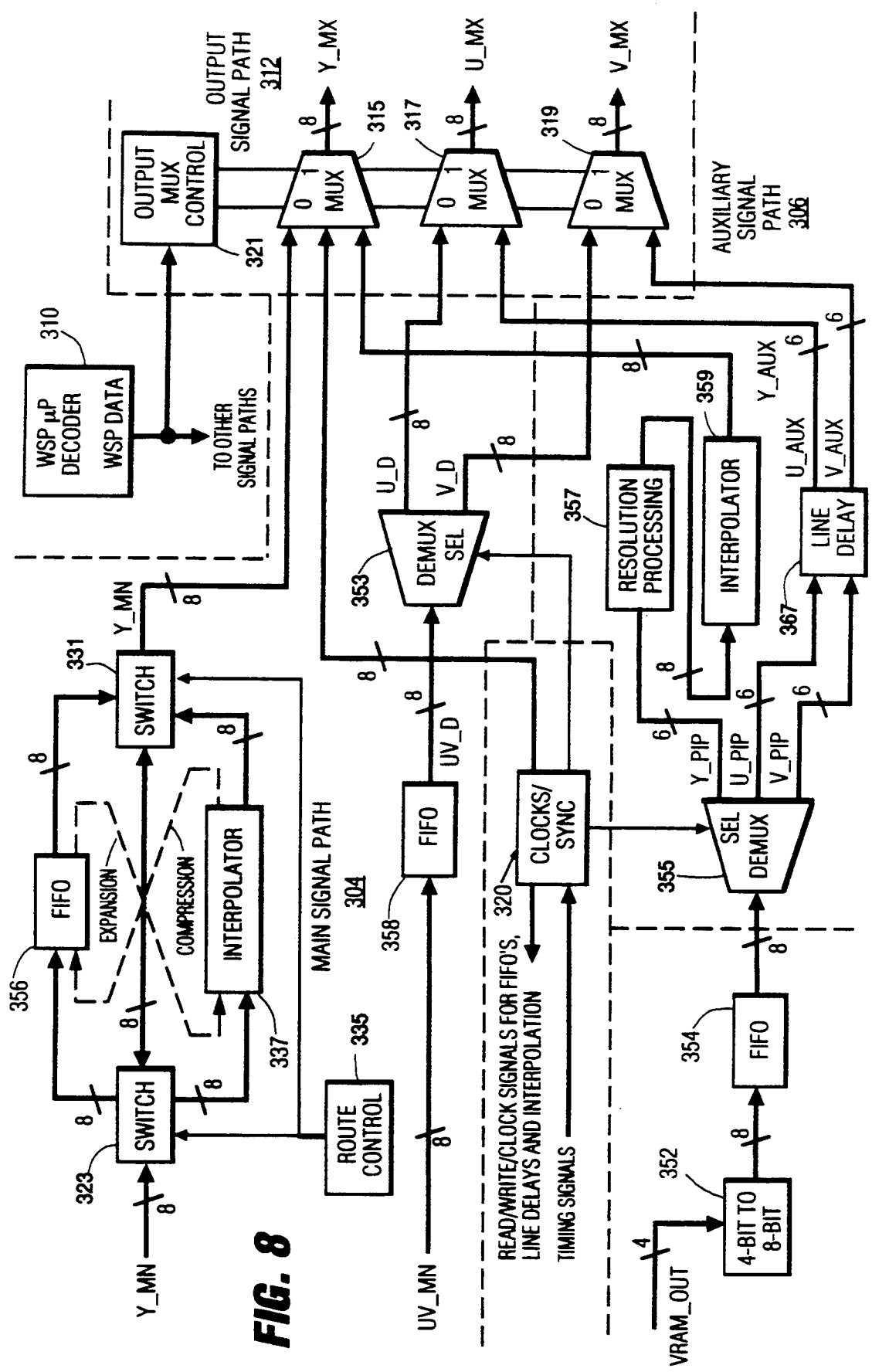
FIG. 8 is a block diagram of the gate array shown in FIG. 6 and illustrating the main, auxiliary and output signal paths.
Figure 28:
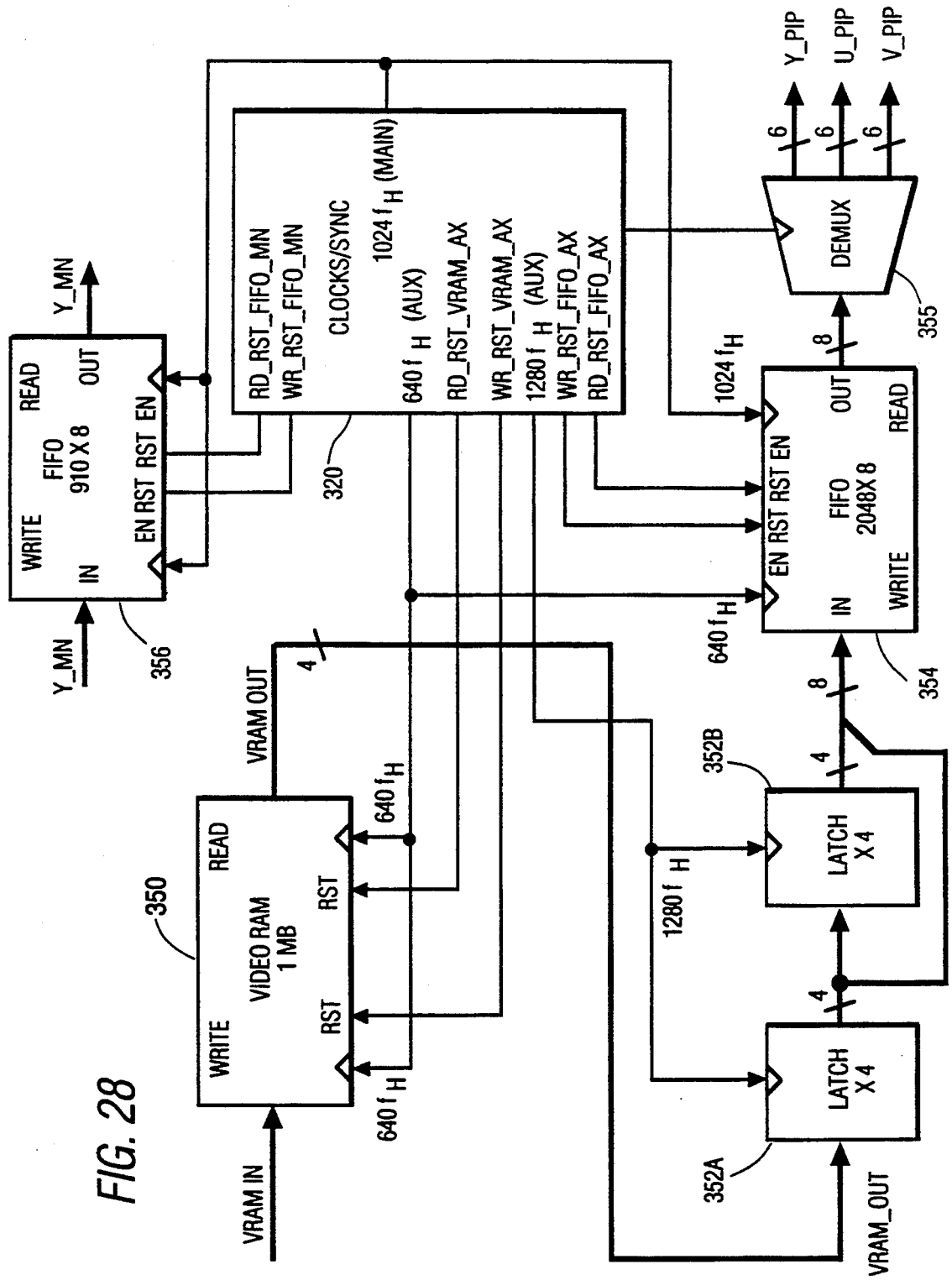

FIG. 28 is a different block diagram of a portion of the auxiliary signal path shown in FIG. 8.

Figure 29:
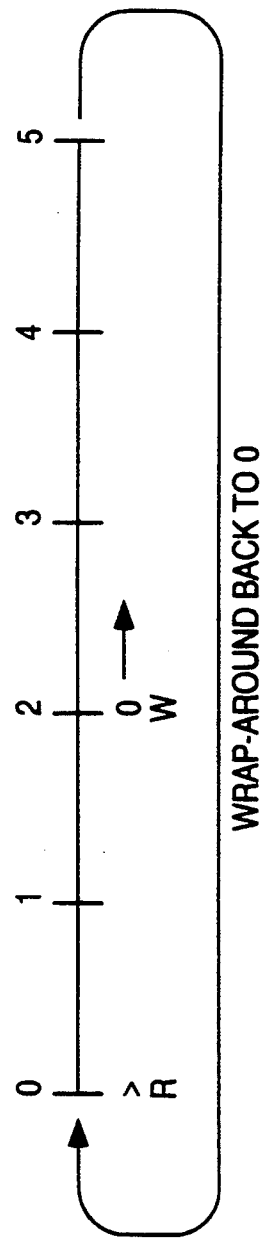

FIG. 29 is a diagram of a five line FIFO line memory useful for explaining avoidance of read/write pointer collisions.

Figure 30:
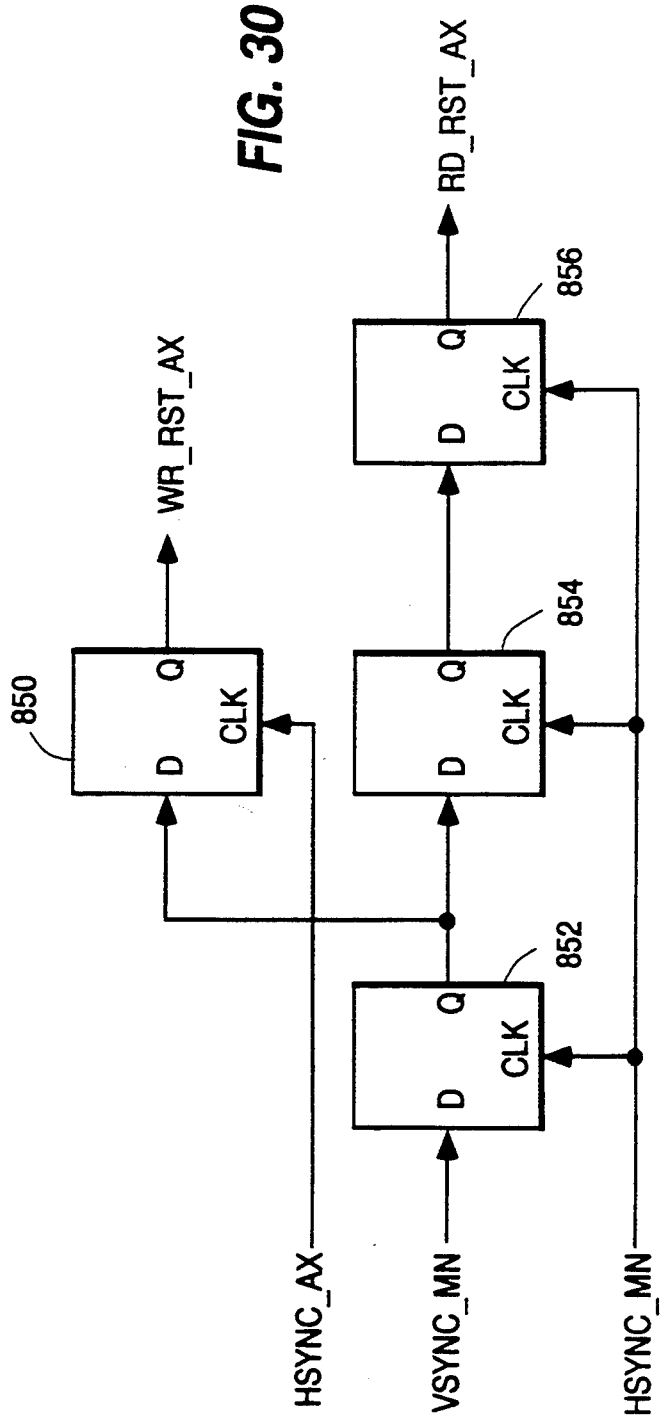

FIG. 30 is a block diagram of a simplified circuit for implementing an auxiliary path synchronizing circuit for the gate array.

Figure 31:
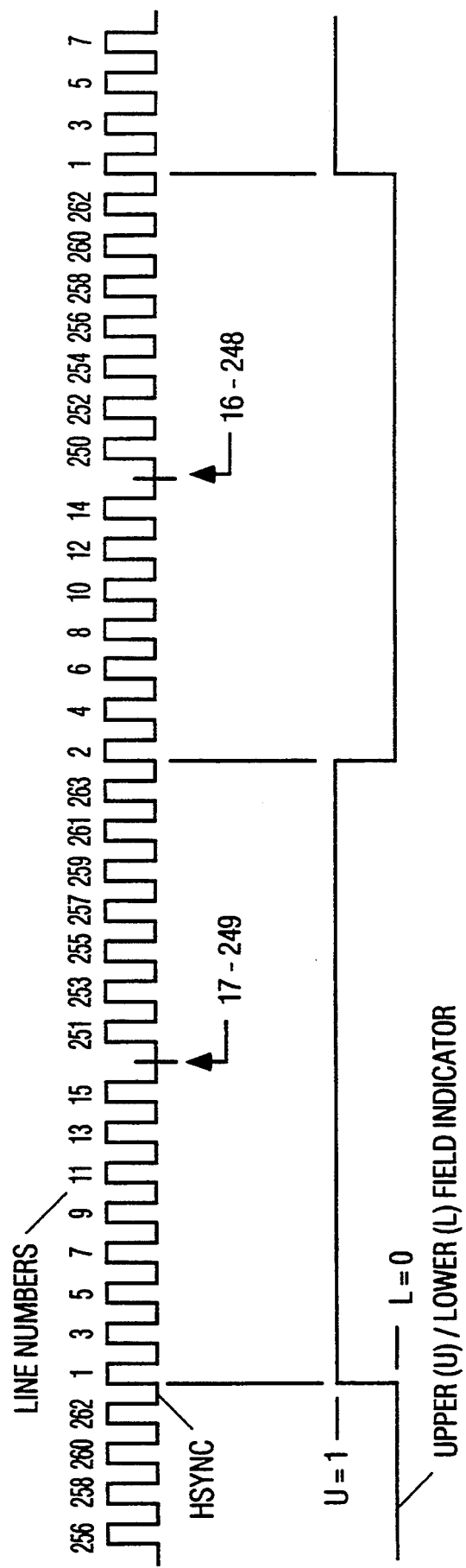

FIG. 31 is a timing diagram illustrating the correspondence of an upper/lower field indicator to the horizontal lines of a video frame.

Figure 32:
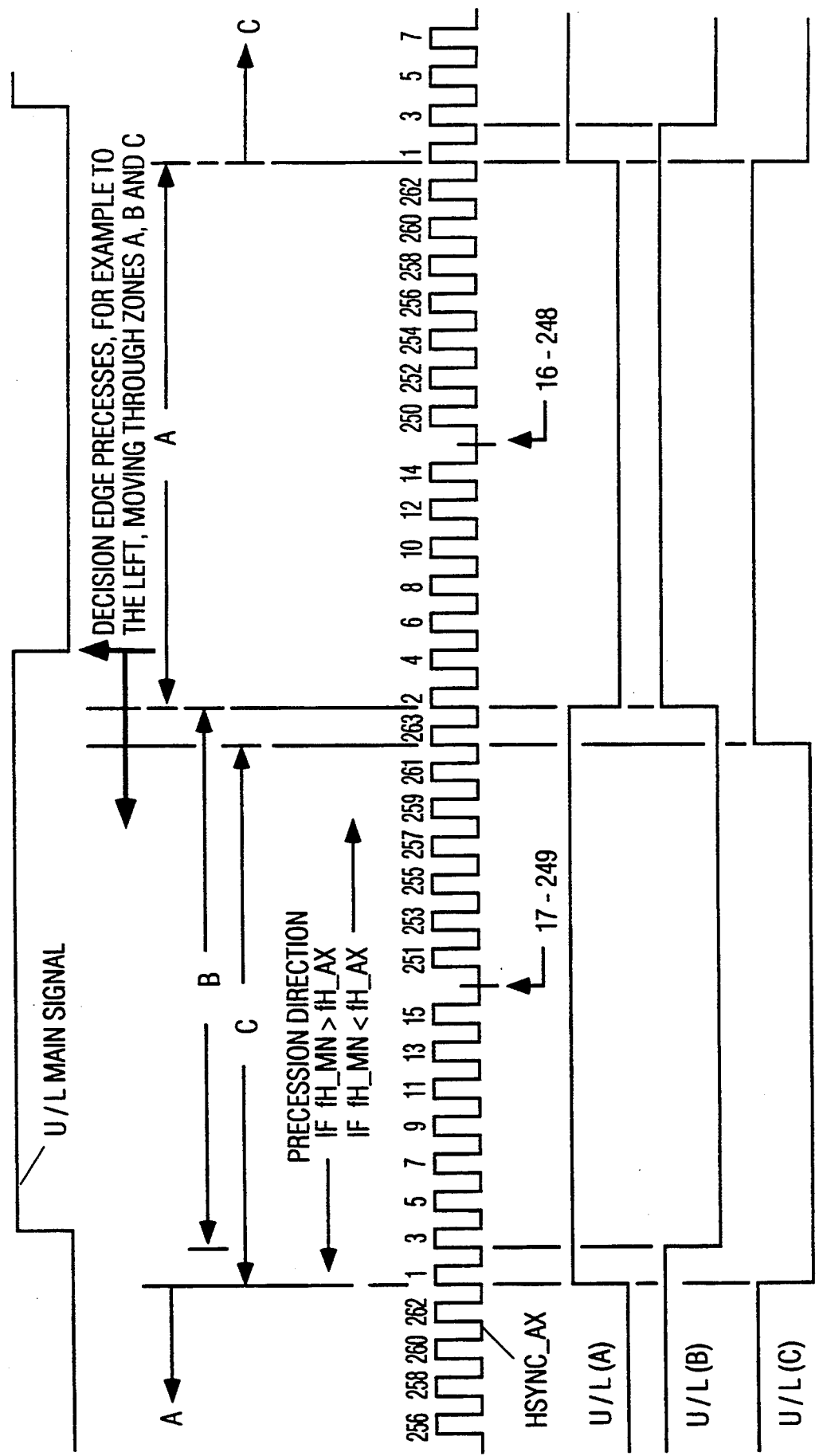

FIGS. 32–34 are useful for explaining a method for maintaining interlace integrity for simultaneously displayed video signals exhibiting relative precession.

Figure 36:
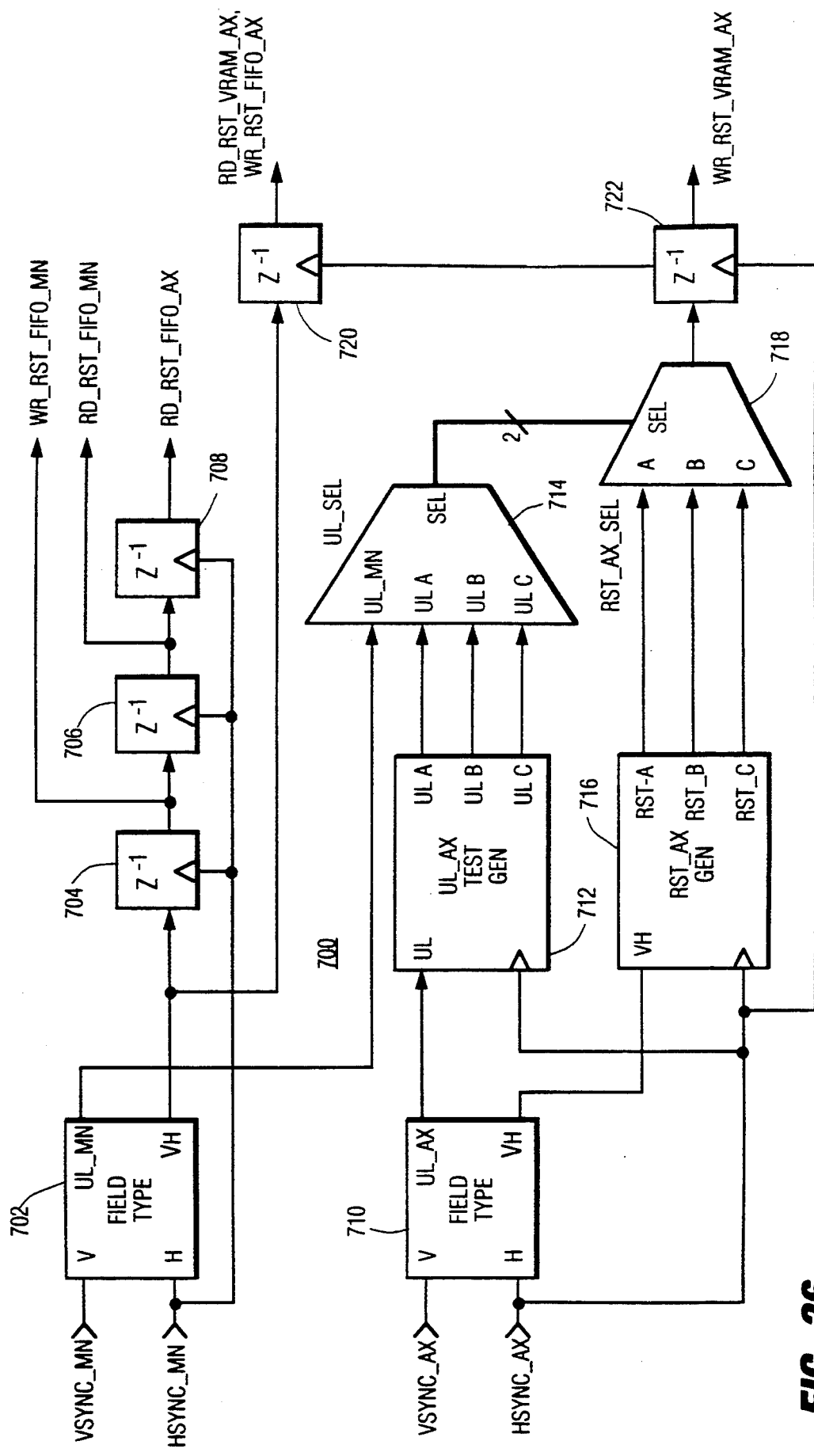

FIGS. 35(a)–35(c) are waveforms useful for explaining the operation of the circuit shown in FIG. 36.

FIG. 36 is a block diagram of a circuit for maintaining interlace integrity as explained in connection with FIGS. 31–35.

Figure 37:
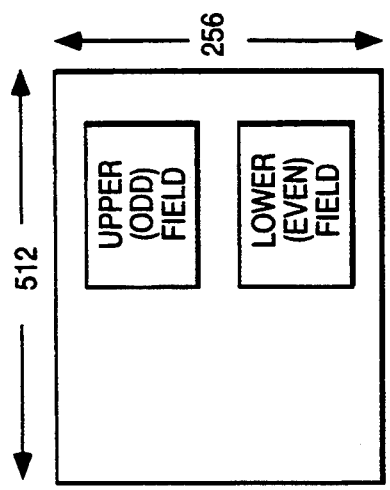

FIG. 37 is a diagram useful for explaining memory mapping in the video RAM associated with the picture-in-picture processor.

Figure 38:
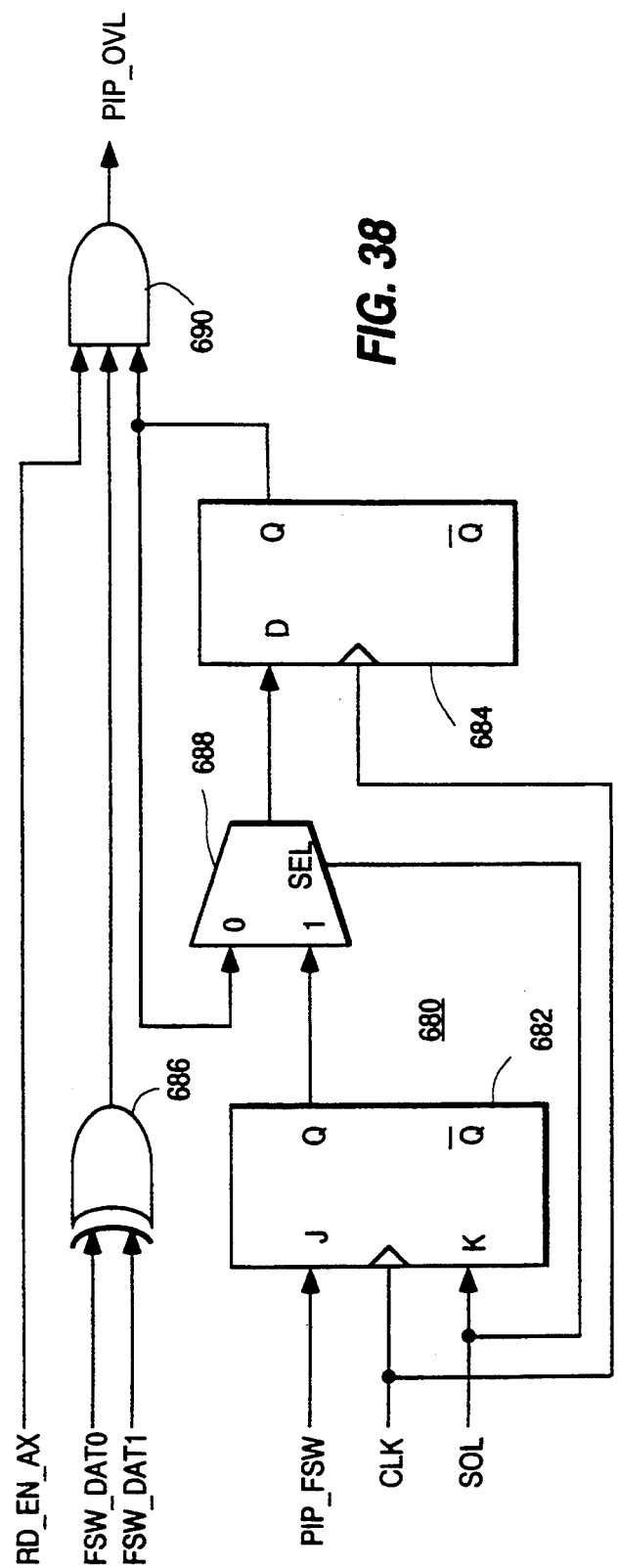

FIG. 38 is a block diagram of a circuit for controlling output switching between main and auxiliary video signals.

Figure 6:
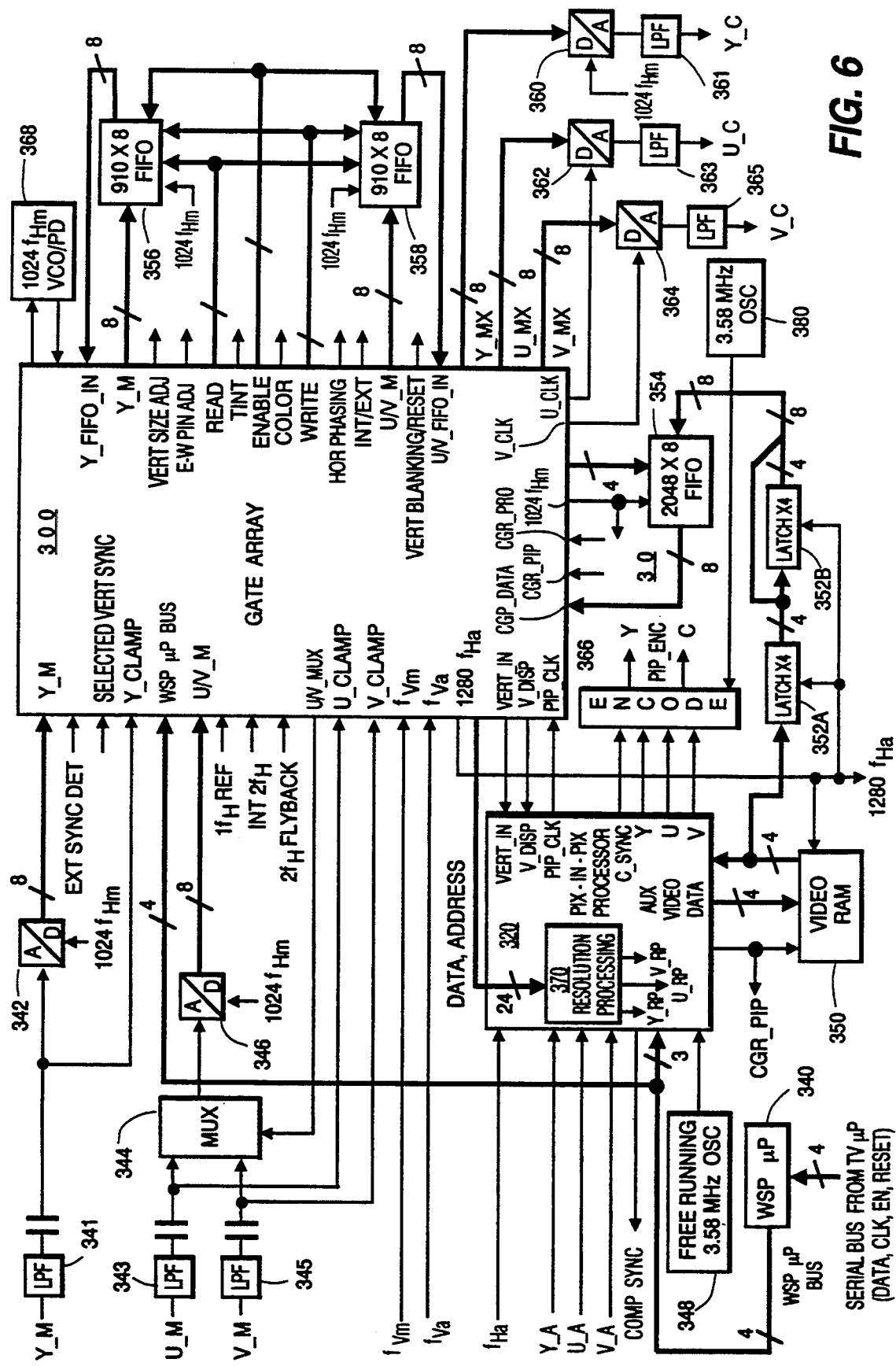
FIG. 6 is a block diagram showing further details of the wide screen processor common to FIGS. 3 and 5.

FIGS. 39 and 40 are a block diagrams for 1-bit dithering and dedithering circuits respectively, for implementing the resolution processing circuits of FIG. 6 and FIG. 8.

FIGS. 41 and 42 are a block diagrams for 2-bit dithering and dedithering circuits respectively, for implementing the resolution processing circuits of FIG. 6 and FIG. 8.

FIG. 43 is a table useful for explaining a skewing scheme for enhancing operation of dithering circuits.

Figure 44:
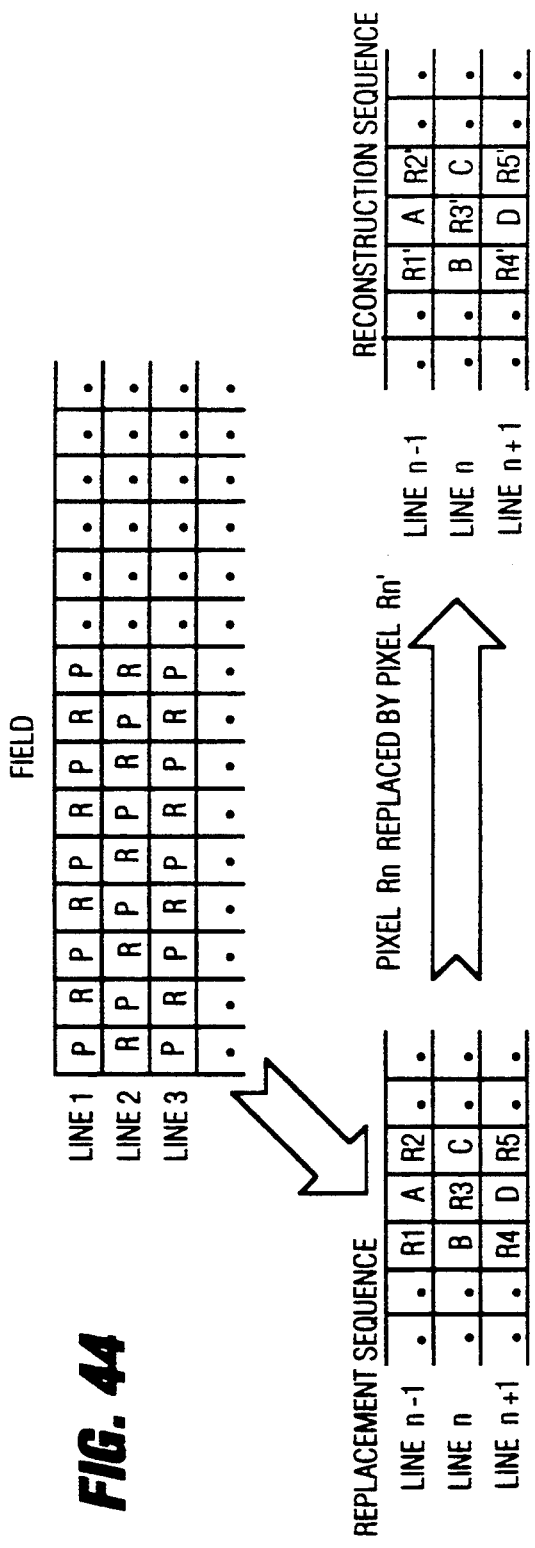

FIG. 44 is a table useful for explaining yet another alternative for implementing the resolution processing circuits of FIG. 6 and FIG. 8.

FIGS. 45 and 46 are diagrams useful for explaining operation of an automatic letterbox detector.

FIG. 47 is a block diagram of an automatic letterbox detector as explained in connection with FIGS. 45–46.

Figure 48:
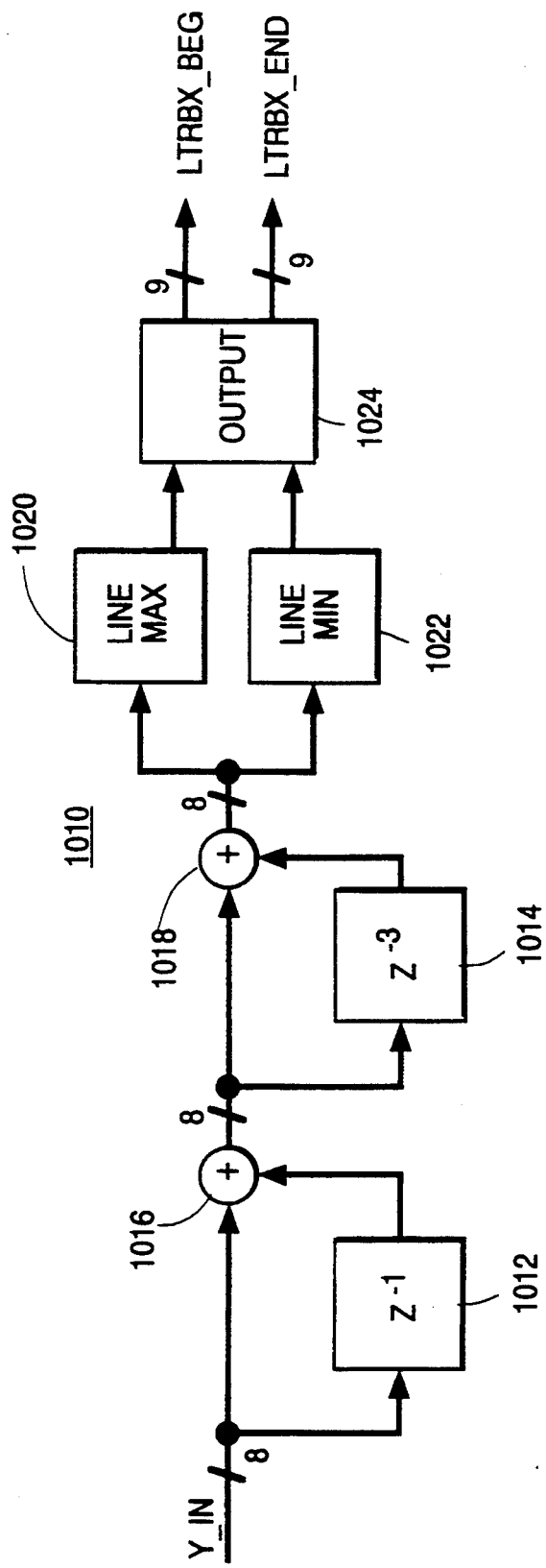

FIG. 48 is a block diagram of an alternative circuit for implementing an automatic letterbox detector.

Figure 49:
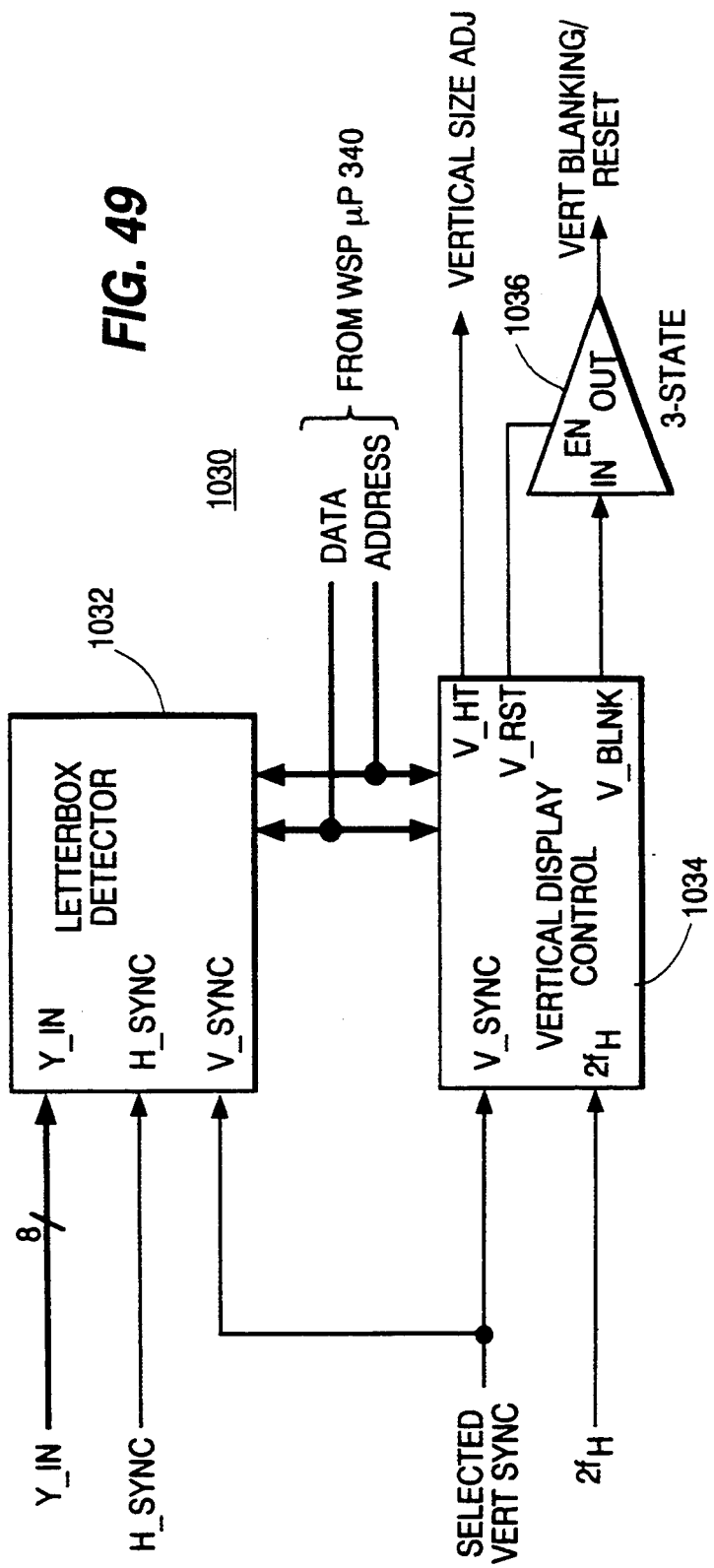

FIG. 49 is a block diagram of a vertical size control circuit including an automatic letterbox detector.

FIGS. 50(a)–50(f) illustrate waveforms useful for explaining the analog to digital conversion of the color components of the main video signal.

FIGS. 51(a)–51(b) illustrate waveforms useful for explaining skewing of luminance and color components in the main signal path of the gate array.

FIGS. 52(a) and 52(b) illustrate portions of the main signal path for the luminance and color components respectively, for implementing video compression.

FIG. 53(a)–53(l) are useful for explaining video compression of the color components in relation to the luminance components.

FIGS. 54(a) and 54(b) illustrate portions of the main signal path for the luminance and color components respectively, for implementing video expansion.

FIGS. 55(a)–55(l) are useful for explaining video expansion of the color components in relation to the luminance components.

Figure 11A:
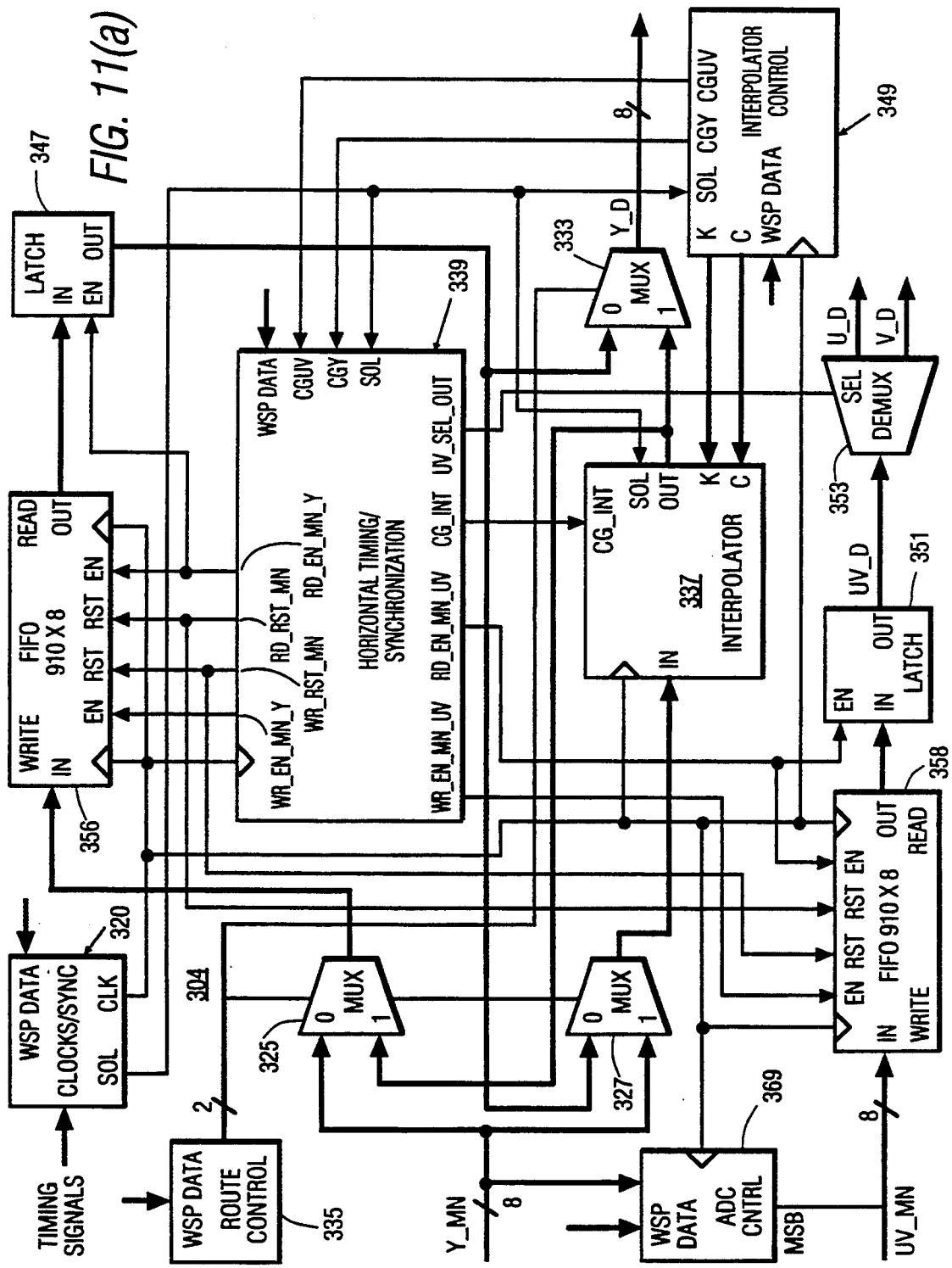
FIG. 11(a) is a block diagram showing the main signal path of FIG. 8 in more detail.
Figure 12:
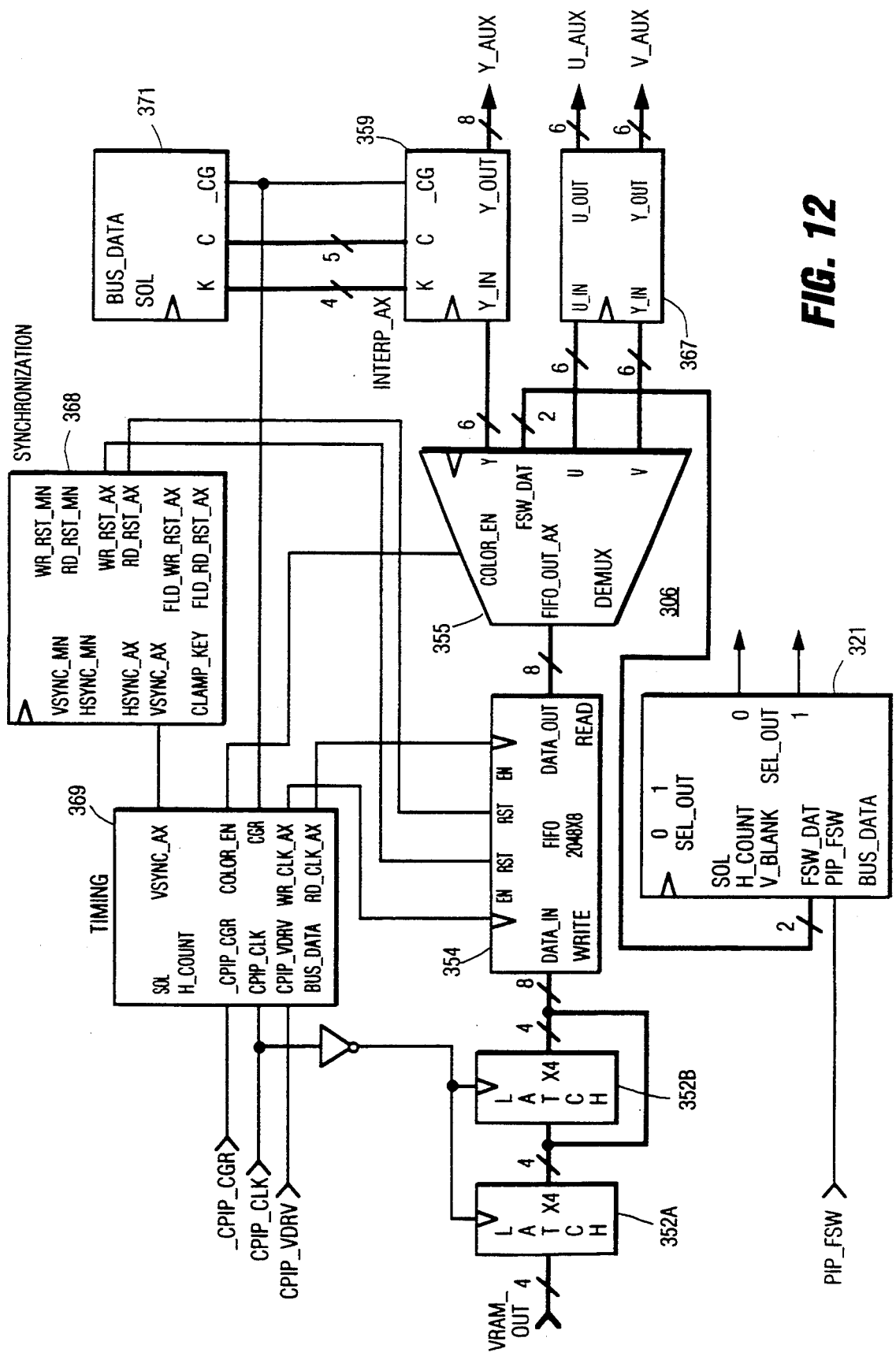
FIG. 12 is a block diagram showing the auxiliary signal path of FIG. 8 in more detail.

FIGS. 56 and 57 are pixel diagrams useful for explaining the operation of two-stage variable interpolation filters, as may be used to implement the interpolators of FIGS. 8, 11(a), and 12.

FIG. 58 is a block diagram of a two stage compensated variable interpolation filter.

FIG. 59 is a block diagram of a two stage compensated variable interpolation filter configured for implementing a zoom feature.

Figure 60:
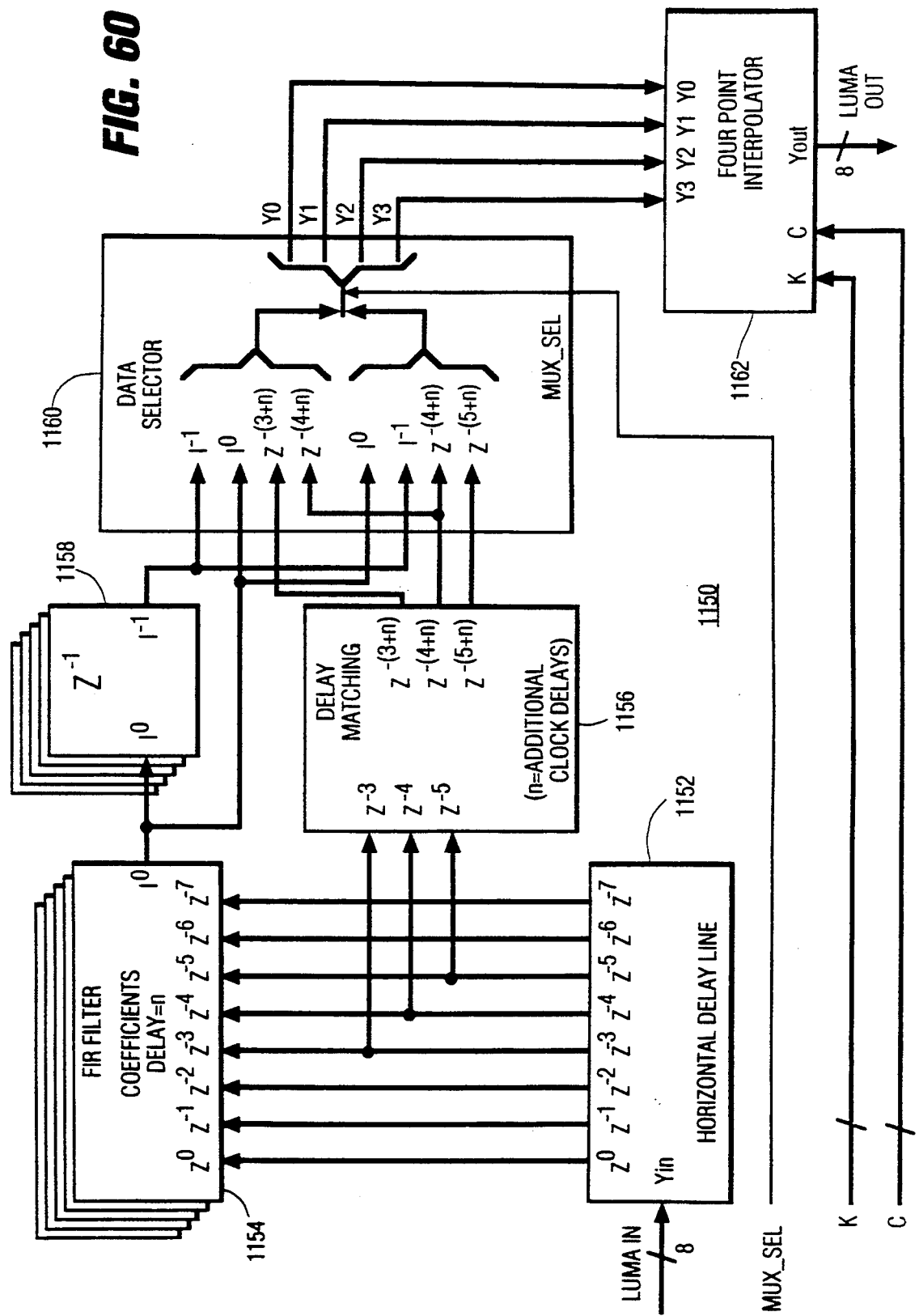

FIG. 60 is a block diagram of a circuit for implementing an eight tap, two stage interpolation filter.

Figure 61:
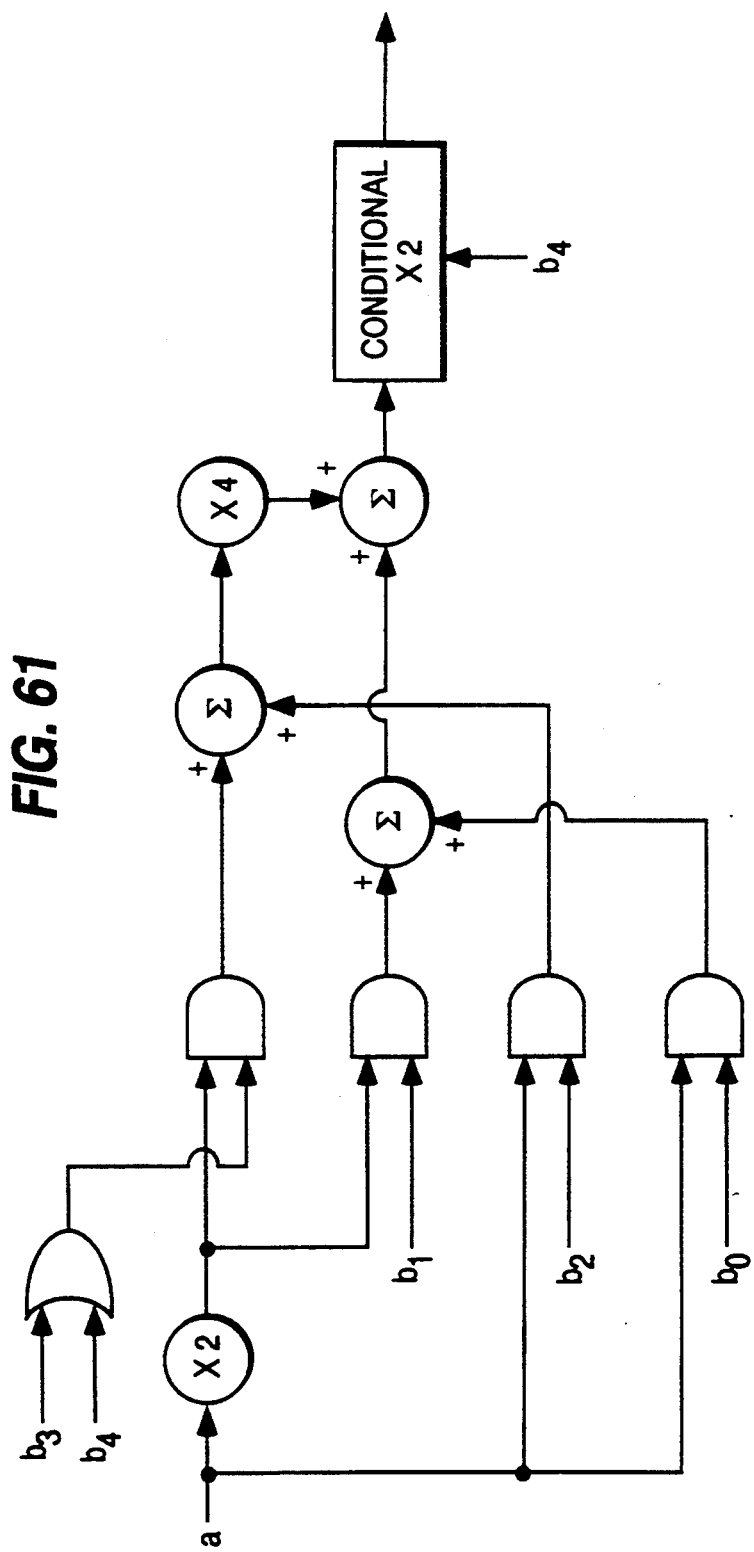

FIG. 61 is a block diagram of a 1/16 or 1/32 resolution interpolator.

Figures 62, 63, 64:
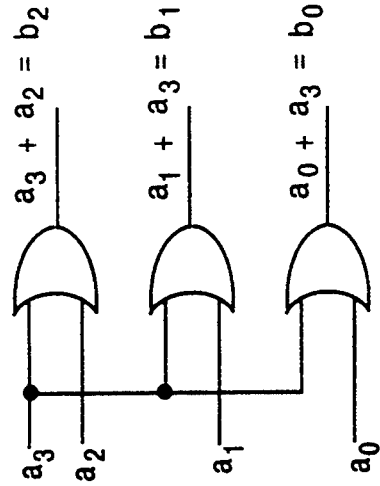

FIG. 62 is a table of K and C values for the interpolator shown in FIG. 61.

FIG. 63 is a block diagram of a circuit for determining the values of C from the values of K.

FIG. 64 is a table of values as calculated by the circuit of FIG. 62.

Figure 65:
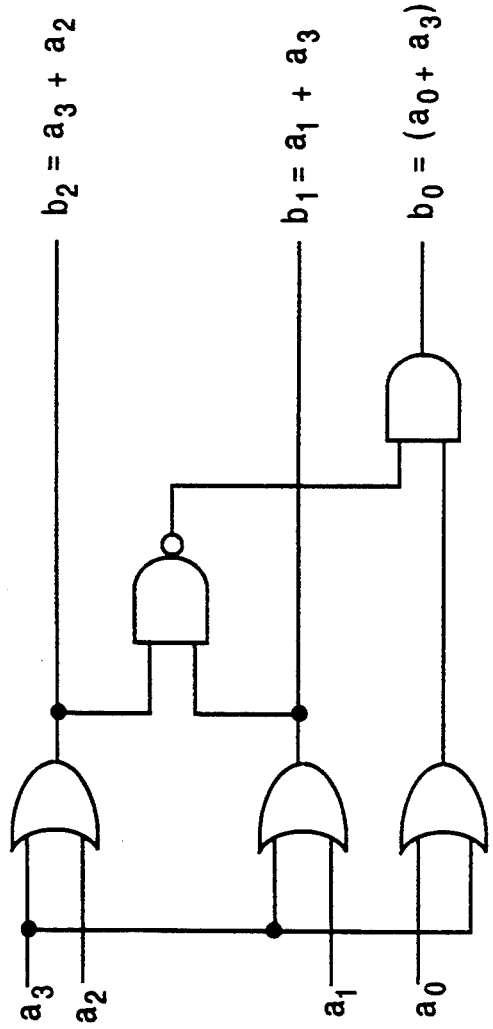

FIG. 65 is a block diagram of an alternative circuit for determining the values of C from the values of K.

Figure 66:
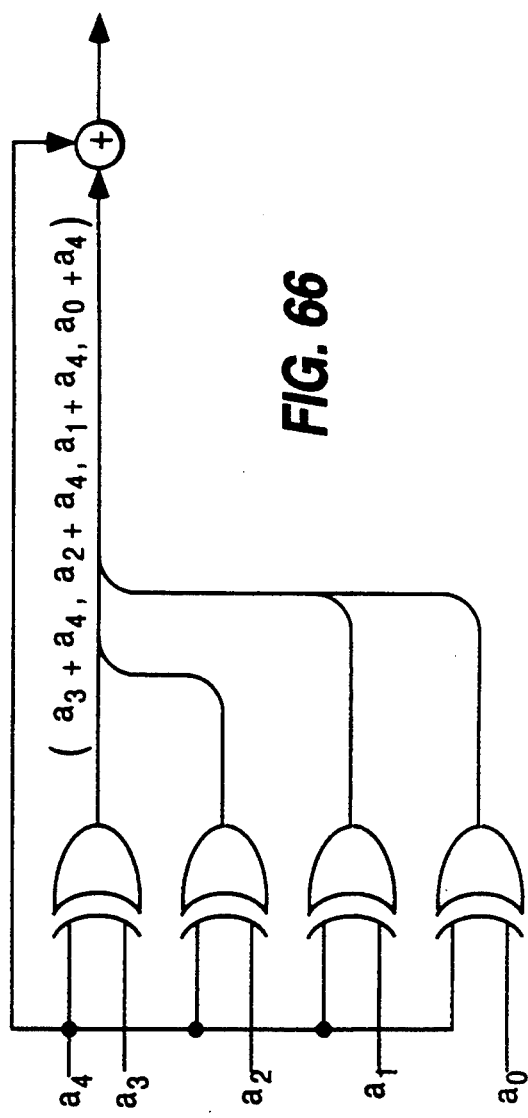

FIG. 66 is a block diagram of another alternative circuit for determining the values of C from the values of K.

Figure 67:
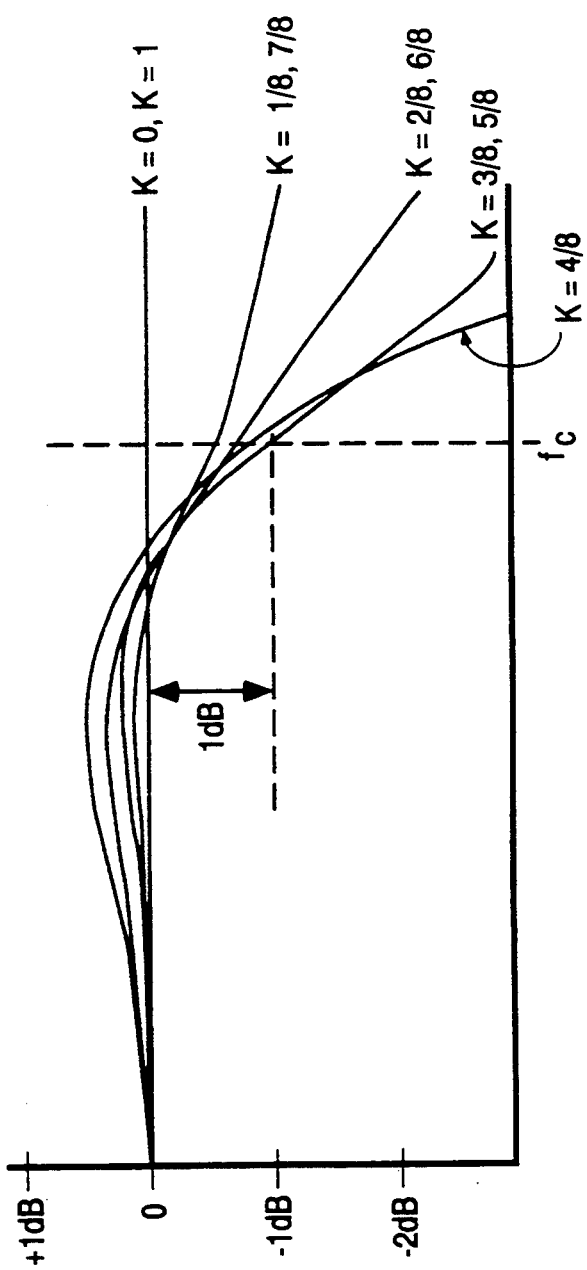

FIG. 67 is a graph of curves showing the frequency response of a conventional two stage, four point interpolator.

Figure 69:
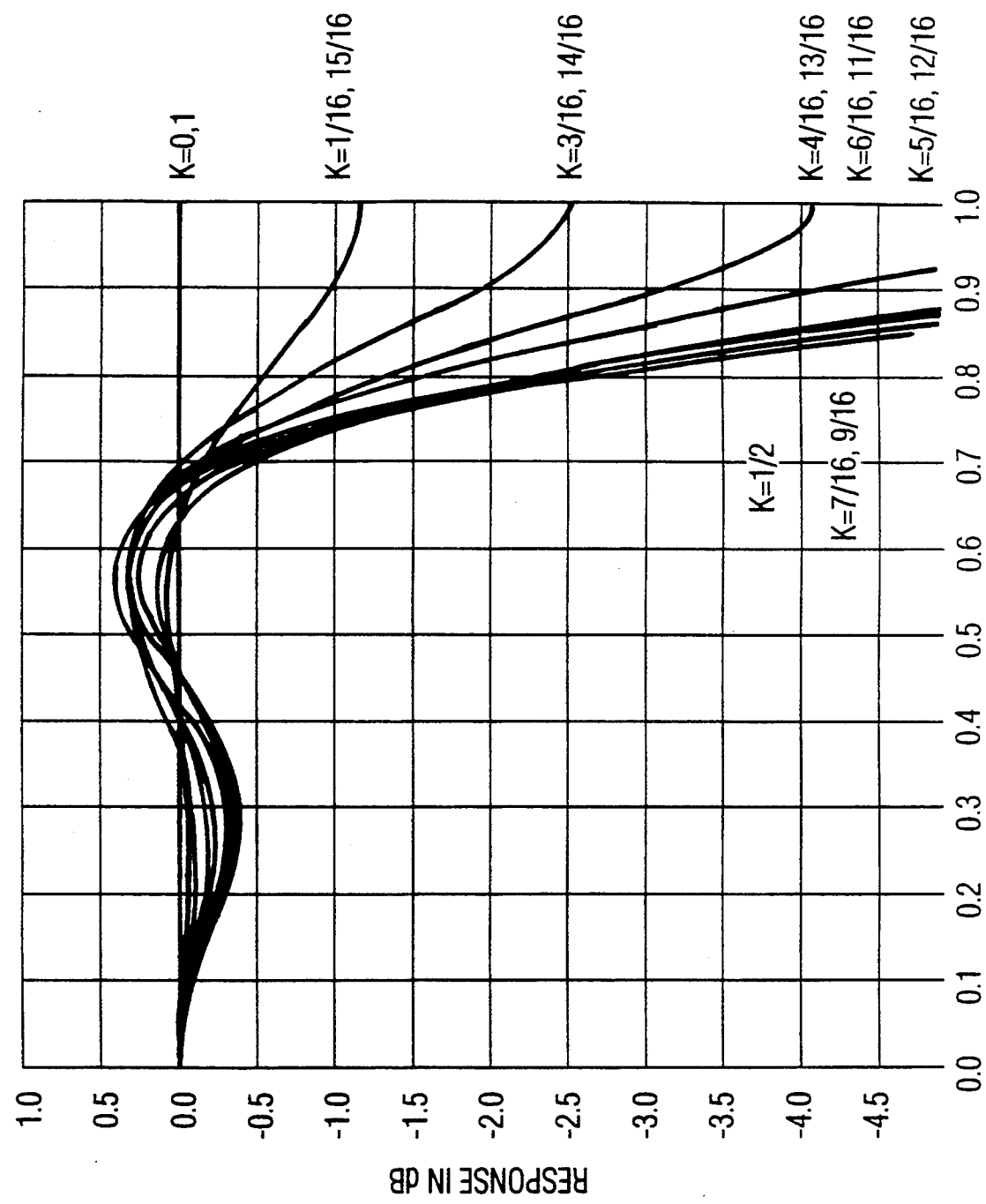

FIG. 68 is a table and FIG. 69 is a graph, together illustrating the frequency response of an eight point interpolator.

Figure 70:
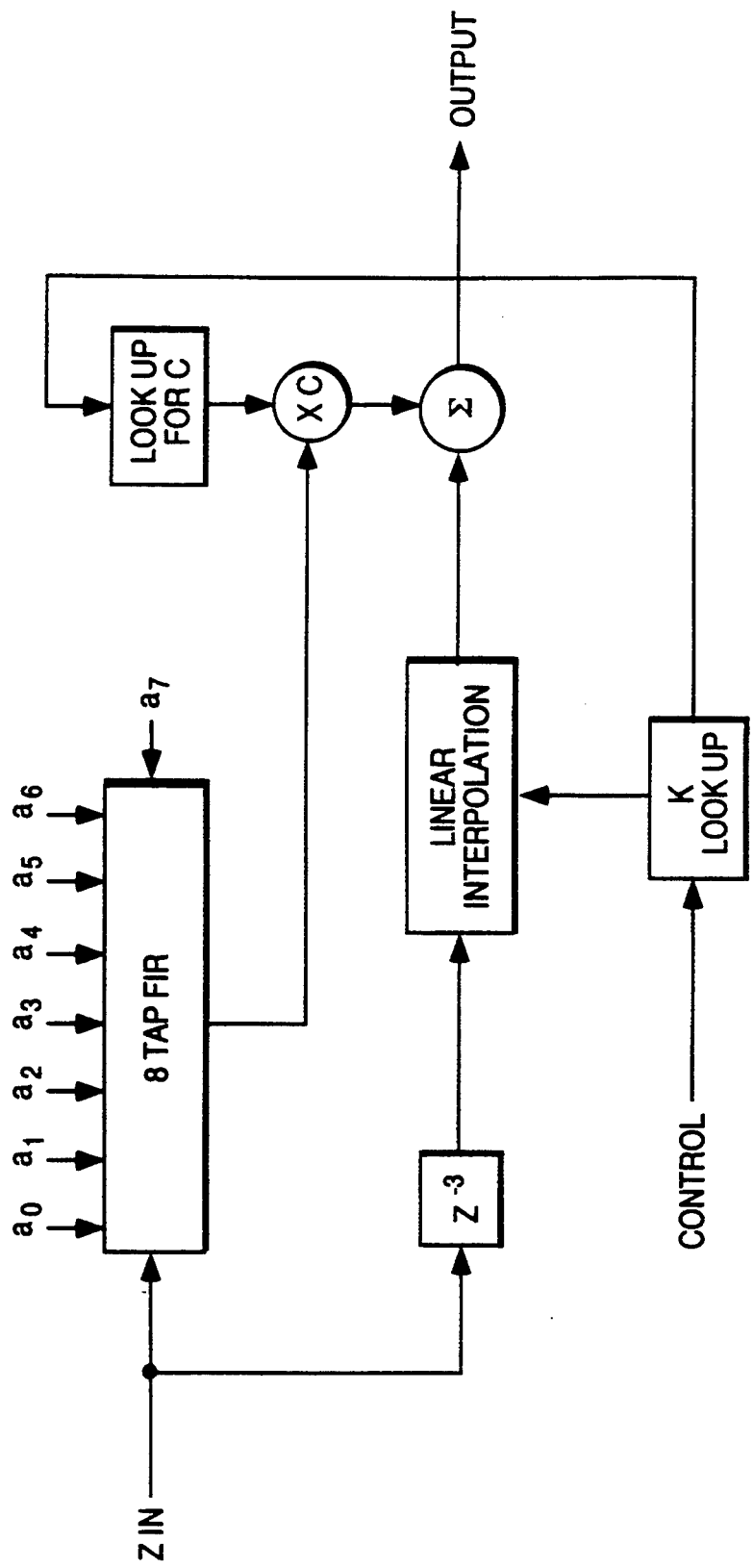

FIG. 70 is a block diagram of an eight point interpolator having a frequency response corresponding to FIGS. 68 and 69.

The various parts of FIG. 1 illustrate some, but not all of the various combinations of single and multiple picture display formats which can be implemented according to different inventive arrangements. Those selected for illustration are intended to facilitate the description of particular circuits comprising wide screen televisions according to the inventive arrangements. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

Figure 1C:
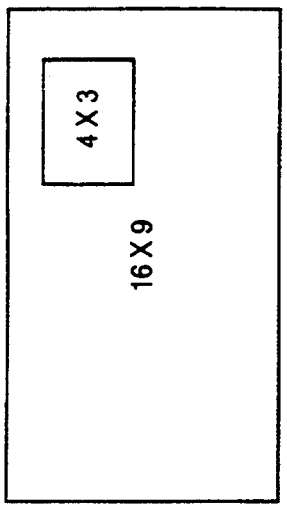
Figure 1F:
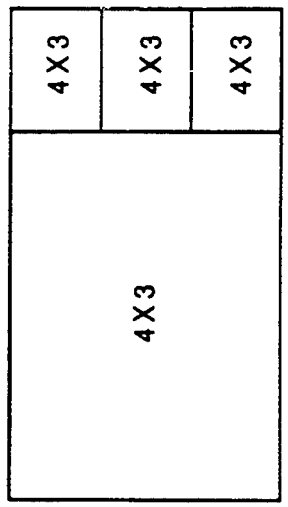
Figure 1I:
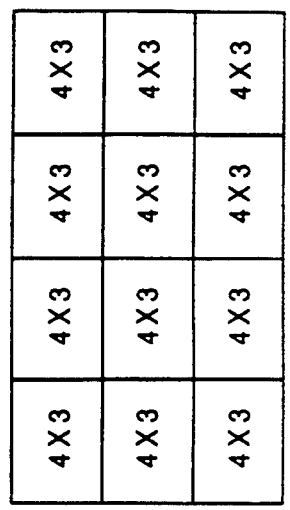
Figure 1B:
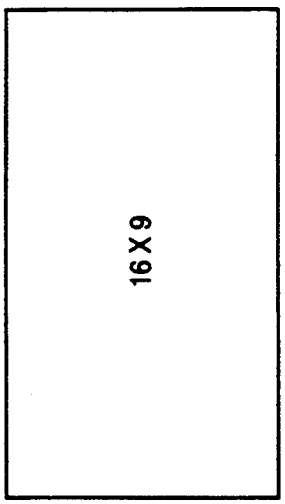
Figure 1E:
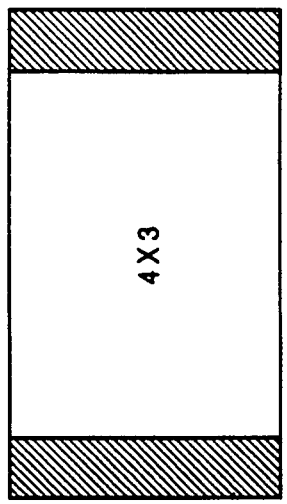
Figure 1H:
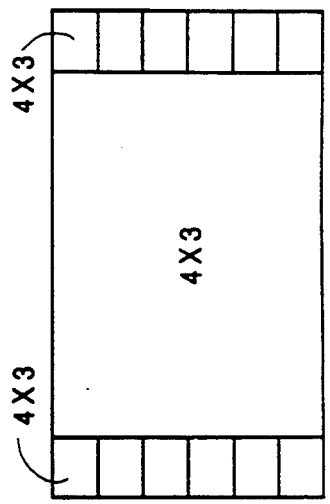
Figure 1A:
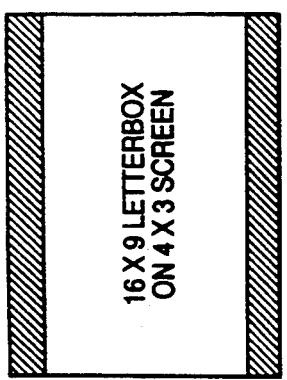

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio letterbox picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

Figure 1D:
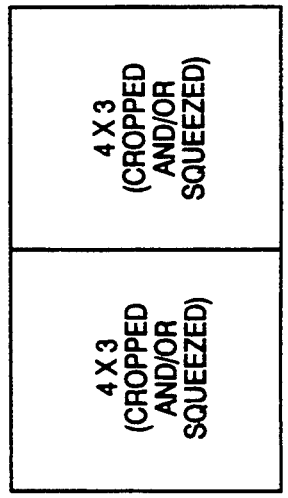

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television according to this invention can provide any mix of cropping and aspect ratio distortion from maximum cropping with no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

Figure 1G:
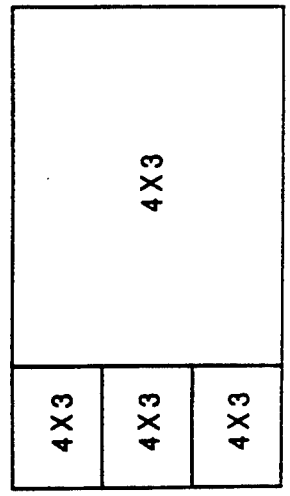

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position, as shown in FIG. 1(g).

FIG. 1(h) illustrates an alternative wherein the 4×3 format display ratio picture is centered, and six smaller 4×3 format display ratio pictures are displayed in vertical columns on either side. As in the previously described format, a wide screen television provided with two tuners can provide two moving pictures. The remaining eleven pictures will be in freeze frame format.

FIG. 1(i) shows a display format having a grid of twelve 4×3 format display ratio pictures. Such a display format is particularly appropriate for a channel selection guide, wherein each picture is at least a freeze frame from a different channel. As before, the number of moving pictures will depend upon the number of available tuners and signal processing paths.

The various formats shown in FIG. 1 are illustrative, and not limiting, and can be implemented by wide screen televisions shown in the remaining drawings and described in detail below.

An overall block diagram for a wide screen television in accordance with inventive arrangements, and adapted to operate with $2f_H$ horizontal scanning, is shown in FIG. 2 and generally designated 10. The television 10 generally comprises a video signals input section 20, a chassis or TV microprocessor 216, a wide screen processor 30, a $1f_H$ to $2f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
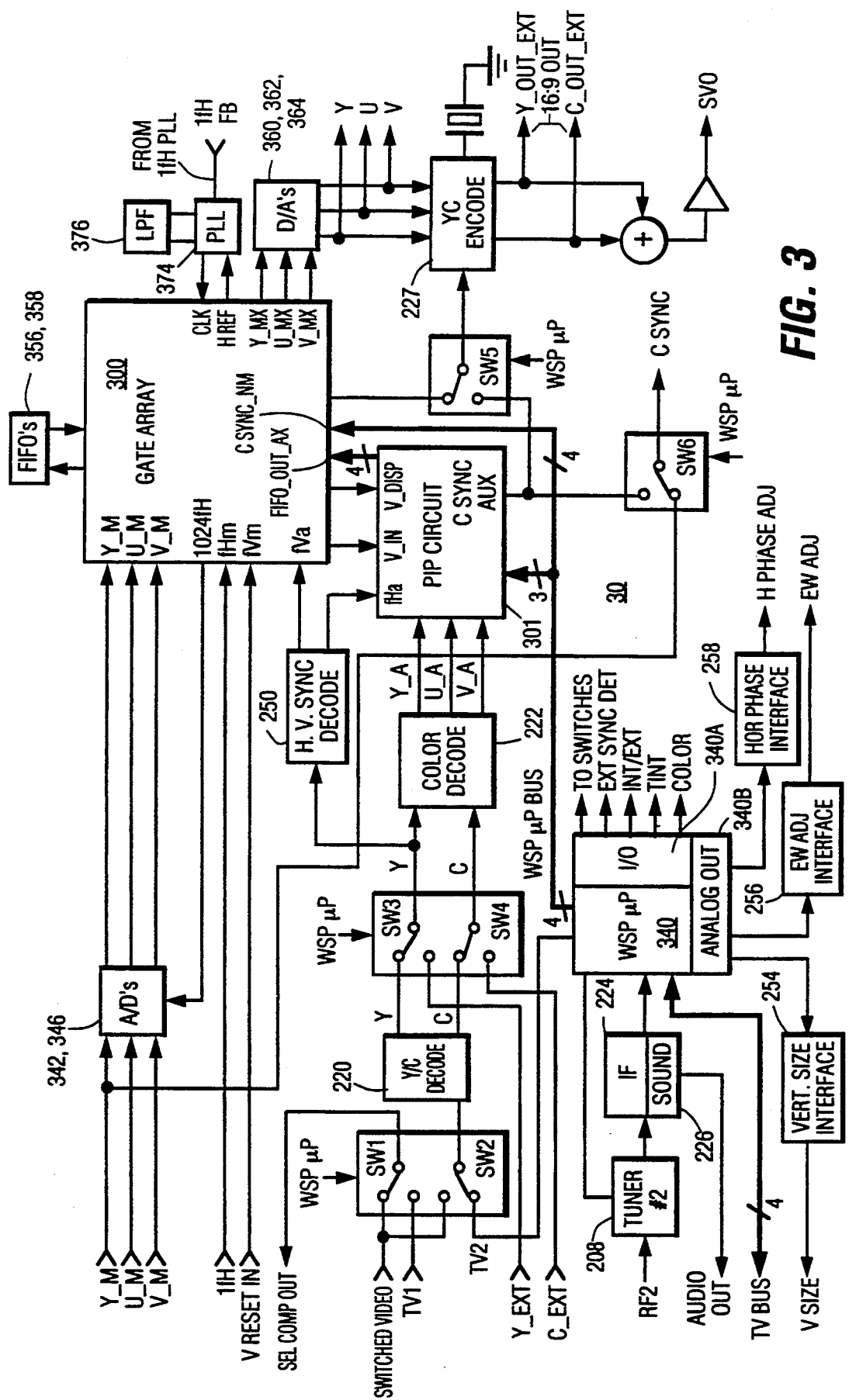
FIGS. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip, for developing color difference signals U_M and V_M. In this regard, U is an equivalent designation for (R-Y) and V is an equivalent designation for (B-Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL_VERT_SYNC directed to the deflection circuit 50. Horizontal and vertical synchronizing signals of the auxiliary video signal are developed by sync separator 250 in the wide screen processor.

The $1f_H$ to $2f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The generation of $2f_H$ timing signals is shown more fully in FIG. 27. The converter circuit 40 operates in conjunction with a video RAM 420. The video RAM may be used to store one or more fields of a frame, to enable the progressive display. The converted video data as $Y\_2f_H$, $U\_2f_H$ and $V\_2f_H$ signals is supplied to the RGB interface 60.

The RGB interface 60, shown in more detail in FIG. 25, enables selection of the converted video data or external RGB video data for display by the video signals input section. The external RGB signal is deemed to be a wide format display ratio signal adapted for $2f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT-/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30'comprises a picture in picture processor 320 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(i). The picture-in-picture processor 320 and gate array 300 are under the control of a wide screen microprocessor (WSP μP) 340.

Microprocessor 340 is responsive to the TV microprocessor 216 over a serial bus, The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

The deflection circuit 50, shown in more detail in FIG. 22, receives a vertical reset signal from the wide screen processor, a selected $2f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies $2f_H$ flyback pulses to the wide screen processor 30, the $1f_H$ to $2f_H$ converter 40 and the YUV to RGB converter 240.

Operating voltages for the entire wide screen television are generated by a power supply 70 which can be energized by an AC mains supply.

The wide screen processor 30 is shown in more detail in FIG. 3. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor, which are in common with both the $1f_H$ and the $2f_H$ chassis, for example the PIP circuit, are shown in FIG. 6. A picture-in-picture processor 320, which forms a significant part of the PIP circuit 301, is shown in more detail in FIG. 7. The gate array 300 is shown in more detail in FIG. 8. A number of the components shown in FIG. 3, forming parts of the main and auxiliary signal paths, have already been described in detail.

The second tuner 208 has associated therewith an IF stage 224 and an audio stage 226. The second tuner 208 also operates in conjunction with the WSP μP 340. The WSP μP 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west adjust and horizontal phase, through respective interface circuits 254, 256 and 258.

The gate array 300 is responsible for combining video information from the main and auxiliary signal paths to implement a composite wide screen display, for example one of those shown in the different parts of FIG. 1. Clock information for the gate array is provided by phase locked loop 374, which operates in conjunction with low pass filter 376. The main video signal is supplied to the wide screen processor in analog form, and Y U V format, as signals designated Y_M, U_M and V_M. These main signals are converted from analog to digital form by analog to digital converters 342 and 346, shown in more detail in FIG. 4.

The color component signals are referred to by the generic designations U and V, which may be assigned to either R-Y or B-Y signals, or I and Q signals. The sampled luminance bandwidth is limited to 8 MHz because the system clock rate is $1024f_H$, which is approximately 16 MHz. A single analog to digital converter and an analog switch can be used to sample the color component data because the U and V signals are limited to 500 KHz, or 1.5 MHz for wide I. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, . . . , without interruption. The Y and UV data streams out of the analog to digital converters 342 and 346 are shifted because the analog to digital converters each have 1 clock cycle of delay. In order to accommodate for this data shift, the clock gating information from the interpolator control 349 of main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example paired pixel compression and dithering and dedithering. Moreover, different dithering sequences involving different numbers of bits and different paired pixel compressions involving different numbers of bits are contemplated. One of a number of particular data reduction and restoration schemes can be selected by the WSP μP 340 in order to maximize resolution of the displayed video for each particular kind of picture display format.

The gate array includes interpolators which operate in conjunction with line memories, which .may be implemented as FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the $1f_H$ to $2f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SW5 selects a synchronizing signal for the encoder 227 from either the gate array, C_SYNC_MN, or from the PIP circuit, C_SYNC_AUX.

Switch SW6 selects between Y_M and C_SYNC_AUX as synchronizing signal for the wide screen panel output.

Portions of the horizontal synchronizing circuit are shown in more detail in FIG. 27. Phase comparator 228 is part of a phase locked loop including low pass filter 230, voltage controlled oscillator 232, divider 234 and capacitor 236. The voltage controlled oscillator 232 operates at $32f_H$, responsive to a ceramic resonator or the like 238. The $32f_H$ REF output of the resonator is an input to the $1f_H$ to $2f_H$ converter 40. The output of the voltage controlled oscillator is divided by 32 to provide a proper frequency second input signal to phase comparator 228. The output of the divider 234 is a $1f_H$ REF timing signal, supplied to the wide screen processor and to the $1f_H$ to $2f_H$ converter. The $32f_H$ REF and $1f_H$ REF timing signals from the one-chip are supplied to a divide by 16 counter 400. A $2f_H$ output is supplied to a pulse width circuit 402. Presetting divider 400 by the $1f_H$ REF signal assures that the divider operates synchronously with the phase locked loop of the video signals input section. Pulse width circuit 402 assures that a $2f_H$-REF signal will have an adequate pulse width to assure proper operation of the phase comparator 404, for example a type CA1391, which forms part of a second phase locked loop including low pass filter 406 and $2f_H$ voltage controlled oscillator 408. Voltage controlled oscillator 408 generates an internal $2f_H$ timing signal, which is used for driving the progressively scanned display. The other input signal to phase comparator 404 is the $2f_H$ flyback pulses from the deflection circuit 50, or a timing signal related thereto. The use of the second phase locked loop including phase comparator 404 is useful for assuring that each $2f_H$ scanning period is symmetric within each $1f_H$ period of the input signal. Otherwise, the display may exhibit a raster split, for example, wherein half of the video lines are shifted to the right and half of the video lines are shifted to the left.

A block diagram of a circuit 900 for converting an interlaced scanned to progressive scanned display is shown in FIG. 20. The circuit can be implemented as an integrated circuit. The circuit provides all of the signal processing functions needed for converting interlaced component video signals to progressive, noninterlaced format. In addition, the circuit provides an adjustable amount of noise reduction for signals where this might be desirable. The circuit as shown can be used with component Y, U and V signals, and in conjunction with a frame memory 902 in the form of a video RAM integrated circuit, for example type HM53051P available from Hitachi.

Component chrominance signals U_C and V_C are internally clamped with a back porch clamp to a voltage corresponding to digital zero. Following the clamp circuits 904 and 906, an analog multiplexer 908 alternately samples each chrominance component at a 2 MHz rate. These samples are then converted to an 8-bit digital signal by a flash ND converter 910 operating at a 4 MHz rate. The samples pass through the chrominance noise reduction circuit 912 to the speedup memory 914. The speedup memory stores only the 53 μsec active portion of each incoming video line, so only 106 samples of each chrominance component are stored. The memory is read at twice the writing rate, producing two identical lines of chrominance s information. The signal is blanked to zero during the interval when no samples are available from the memory by blanking circuit 916. The two chrominance components are separated by demultiplexer 918 and converted to analog form using two D/A converters 920 and 922. The reference for the D/A converters is adjustable by the serial bus which interfaces with a bus control circuit 924; and, can be used as a color saturation adjustment, if desired.

The luminance signal is Y_C internally clamped by clamp 926 during back porch to a level which can be set via the serial control bus. This signal is converted to an 8-bit digital format using a flash A/D converter 928 operating at 16 MHz. It then passes through a circuit 930 which can be used to provide automatic black level adjustment, if desired. The luminance is low pass filtered using a filter 932 with a characteristic of:

$$H(z)=(1+z^{-1})^2(1+z^{-2})^2/16$$

This low passed signal is then subsampled by circuit 934 at a 4 MHz rate. The subsampled signal is interpolated by interpolator 936 back to a 16 MHz rate using the same low pass filter characteristic and subtracted from a delayed version of the original luminance signal at summing junction 938 to produce a signal containing only high frequency luminance components. The high frequency luminance signal passes through a non-linear "coring" or dead band circuit 940 to remove small signals which might be noise. The breakpoints for the non-linear characteristic can be adjusted by the serial control bus.

The subsampled low frequency signal passes through a recursive noise reduction circuit 942 and is then interpolated back to 16 MHz by interpolator 944 to be added to the cored high frequency signal at summing junction 946. The luminance is then converted to a progressive or double-scan format using a speedup memory 948. Only 53 msec of signal corresponding to 848 samples is stored in the memory. This luminance memory is read twice for each incoming horizontal line of video. Another, smaller speedup memory 950 contains information representing the difference between the interpolated luminance for the "in-between" line and the incoming luminance. The smaller speedup memory contains low frequency information only, holding 212 samples. The first time the luminance speedup memory 948 is read, the difference signal from the other speedup memory 950 is interpolated by interpolator 952 to full rate and added to the luminance signal at summing junction 970. This forms a signal having low frequency components that correspond to interpolated luminance, and high frequency components that correspond to incoming luminance. The second time the luminance signal is read, the difference signal is not added. The output is then a double speed version of the input.

Blanking by circuit 954 is inserted during the interval that no speedup memory data is available. The level of this inserted blanking is adjustable by the chassis microprocessor, using the serial control bus. Three signals are required: DATA, CLOCK and ENABLE. The sped-up digital signal is converted to analog form by a D/A converter 956. The reference for the converter is adjustable by way of the control bus.

Line interpolation of low frequency luminance information is done entirely at the reduced (4 MHz) sample rate using motion adaptive processing. The external 1 Mbit video RAM 902, used as frame memory, stores two fields of 8-bit low frequency luminance and one field of 3-bit motion signal. Communication with the video RAM is through frame memory interface 964. Each stored field represents a maximum of 256 active video lines, each of which contains 212 active samples. A spatial interpolation (for use in areas of motion) is formed by passing the noise reduced low frequency luminance through a $1f_H$ delay 958 and averaging the delayed and undelayed signals in circuit 960. The $1f_H$ delay output is also stored in the frame memory. One field minus ½ line later it is read out as a field delayed signal. This provides a temporally interpolated signal for use in areas without motion.

The field delayed signal is stored again in the frame memory and read out after another field minus ½ line. This results in a net delay of one frame. The frame delayed signal is compared to the undelayed signal on a sample-by-sample basis in the motion detector 962. A 3-bit motion signal representing eight different levels of motion is produced. The motion signal is also stored in the frame memory and read one field plus ½ line later. The field delayed motion is compared to the undelayed motion and the signal representing the greater amount of motion is selected in circuit 978. This motion signal is used to control a "soft switch" or "fader" 966 which can select between the spatially interpolated and the temporally interpolated signals in eight different gradations.

The undelayed low frequency luminance signal is subtracted from the output of the soft switch at summing junction 968, producing a signal which represents the difference between the interpolated and the incoming low frequency luminance. This difference signal is stored in a separate speedup memory 950 as described above.

The recursive noise reduction circuit 942 can be of the form shown in block diagram in FIG. 21. The input signal is subtracted from a delayed version of the output, delayed by circuit 986, at summing junction 980. If the delay value is properly chosen, for most signals the input will be nearly the same as the delayed output, and the difference will be small. This difference will then pass through the limiter block 982 without limiting (when not limiting, the limiter has a gain of ⅜). When the limiter output is added to the circuit input at summing junction 984, most of the input signal is canceled, being replaced with delayed output signal. Small changes such as noise are thereby reduced. When the input is significantly different than the delayed output, limiting occurs. The resulting output is then nearly equal to the input. The threshold where limiting occurs is adjustable by means of the serial control bus, allowing the amount of noise reduction to be varied from zero (threshold of zero) to any desired value.

For the low frequency luminance noise reduction, the delay in the above circuit is equal to one frame time. Accordingly, noise on stationary pictures is reduced by a temporal low pass filter. The chrominance noise reduction circuit is composed of a cascade of two of these circuits, one with the delay equal to one sample time (0.5 μsec), and the other with the delay equal to one scanning line time (64 μsec). The first circuit filters noise in the horizontal direction, and the second filters it in the vertical direction.

Circuit 900 may incorporate the $1f_H$ to $2f_H$ converter 40, explained in detail in conjunction with FIG. 27. The reference numerals from FIG. 27 are therefore repeated in FIG. 20, at the lower left hand corner. Timing signals used in the circuit are derived from a 32 MHz oscillator 238 which is phase locked to 1024 times the horizontal deflection frequency of the display. A flyback signal from the deflection circuit is applied to the $2f_H$ input to accomplish this. An external L-C network 974 establishes the center frequency of the 32 MHz oscillator, while an external R-C loop filter 406 sets the phase locked loop characteristics. The phasing of the internal timing signals (clamp gates, blanking, etc.) can be adjusted relative to the $2f_H$ input by means of the serial bus. A $1f_H$ input is also necessary to establish which of the $2f_H$ pulses occur at the beginning of the incoming line and which occur at the middle of the incoming line.

A vertical pulse input, for example $f_{Vm}$, is used to establish the beginning of a field, so that the proper lines are stored in the frame memory. The number of lines that elapse between the leading edge of the vertical pulse and the beginning of memory operation is adjustable by means of a bus command. The circuitry for generating an internal $2f_H$ signal for driving the horizontal deflection system has already been described. The phasing of the $2f_H$ output with respect to the $1f_H$ input can be adjusted using the serial bus.

The deflection circuit 50 is shown in more detail in FIG. 22. A circuit 500 is provided for adjusting the vertical size of the raster, in accordance with a desired amount of vertical overscan necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, that vertical ramp capacitor 504 charges more slowly and to a smaller peak value. Variable current source 508 is responsive to a vertical size adjust signal, for example in analog form, generated by a vertical size control circuit 1030 shown in FIG. 49. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection is provided by phase adjusting circuit 518, East-West pin correction circuit 514, a $2f_H$ phase locked loop 520 and horizontal output circuit 516.

The RGB interface circuit 60 is shown in more detailed in FIG. 25. The signal which is to be ultimately displayed will be selected between the output of the $1f_H$ to $2f_H$ converter 40 and an external RGB input. For purposes of the wide screen television described herein, the external RGB input is presumed to be a wide format display ratio, progressively scanned source. The external RGB signals and a composite blanking signal from the video signals input section 20 are inputs to an RGB to Y U V converter 610, shown in more detail in FIG. 26. The external $2f_H$ composite synchronizing signal for the external RGB signal is an input to external synchronizing signal separator 600. Selection of the vertical synchronizing signal is implemented by switch 608. Selection of the horizontal synchronizing signal is implemented by switch 604. Selection of the video signal is implemented by switch 606. Each of the switches 604, 606 and 608 is responsive to an internal/external control signal generated by the WSP μP 340. Selection of internal or external video sources is a user selection. However, if a user inadvertently selects an external RGB source, when no such source is connected or turned on, or if the external source drops out, the vertical raster will collapse, and serious damage to the cathode ray tube(s) can result. Accordingly, an external synchronizing detector 602 checks for the presence of an external synchronizing signal. In the absence of such a signal, a switch override control signal is transmitted to each of switches 604, 606 and 608, to prevent selection of the external RGB source if the signal therefrom is not present. The RGB to YUV converter 610 also receives tint and color control signals from the WSP μP 340.

The RGB to YUV converter 610 is shown in more detail in FIG. 26. Synchronizing components of the RGB signals are stripped by circuits 612, 614 and 616 respectively. The signals are algebraically combined by summing circuits 618, 620 and 622 to define R-Y (U), B-Y (V) and Y signals. Bit rate multipliers 628 and 634 alter the phase of the R-Y and B-Y signals in manner which changes the effective color of the signals, even though the phase is not quite proper for the R-Y and B-Y phasers. Similarly, bit rate multipliers 640 and 638 change the phase to alter the effective tint, notwithstanding the variance of the R-Y and B-Y signals from the proper phaser angle. The color and tint control signals can be generated by the WSP μP 340, responsive to the chassis microprocessor. This enables convenient control of the color and tint characteristics of the external RGB signal, without undo additional circuitry and without the need to adjust the RGB source itself.

There is a discrepancy in the Y signal of 7.5 IRE with regard to the properly defined level of black. The blanking offset circuit 648 inserts a level shift of 7.5 IRE to compensate. The KEY signal is a control signal generated in the front porch of the video signal, after the trailing edge of the vertical synchronizing signal and prior to the start of active video. The KEY signal establishes when clamping in circuit 646 should take place. Delay circuits 624 and 626 establish the correct phase relationship of the R-Y, B-Y and Y signals, notwithstanding the subsequent variations responsive to the color and tint control commands.

An overall block diagram for a wide screen television in accordance with inventive arrangements, and adapted to operate with $1f_H$ horizontal scanning, is shown in FIG. 4 and generally designated 11. Those parts of television 11 which correspond substantially to a counterpart in television 10 shown in FIG. 2 have been assigned the same reference numeral. The television 11 generally comprises a video signals input section 21, a chassis or TV microprocessor 216, a wide screen processor 31, a horizontal deflection circuit 52, a vertical deflection circuit 56, RGB matrix 241, kine drivers 242, direct view or projection tubes 244 and a power supply 70. The $1f_H$ to $2f_H$ converter and RGB interface are not utilized. Accordingly, there is no provision for displaying an external wide format display ratio RGB signal at a $2f_H$ scanning rate. The grouping of various circuits into different functional blocks is made for purposes of convenience in description, and is not intended as limiting the physical position of such circuits relative to one another.

The video signals input section 21 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 203, which performs a number of functions related to tuning, horizontal and vertical deflection and video controls. The particular one-chip shown is industry designated type TA8680. The baseband video signal VIDEO OUT developed in the one-chip and resulting from the signal from first tuner 206 is an input to both video switch 200 and the TV1 input of wide screen processor 31. Other baseband video inputs to video switch 200 are designated AUX1 and AUX 2. These might be used for video cameras, video recorders and the like. The output of the video switch 200, which is controlled by the chassis or TV microprocessor 216 is designated SWITCHED VIDEO. The SWITCHED VIDEO is another input to wide screen processor 31.

Figure 5:
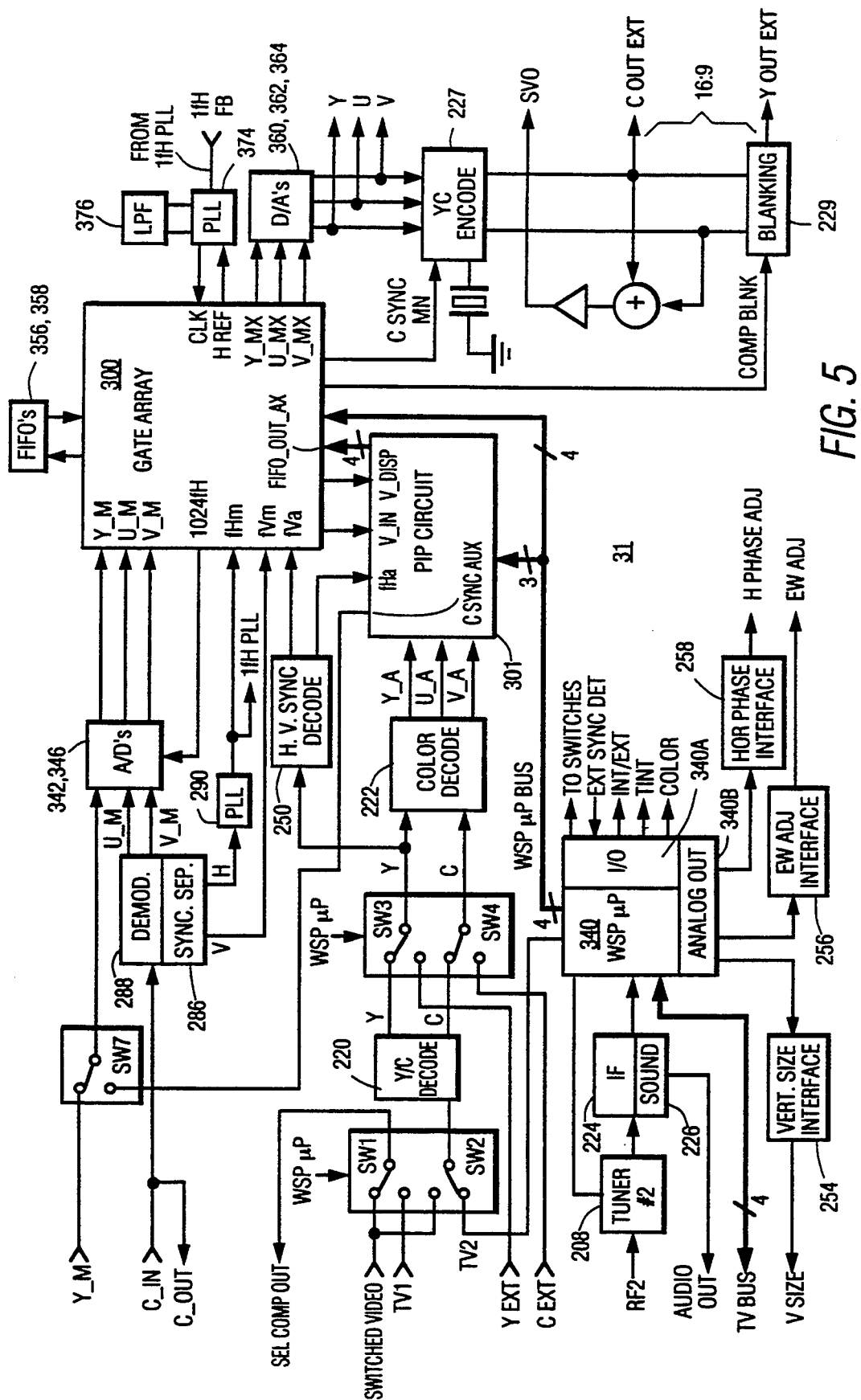
FIG. 5 is a block diagram of the wide screen processor shown in FIG. 4.

With further reference to FIG. 5, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. A further video source S1 is also an input to the Y/C decoder 210. Source S1 represents an S-VHS source, and consists of separating luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. A decoder/demodulator in the wide screen processor develops color difference signals U_M and V_M. The Y_M. U_M, and V_M signals are converted to digital form in the wide screen processor for further signal processing in the gate array 300.

The second tuner 208, functionally defined as part of the wide screen processor 31, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220, the luminance and chrominance signals of an external video source, designated Y_EXT/C_EXT, and Y_M, C_IN. The Y_EXT/C_EXT signals correspond to the S-VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

The wide screen processor 30 comprises a picture in picture processor 320 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(i). The picture-in-picture processor 320 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

The horizontal and vertical synchronizing components of the main signal are developed in a sync separator 286, forming part of a demodulator 288, forming part of the wide screen processor. The horizontal synchronizing component is an input to a $1f_H$ phase locked loop 290. Horizontal and vertical synchronizing signals of the auxiliary video signal are developed by sync separator 250 in the wide screen processor 31. A horizontal deflection circuit 52 operates in conjunction with the one-chip, responsive to east-west pin adjust and horizontal phase control signals from the WSP μP 340. A vertical deflection circuit 56 is responsive to a vertical size control circuit 54. The vertical size control circuit 54 is responsive to a vertical size control signal from the WSP μP 340, and operates in a manner similar to the vertical size control for the $2f_H$ chassis described above.

The wide screen processor 31 is shown in more detail in FIG. 5. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor, which are in common with both the $1f_H$ and the $2f_H$ chassis, for example the PIP circuit, are shown in FIG. 6. A picture-in-picture processor 320, which forms a significant part of the PIP circuit 301, is shown in more detail in FIG. 7. The gate array 300 is shown in more detail in FIG. 8. A number of the components shown in FIG. 3, forming parts of the main and auxiliary signal paths, have already been described in detail. A number of other components, such as the second tuner 208, the WSP μP 340 and interface outputs, the analog to digital and digital to analog converters, the gate array 300, the PIP circuit 301 and the PLL 374 operate substantially as explained in connection with FIG. 3 and such details are not repeated.

The main video signal is supplied to the wide screen processor in analog form, as signals designated Y_M and C_IN. Signal C_IN is decoded into color difference signals U_M and V_M by demodulator 288. The main signals are converted from analog to digital form by analog to digital converters 342 and 346, shown in more detail in FIG. 6. The auxiliary video data is also in analog form, and Y U V format, as signals designated Y_A, U_A and V_A. In the PIP circuit 301, these auxiliary signals are converted to digital form, data compressed, stored in a field memory for synchronization with the main signal, and provided to the gate array 300 for combination with the main signal as required by the selected picture display format, for example by multiplexing on a line to line basis. The operation of the PIP circuit is explained more fully in connection with FIG. 6. The PIP circuit and/or the gate array may also include means for enhancing the resolution of the auxiliary data notwithstanding the data compression. The analog form signals, designated Y, U and V, are supplied to an encoder 227 to define the wide format ratio output signal Y_OUT_EXT/C_OUT_EXT which, in this case, are inputs to the one-chip 203. Encoder 227 receives only the C_SYNC_MN signal from the gate array. Switch SW5 selects between Y_M and the C_SYNC_AUX signal as an input to the analog to digital converters. The one-chip generates YUV, format signals for the RGB matrix 241, which supplies RGB format signals to the kine drivers 242 from the Y_OUT_EXT and C_OUT_EXT signals.

FIG. 6 is a block diagram showing further details of the wide screen processors 30 and 31 common to the $1f_H$ and $2f_H$ chassis, shown in FIGS. 3 and 5 respectively. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats. The picture-in-picture processor 320 is shown in more detail in FIG. 7. The principal components of the picture-in-picture processor are an analog-to-digital converter section 322, an input section 324, a fast switch (FSW) and bus section 326, a timing and control section 328 and a digital-to-analog converter section 330. The timing and control section 328 is shown in more detail in FIG. 14.

The picture-in-picture processor 320 may be embodied as an improved variation of a basic CPIP chip developed by Thomson Consumer Electronics, Inc. The basic CPIP chip is described more fully in a publication entitled The CTC 140 Picture in Picture (CPIP) Technical Training Manual, available from Thomson Consumer Electronics, Inc., Indianapolis, Ind. A number of special features or special effects are possible, the following being illustrative. The basic special effect is a large picture having a small picture overlaying a portion thereof as shown in FIG. 1(c). The large and small pictures can result from the same video signal, from different video signals and can be interchanged or swapped. Generally speaking, the audio signal is switched to always correspond to the big picture. The small picture can be moved to any position on the screen or can step through a number of predetermined positions. A zoom feature increases and decreases the size of the small picture, for example to any one of a number of preset sizes. At some point, for example the display format shown in FIG. 1(d), the large and small pictures are in fact the same size.

In a single picture mode, for example that shown in FIGS. 1 (b), 1(e) or 1(f) a user can zoom in on the content of the single picture, for example, in steps from a ratio of 1.0:1 to 5.0:1. While in the zoom mode a user may search or pan through the picture content enabling the screen image to move across different areas of the picture. In either event, either the small picture or the large picture or the-zoomed picture can be displayed in freeze frame (still picture format). This function enables a strobe format, wherein the last nine frames of video can be repeated on the screen. The frame repetition rate can be changed from thirty frames per second to zero frames per second.

The picture-in-picture processor used in the wide screen television according to another inventive arrangement differs from the present configuration of the basic CPIP chip described above. If the basic CPIP chip were used with a television having a 16×9 screen, and without a video speed up circuit, the inset pictures would exhibit aspect ratio distortion, due to the effective 4/3 times horizontal expansion resulting from scanning across the wider 16×9 screen. Objects in the picture would be horizontally elongated. If an external speed up circuit were utilized, there would be no aspect ratio distortion, but the picture would not fill the entire screen.

Existing picture-in-picture processors based on the basic CPIP chip as used in conventional televisions are operated in a particular fashion having certain undesirable consequences. The incoming video is sampled with a 640$f_H$ clock which is locked to the horizontal synchronizing signal of the main video source. In other words, data stored in the video RAM associated with the CPIP chip is not orthogonally sampled with respect to the incoming auxiliary video source. This is a fundamental limitation on the basic CPIP method of field synchronization. The nonorthogonal nature of the input sampling rate results in skew errors of the sampled data. The limitation is a result of the video RAM used with the CPIP chip, which must use the same clock for writing and reading data. When data from the video RAM, such as video RAM 350, is displayed, the skew errors are seen as random jitter along vertical edges of the picture and are generally considered quite objectionable.

The picture-in-picture processor 320, according to an inventive arrangement and unlike the basic CPIP chip, is adapted for asymmetrically compressing the video data in one of a plurality of selectable display modes. In this mode of operation, the pictures are compressed 4:1 in the horizontal direction and 3:1 in the vertical direction. This asymmetric mode of compression produces aspect ratio distorted pictures for storage in the video RAM. Objects in the pictures are squeezed horizontally. However, if these pictures are read out normally, as for example in the channel scan mode, for display of a 16×9 format display ratio screen, the pictures appear correct. The picture fills the screen and there is no aspect ratio distortion. The asymmetric compression mode according to this aspect of the invention makes it possible to generate the special display formats on a 16×9 screen without external speed up circuitry.

Figure 14:
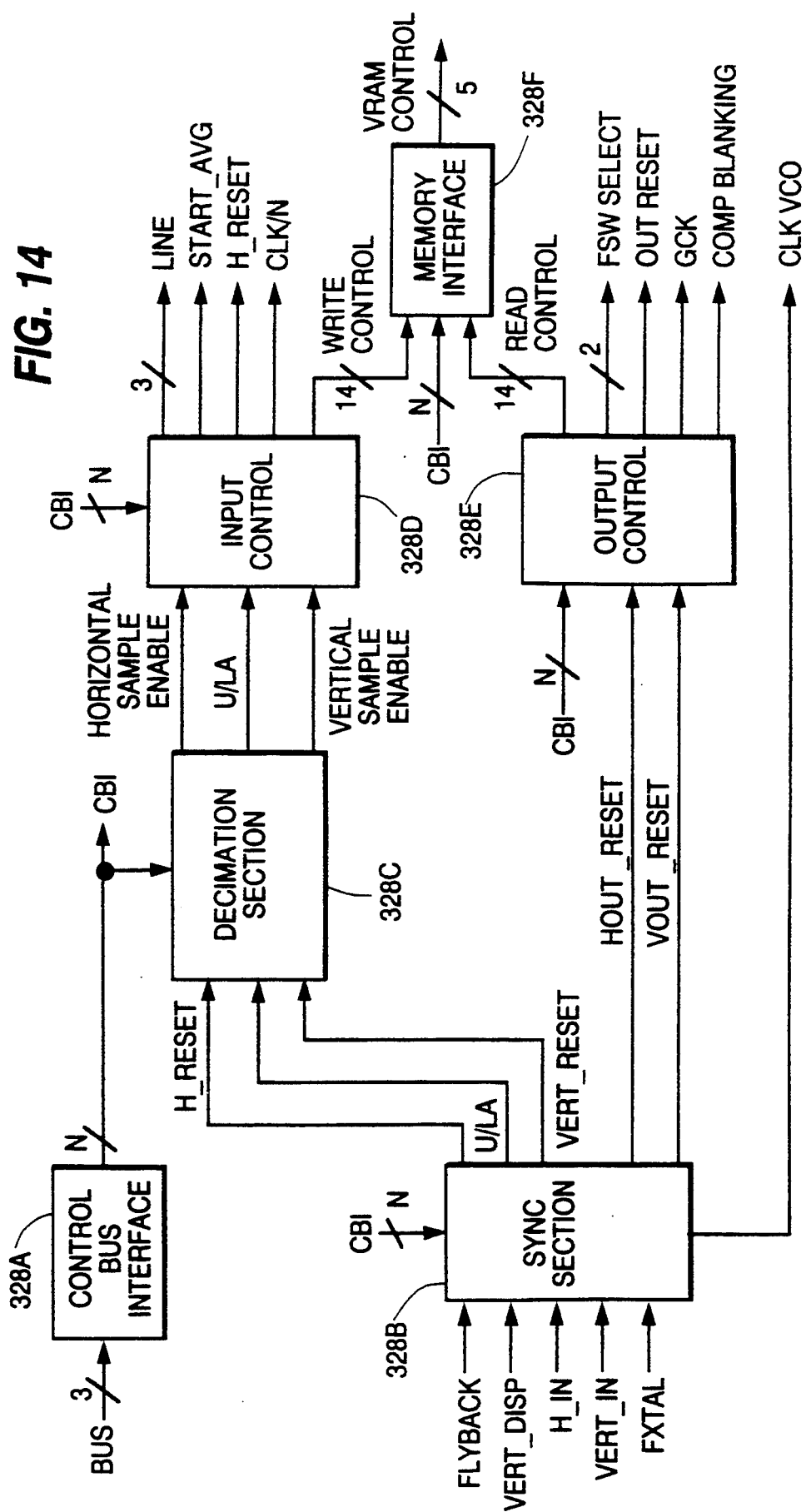
FIG. 14 is a block diagram of the the timing and control section of the picture-in-picture processor of FIG. 7.

FIG. 14 is a block diagram of the timing and control section 328 of the picture-in-picture processor, for example a modified version of the CPIP chip described above, which includes a decimation circuit 328C for implementing the asymmetric compression as one of a plurality of selectable display modes. The remaining display modes can provide auxiliary pictures of different sizes. Each of horizontal and vertical decimation circuits comprises a counter which is programmed for a compression factor from a table of values under the control of the WSP μP 340. The range of values can be 1:1, 2:1, 3:1 and so on. The compression factors can be symmetric or asymmetric, depending upon how the table is set up. Control of the compression ratios can also be implemented by fully programmable, general purpose decimation circuits under the control of the WSP μP 340. The decimation circuit 328C is shown more fully in FIGS. 15–18.

FIG. 15 is a block diagram of the circuit for implementing the horizontal compression. The circuit utilizes a decimation circuit formed by a counter 850, designated MOD_N_CNTR1. The numerical value at the N input is a horizontal N factor HOR_N_FACTOR. The horizontal N factor is related to the extent to which the picture represented by the video data of the auxiliary signal will be reduced in size for display as a PIP or POP, and accordingly, is also a measure of the rate at which pixels within a line are subsampled. The numerical input to the load value input is set to "0". The ripple carry out RCO output is a horizontal line sample-enable signal. FIG. 16 is a block diagram of the circuit for implementing the vertical compression. This circuit is based on a decimation circuit formed by a counter 858 designated MOD_N_CNTR2. The numerical value at the N input is a vertical N factor VERT_N_FACTOR. The vertical N factor is also related to the extent to which the picture represented by the video data of the auxiliary signal will be reduced in size for display as a PIP or POP, but in this case, is a measure of how many horizontal lines are selected for subsampling. The numerical input to the load value input is determined by a numerical calculation based on the vertical N factor. The vertical N factor is added to "2", the resulting sum is divided by "2", and the result of the division is gated by an upper/lower field type signal U/L_FIELD_TYPE. added to "2". The output of the counter 858 is a vertical line sample enable signal.

The horizontal and vertical N factors are generated by a circuit 859 shown in FIG. 17. The input is an N_FACTOR value ranging from "0" through "7". Each N value corresponds to pairs of horizontal and vertical compression ratios, as shown in the table of FIG. 18. The N factors are provided by the WSP μP 340. Circuit 859 comprises multiplexers 862 and 864 and a compare to "6" circuit 860. For each N factor other than "6", the horizontal and vertical compression ratios are symmetric, resulting from the "0" inputs of the multiplexers. When the N factor is "6", the "1" inputs of the multiplexers are gated as the outputs. These inputs result in the asymmetric compression of 4:1 horizontally and 3:1 vertically.

The counters in the decimation circuits function are shown as integral number decimators. However, the processing does not have to be limited to compression of the images in integer increments, provided that the horizontal compression factor is 4/3 times the vertical compression factor. Asymmetric compression is also not limited to wide screen applications having a display format ratio of 16×9. If the format display ratio were to be 2:1, for example, the horizontal compression factor would be 3/2 times the vertical compression factor.

Control of the compression ratios can also be implemented by fully programmable, general purpose decimation circuits under the control of the WSP μP 340, as shown in FIGS. 19(a) and 19(b). Horizontal compression factors are generated by the circuit in FIG. 19(a), which comprises a summing junction 866, an array 868 of eight OR gates and a latch 870. Each bit of the eight bit output of the array 868 is HI when the H_RESET occurs. When the H_RESET signal is low, the output of the array 868 equals the input of the array, which is the output of summing junction 866. Vertical compression factors are generated by the circuit in FIG. 19(b), which comprises a summing junction 872, a multiplexer 874 and a latch 876. In each circuit, the carry in CI input of the summing circuit is tied to a voltage for a fixed logical high signal. In each circuit, the carry out CO output of the summing circuit is the respective sample enable signal. In the circuit of FIG. 19(b), the 1 input to the multiplexer is tied to ground for a fixed logical low signal. The horizontal and vertical compression factors can be supplied by the WSP μP 340.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical sync pulses. These signals are processed in the picture-in-picture processor for the various full screen modes such as zoom, freeze and channel scan. During the channel scan mode, for example, the horizontal and vertical sync present from the video signals input section will have many discontinuities because the signals sampled (different channels) will have non-related sync pulses and will be switched at seemingly random moments in time. Therefore the sample clock (and read/write video RAM clock) is determined by the free running oscillator. For freeze and zoom modes, the sample clock will be locked to incoming video horizontal sync, which in these special cases is the same as the display clock frequency.

Referring again to FIG. 6, Y, U, V and C_SYNC (composite sync) outputs from the picture-in-picture processor in analog form can be re-encoded into Y/C components by encode circuit 366, which operates in conjunction with a 3.58 MHz oscillator 380. This Y/C_PIP_ENC signal may be connected to a Y/C switch, not shown, which enables the re-encoded Y/C components to be substituted for the Y/C components of the main signal. From this point on, the PIP encoded Y, U, V and sync signals would be the basis for horizontal and vertical timing in the rest of the chassis. This mode of operation is appropriate for implementing a zoom mode for the PIP, based upon operation of the interpolator and FIFO's in the main signal path.

In a multichannel mode, for example that shown in FIG. 1(i), twelve channels of a predetermined scan list can be displayed in twelve small pictures simultaneously. The picture-in-picture processor has an internal clock responsive to a 3.58 MHz oscillator 348. The incoming auxiliary signal is converted from analog to digital form, and responsive to the chosen special effect, is loaded into a video RAM 350. In the embodiments in the Technical Training Manual described above, the compiled special effect is converted back to analog form in the picture-in-picture processor prior to combination with main signal video data: However, in the wide screen televisions described herein, and due in part to limitations on the number of different clock frequencies which are feasible, the auxiliary data is a direct output from the video RAM 350, without further processing by the picture-in-picture processor 320. Minimizing the number of clock signals advantageously reduces radio frequency interference in the circuitry of the televisions.

Figure 7:
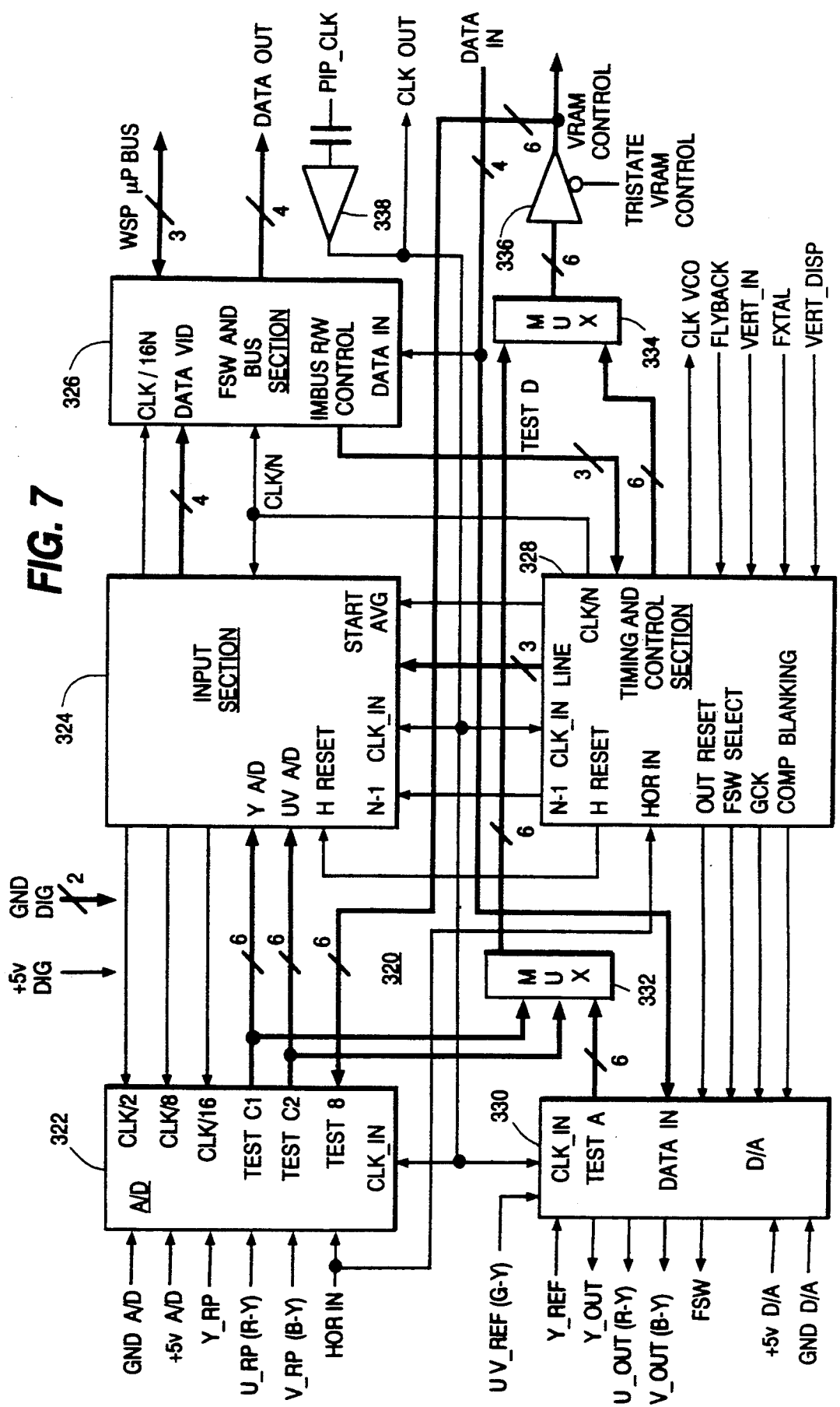
FIG. 7 is a block diagram of the picture-in-picture processor shown in FIG. 6.

With further reference to FIG. 7, the picture-in-picture processor 320 comprises analog to digital converting-section 322, input section 324, fast switch FSW and bus control section 326, timing and control section 328 and digital to analog converting section 330. In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8-bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, paired pixel compression and dithering and dedithering. A dedithering circuit would be operatively disposed downstream of the video RAM 350, for example in the auxiliary signal path of the gate array, as explained in more detail below. Moreover, different dithering and dedithering sequences involving different numbers of bits and different paired pixel compressions involving different number of bits are contemplated. One of a number of particular data reduction and restoration schemes can be selected by the WSP μP in order to maximize resolution of the displayed video for each particular kind of picture display format. Resolution processing circuits are explained in detail in conjunction with FIGS. 56-70.

The luminance and color difference signals are stored in an 8:1:1 six-bit Y, U, V fashion. In other words, each component is quantized into six-bit samples. There are eight luminance samples for every pair of color difference samples. The picture-in-picture processor 320 is operated in a mode whereby incoming video data is sampled with a 640$f_H$ clock rate locked to the incoming auxiliary video synchronizing signal instead. In this mode, data stored in the video RAM is orthogonally sampled. When the data is read out of the picture-in-picture processor video RAM 350, it is read using the same 640$f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video sources might be expected to be synchronous only in that instance where they are displaying signals from the same video source.

Further processing is required in order to synchronize the auxiliary channel, that is the output of data from the video RAM 350, to the main channel. With reference again to FIG. 6, two four bit latches 352A and 352B are used to recombine the 8-bit data blocks from the video RAM 4-bit output port. The four bit latches also reduce the data clock rate from 1280$f_H$ to 640$f_H$.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Briefly, synchronization of the auxiliary video data with main video data is accomplished by utilizing the video RAM 350 as a field memory and a first in first out (FIFO) line memory device 354 for expanding the signal. The auxiliary signal path interpolator 359 can correct for speedup in the FIFO 354. The size of FIFO 354 is 2048×8. Problems which can occur in synchronizing the main and auxiliary signals include read/write pointer collisions in the auxiliary oath FIFO 354 and maintaining interlace integrity. A field synchronization system which avoid such read/write pointer collisions and which maintains interlace integrity is explained in conjunction with FIGS. 28-36.

The gate array 300 is common to both wide screen processors 30 and 31. The main signal path 304, auxiliary signal path 306 and output signal path 312 are shown in block diagram form in FIG. 8. The gate array also comprises a clocks/sync circuit 320 and a WSP μP decoder 310. Data and address output lines of the WSP μP decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating explanation of the inventive arrangements.

The gate array is responsible for expanding, compressing and cropping video data of the main video channel, as and if necessary, to implement different picture display formats. The luminance component Y_MN is stored in a first in first out (FIFO) line memory 356 for a length of time depending on the nature of the interpolation of the luminance component. The combined chrominance components U/V_MN are stored in FIFO 358. Auxiliary signal luminance and chrominance components Y_PIP, U_PIP and V_PIP are developed by demultiplexer 355. The luminance component undergoes resolution processing, as desired, in circuit 357, and is expanded as necessary by interpolator 359, generating signal Y_AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restore pixels to the auxiliary video signal to replace those lost during data compression, or reduction. The resolution processing may correspond to the resolution processing undertaken by circuit 370 shown in FIG. 6. As an example, circuit 370 may be a dithering circuit and circuit 357 may be a dedithering circuit.

Interpolation of the auxiliary signal can take place in the auxiliary signal path 306, shown in more detail in FIG. 12. The PIP circuit 301, shown in FIG. 6, manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at $640f_H$) and 2 other bits. These two other bits hold either fast switch data (FSW_DAT) or part of a U or V sample (sampled at 80 $f_H$). The FSW_DAT values indicate which type of field was written into video RAM, as follows:

FSW_DAT=0: No Picture;
FSW_DAT=1: Upper (Odd) Field; and,
FSW_DAT=2: Lower (Even) Field.

The fields occupy spatial positions within the video RAM having boundaries defined by horizontal and vertical addresses, as suggested by the memory position diagram in FIG. 37. The boundary is defined at those addresses by a change in the fast switch data from no picture to valid field, and vice versa. These transitions in fast switch data define the perimeter of the PIP insert, which is also referred to as the PIP box or PIP overlay. It will be appreciated that the image aspect ratio of objects in the PIP picture can be controlled independently of the format display ratio of the PIP box or overlay, for example, 4×3 or 16×9. The position of the PIP overlay on the screen will be determined by the starting address of the read pointer of the video RAM at the start of the scanning for each field of the main signal. Since there are two fields of data stored in the video RAM 350, and the entire video RAM 350 is read during the display period, both fields are read during the display scan. The PIP circuit 301 will determine which field will be read out of the memory to be displayed through the use of the fast switch data and the start position of the read pointer. It might seem logical that if the display, which is locked to the main video source, were displaying the upper field of the main picture then the portion of the video RAM corresponding to the upper field of the auxiliary picture would be read out of the video RAM, converted to analog data, and displayed.

This would work well for about half of all possible phase relations between the main and auxiliary video sources. A problem arises because reading the video RAM is always faster than writing the video RAM for compressed pictures in the PIP mode. The read memory pointer may overtake the write pointer if the same field type were being written and read at the same time. This would result in a 50% chance of a motion tear somewhere in the small picture. Accordingly, the PIP circuit always reads the opposite field type that is being written to overcome the motion tear problem. If the field type being read is the opposite type than that being displayed, then the even field stored in the video RAM is inverted by deleting the top line of the field when the field is read out of memory. The result is that the small picture maintains correct interlace without a motion tear. The end result of this field synchronization is that CPIP chip provides a signal which is called PIP_FSW This is the overlay signal which the PIP circuit provides to an analog switch, which switches between main and auxiliary channel Y/C (luminance and modulated chrominance video information) signals.

The auxiliary video input data is sampled at a $640f_H$ rate and stored in video RAM 350. The auxiliary data is read out of video RAM 350 is designated VRAM_OUT. The PIP circuit 301 also has the capability of reducing the auxiliary picture by equal integer factors horizontally and vertically, as well as asymmetrically. Referring again to FIG. 12, the auxiliary channel data is buffered and synchronized to the main channel digital video by the 4 bit latches 352A and 352B, the auxiliary FIFO 354, timing circuit 369 and synchronization circuit 371. The VRAM_OUT data is sorted into Y (luminance), U, V (color components), and FSW_DAT (fast switch data) by demultiplexer 355. The FSW_DAT indicates which field type was written into the video RAM. The PIP_FSW signal is received directly from the PIP circuit and applied to the output control circuit. Here the decision is made as to which field read out of video RAM is to be displayed. Finally, the auxiliary channel video component data is selected for output to the display through three output multiplexers 315, 317 and 319, shown in FIG. 8. Instead of overlaying the PIP small picture using an analog switch at a composite or Y/C interface, as has been the practice with the CPIP chip, the WSP μp 340 performs the PIP overlay digitally. However, as explained below, the PIP_FSW control signal is utilized together with the FSW_DAT signal to control the digital overlay.

The auxiliary channel is sampled at $640f_H$ rate while the main channel is sampled at a $1024f_H$ rate. The auxiliary channel FIFO 354 (2048×8) converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator to correctly display a 4×3 small picture. The amount of interpolator expansion required is 5/6. The expansion factor X is determined as follows:

$$X=(640/1024)*(4/3)=5/6$$

Therefore, regardless of how the small picture is reduced by the PIP processor, the small picture may be correctly displayed in 4×3 format on the display by setting the interpolator 359 to perform a 5/6 expansion (5 samples in, 6 samples out).

The PIP_FSW data does not provide a good enough method for interpreting which field of the CPIP VRAM should be displayed because the PIP video data is horizontally raster mapped to maintain a correct PIP aspect ratio. Although the PIP small picture would maintain correct interlace, the PIP overlay region would generally be the wrong horizontal size. The only case in which the PIP overlay size would be correct would be for a ⅔ expansion using the interpolator 359 which would result in a 16×9 small picture. For all other interpolator settings, the overlay box would remain 16×9 while the inset picture would vary horizontally. The PIP_FSW signal lacks information regarding the correct horizontal size of the PIP overlay. The video RAM data is read prior to the PIP circuit completing the synchronization algorithm. Thus, the fast switch data FSW_DAT which is embedded in the video RAM data stream VRAM_OUT corresponds to the field type written into the video RAM. The video RAM video component data (Y, U, V) has been corrected for motion tear and correct interlace, but the FSW_DAT has not been modified.

In accordance with an inventive arrangement, the PIP overlay box is the correct size because the FSW_DAT information is expanded and interpolated together with the video component data (Y, U, V). The FSW_DAT contains the correct sizing of the overlay region, however, it does not indicate which field is the correct field to display. The PIP_FSW and FSW_DAT can be used together to solve the problem of maintaining interlace integrity and the correct overlay size. In normal operation, as the CPIP chip might be used in 4×3 television receivers, the field placement in the video RAM is arbitrary. The fields may be aligned vertically, horizontally, or not aligned at all. In order to make the wide screen processor and the CPIP chip work compatibly, it is necessary that the PIP field locations not be stored on the same vertical lines. In other words, the PIP fields may not be programmed so that the same vertical addresses are used for both the upper and lower field types. It is convenient from a programming perspective to store the PIP fields in the video RAM 350 in a vertically aligned manner, as shown in FIG. 37.

A signal PIP_OVL forces the output control circuit 321 to display auxiliary data when this signal is active, that is, logically HI. A block diagram of a circuit for generating the PIP_OVL signal is shown in FIG. 38. Circuit 680 comprises a J-K flip/flop 682, the Q output of which is one input to multiplexer 688. The output of multiplexer 688 is an input to a D-type flip/flop 684, the Q output of which is the other input to multiplexer 688 and one input to AND gate 690. The PIP_FSW and SOL (start of line) signals are the J and K inputs respectively to flip/flop 682. An exclusive OR gate 686 has the two fast switch data bits FSW_DAT0 and FSW_DAT1 signals as inputs. Values of (1, 0) and (0, 1), which are logically exclusive inputs, indicate a valid field, even and odd respectively. Values of (0, 0) and (1, 1), which are not logically exclusive, indicate no valid video data. A transition from either of (0, 1) or (1, 0) to either of (0, 0) or (1, 1), or vice versa, indicates a boundary transition defining the PIP box or overlay The output of exclusive OR gate 686 is a second input to AND gate 690. The third input of AND gate 690 is the RD_EN_AX signal, the read enable signal for the auxiliary FIFO 354. The output of AND gate 690 is the PIP_OVL signal. Circuit 680 introduces a one line (field line) delay from the time PIP_FSW goes active to the actual enabling of the overlay region. This is accounted for in the video data path as the FIFO 354 also introduces a one field line delay in the PIP video data being displayed. Therefore, the PIP overlay is overlaid perfectly with the video data, although it will be one field line later than programmed through PIP circuit. The RD_EN_AX signal allows the PIP to be overlaid only when valid auxiliary FIFO data has been read out of the FIFO 354. This is necessary because FIFO data may be held after reading has ended. This may cause the PIP overlay logic to determine that the PIP overlay is active outside of valid PIP data. Enabling the PIP overlay with RD_EN_AX assures that PIP data is valid. In accordance with the inventive arrangements, the overlay or box for the small picture auxiliary video is correctly placed and sized regardless of how the auxiliary video has been expanded, compressed or interpolated. This works for small picture video sources which are from 4×3 formats, 16×9 formats and many other formats as well.

The chrominance components U_PIP and V_PIP are delayed by circuit 367 for a length of time depending on the nature of the interpolation of the luminance component, generating signals U_AUX and V_AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to the clock signal CLK, the start of line signal SOL, the H_COUNT signal, the vertical blanking reset signal and the output of the fast switch from the picture-in-picture processor and WSP μP 340. The multiplexed luminance and chrominance components Y_MX, U_MX and V_MX are supplied to respective digital-/analog converters 360, 362 and 364 respectively. The digital to analog converters are followed by low pass filters 361,363 and 365 respectively, shown in FIG. 6. The various functions of the picture-in-picture processor, the gate array and the data reduction circuit are controlled by WSP μP 340. The WSP μP 340 is responsive to the TV μP 216, being connected thereto by a serial bus. The serial bus may be a four wire bus as shown, having lines for data, clock signals, enable signals and reset signals. The WSP μP 340 communicates with the different circuits of the gate array through a WSP μP decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a $1024f_H$ clock.

As shown in FIG. 8, the luminance data Y_MN is routed through an interpolator 337 in the main signal path 304 Which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for compression, or whether the FIFO 356 precedes the interpolator 337, as required for expansion. The switches 323 and 331 are responsive to a route control circuit 335, which is itself responsive to the WSP μP 340. It will be remembered that during small picture modes the auxiliary video signal is compressed for storage in the video RAM 350, and only expansion is necessary for practical purposes. Accordingly, no comparable switching is required in the auxiliary signal path.

The main signal path is shown in more detail in FIG. 11(a). The switch 323 is implemented by two multiplexers 325 and 327. Switch 331 is implemented by multiplexer 333. The three multiplexers are responsive to the route control circuit 335, which is itself responsive to the WSP μP 340. A horizontal timing/synchronization circuit 339 generates timing signals controlling the writing and reading of the FIFOs, as well as latches 347 and 351, and multiplexer 353. The clock signal CLK and start of line signal SOL are generated by the clocks/sync circuit 320. An analog to digital conversion control circuit 369 is responsive to Y_MN. the WSP μP 340 and the most significant bit of UV_MN.

An interpolator control circuit 349 generates intermediate pixel position values (K), interpolator compensation filter weighting (C) and clock gating information CGY for the luminance and CGUV for the color components. It is the clock gating information which pauses (decimates) or repeats the FIFO data to allow samples not to be written on some clocks for effecting compression or some samples to be read multiple times for expansion.

Such a compression is illustrated in FIG. 11(b). The LUMA_RAMP_IN line represents luminance ramp video data being written into the FIFO. The WR_EN_MN_Y signal is active high, meaning that when this signal is high the data is being written into the FIFO. Every fourth sample is inhibited from being written into the FIFO. The jagged line LUMA_RAMP_OUT represents the luminance ramp data as it would be read out of the FIFO, if the data were not first interpolated. Note that the average slope of the ramp read out of the luminance FIFO is 33% steeper than the input ramp. Note also that 33% less active reading time is required to read out the ramp as was required to write in the data. This constitutes the 4/3 compression. It is the function of the interpolator 337 to recalculate the luminance samples being written into the FIFO so that the data read out of the FIFO is smooth, rather than jagged.

Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356, as shown in FIG. 11(c). The LUMA_RAMP_IN line represents the data prior to being written into the FIFO 356 and the jagged line LUMA_RAMP_OUT represents the data as it is read out of the FIFO 356. In this case it is the function of the interpolator, which follows the FIFO 356, to recalculate the sampled data from jagged to smooth after the expansion. In the expansion case the data must pause while being read from the FIFO 356 and while being clocked through the interpolator 337. This is different from the compression case where the data is continuously clocked through the interpolator 337. For both cases, compression and expansion, the clock gating operations can easily be performed in a synchronous manner, that is, events can occur based on the rising edges of the $1024f_H$ system clock.

There are a number of advantages in this topology for luminance interpolation. The clock gating operations, namely data decimation and data repetition, may be performed in a synchronous manner. If a switchable video data topology were not used to interchange the positions of the interpolator and FIFO, the read or write clocks would need to be double clocked to pause or repeat the data. The term double clocked means that two data points must be written into the FIFO in a single clock cycle or read from the FIFO during a single clock cycle. The resulting circuitry cannot be made to operate synchronously with the system clock, since the writing or reading clock frequency must be twice as high as the system clock frequency. Moreover, the switchable topology requires only one interpolator and one FIFO to perform both compressions and expansions. If the video switching arrangement described herein were not used, the double clocking situation can be avoided only by using two FIFO's to accomplish the functionality of both compression and expansion. One FIFO for expansions would need to be placed in front of the interpolator and one FIFO for compressions would need to be placed after the interpolator.

One of the conditions for proper circuit operation is that the number of data samples written into the FIFO for each horizontal line be exactly equal to the number of samples read from the FIFO for that horizontal line. If the same number of samples are not written into the FIFO as are read out of the FIFO, then the main channel picture will be severely slanted due to line by line pointer precession, read or write. This requirement is dictated by the fact that the main channel FIFOs are reset once per field. First the write pointer is reset following a main signal vertical synchronizing pulse and then one line later the read pointer is reset.

A different number of clock cycles may be required for the read and write pointers to advance to the same number of places due to the fact that expansions and compressions of video data are taking place. In order for the number of data samples written to always equal the number of data samples read, regardless of mode, three register values and two control signals are used to generate the read and write enables for the main Y and UV FIFOs. Two register values WR_BEG_MN and RD_BEG_MN, provided by the WSP μP 340, specify the location in the horizontal line period where reading and writing are to begin, in conjunction with a horizontal pixel count value H_COUNT. The value H_COUNT is a ten bit counter value used to determine pixel location within the line period. The counter is cleared by a start of line signal SOL. The SOL signal is a single clock wide pulse used to initialize the horizontal counter H_COUNT to a value of zero at the beginning of every line. The SOL pulse is nominally aligned with the leading edge of the horizontal synchronizing component.

A third register value LENGTH is used to load the upper eight bits of a ten bit counter to determine the number of data samples which have actually been written into the FIFO or read from the FIFO. The bits of the register value are inverted, and the least significant two bits are loaded logically HI, resulting in _LENGTH−1. A_preceding a signal denotes a logical inversion. Accordingly, when the counter overflows, that is the ripple carry out goes HI, the desired number of samples will have been written, or read. The actual number of pixel samples written, or read, is actually LENGTH×4 because the register is loaded into the upper eight bits of the counter. The effect of the clock gating is accounted for by gating the counter enable. In this way, the enable for the counter may also be used as the enable for the FIFO, ensuring that the number of samples written, or read, is always LENGTH×4, regardless of mode.

Figure 11D:
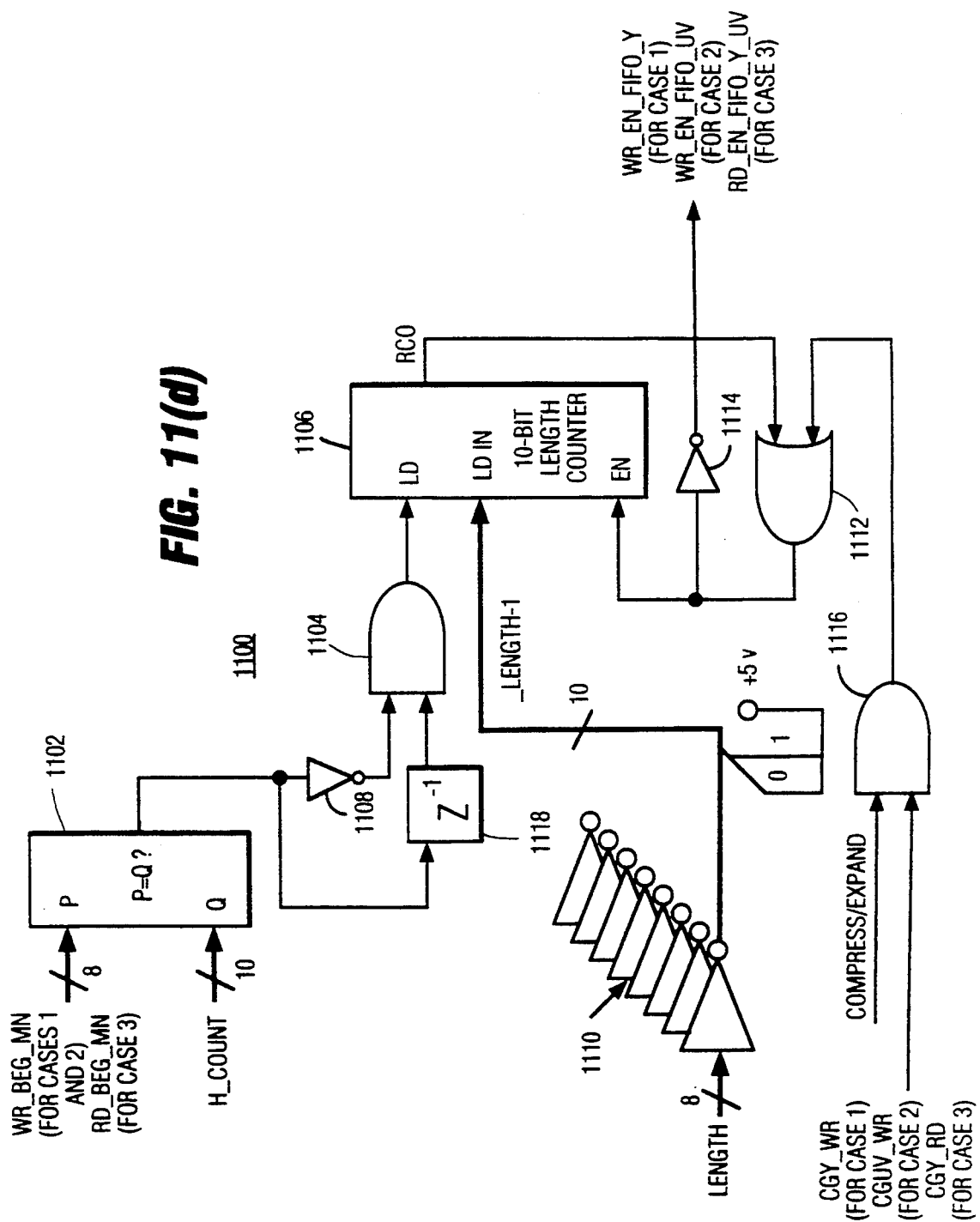
FIG. 11(d) illustrates a circuit for generating write and read enable signals.

FIG. 11(d) illustrates one of three identical circuits used to generate the write and read enable signals for the FIFOs for the Y and UV components, designated WR_EN_FIFO_Y (case 1 ), WR_EN_FIFO_UV (case 2), RD_EN_FIFO_Y and RD_EN_FIFO_UV. In the case of expansions, the RD_EN_FIFO_Y and RD_EN_FIFO_UV signals prove to be identical, and may be referred to as RD_EN_FIFO_Y_UV (case 3). The circuit 1100 is explained first for case 1. Circuit 1100 compares WR_BEG_MN to the upper eight bits of H_COUNT in comparator 1102. The value H_COUNT is a ten bit counter value used to determine pixel location within the line period. The counter is cleared by a start of line signal SOL. The SOL signal is a single clock wide pulse used to initialize the horizontal counter H_COUNT to a value of zero at the beginning of every line. The SOL pulse is nominally aligned with the leading edge of the horizontal synchronizing component.

The output of comparator 1102 is delayed by circuit 1118 and compared with an inverted, but otherwise undelayed version of itself in NAND gate 1104. The output of NAND gate 1104, a one clock period wide active LO signal, is the load LDn input to 10-bit length counter 1106. The LDn input is used to load the 10-bit FIFO length counter 1106 with the rising edge of the system clock. The bits of the LENGTH signal are inverted by inverter array 1110. The value LENGTH is used to load the upper eight bits of the ten bit counter to determine the number of data samples which have actually been written into the FIFO. The output of the inverter array 1110 is supplied to the uppermost bits of the load in input LOAD of counter 1106. The least significant two bits are tied logically HI. The effective load in value is _LENGTH−1. In order to adjust for the −1 aspect of the _LENGTH−1, the counter 1106 is stopped by the ripple carry out signal RCO, which occurs one clock cycle before the length counter 1106 reaches zero. The clock gating information is NORed with the ripple carry out signal RCO in gate 1112. The same enable signal is inverted by gate 1116 and used as the enable signal for the FIFO. The FIFO memory and the counter are thereby enabled in exactly the same manner, ensuring the correct number of samples to be written. In case 2, the WR_BEG_MN is also compared to H_COUNT. However, the CGUV_WR signal is used to generate the WR_EN_FIFO_UV signal as an output. In case 3, RD_BEG_MN is compared to H_COUNT and the CGY_RD signal is used to generate the RD_EN_FIFO_Y_UV signal as an output.

Figure 13:
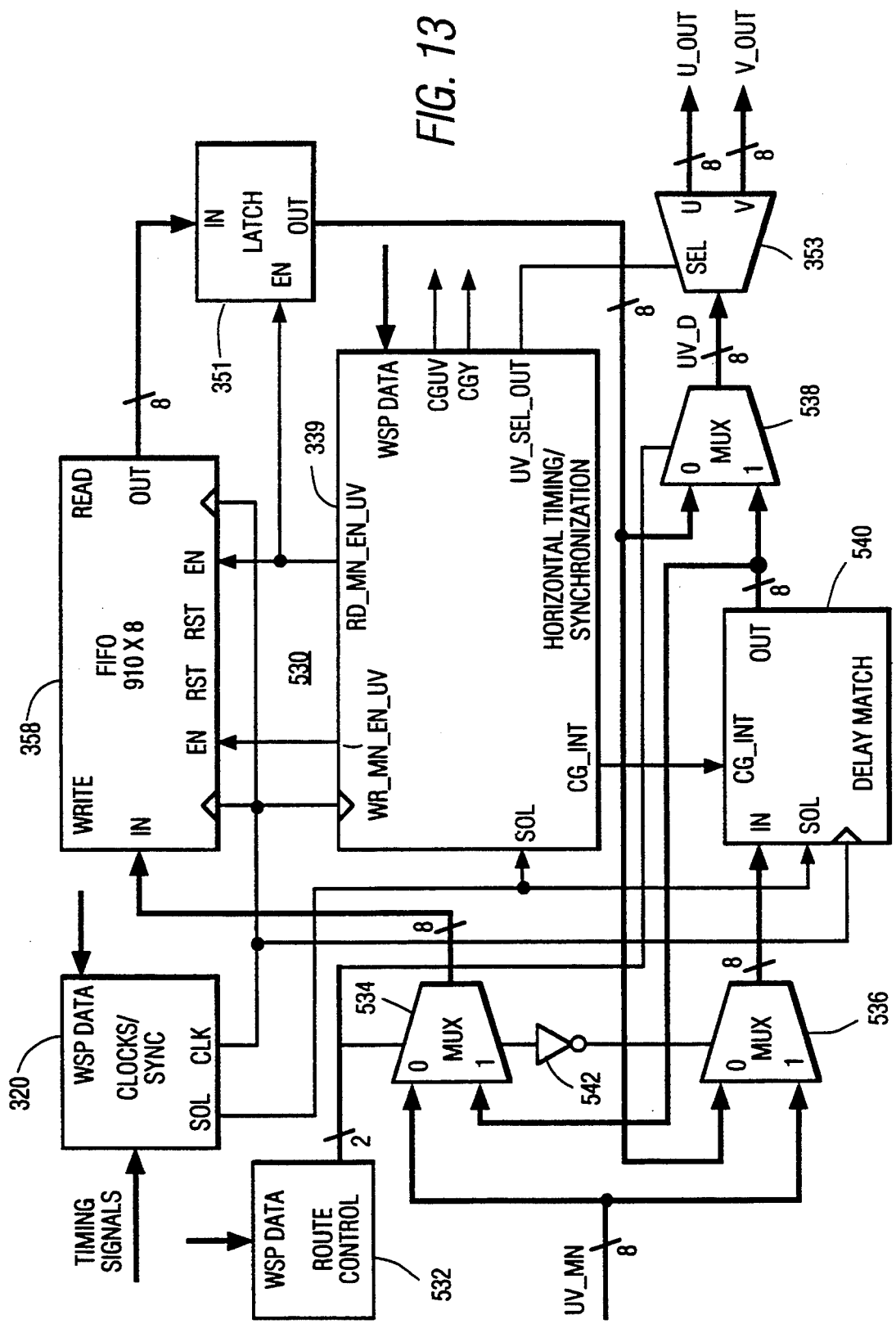
FIG. 13 is a block diagram of an alternative main signal path.

The chrominance processing for the main channel video can be accomplished by more than one inventive arrangement. One topology alternative is that shown in FIGS. 8 and 11(a) and explained in conjunction with FIGS. 52-55. Another topology for the chrominance processing for the main channel video is shown in FIG. 13 and explained in conjunction with FIG. 51. With reference first to FIG. 13, the UV signal path 530 is shown in block diagram form. The signal path 530 is very similar to the selectable topology of the luminance data in the main signal path 304 shown in FIGS. 8 and 11(a). The most significant difference is the use of a delay matching circuit 540 instead of interpolator 337. Multiplexers 534, 536 and 538 enable the UV_MN signal to follow a path in which the FIFO 358 precedes the delay matching circuit 540, or a path in which the delay matching circuit 540 precedes the FIFO 358. The multiplexers are responsive to a route control circuit 532. The output of multiplexer 538 is separated into the U_OUT and V_OUT signals by demultiplexer 353.

When the interpolation system performs a video compression, data samples must be deleted before they are written into the FIFO 358. This presents a problem in the case of the multiplexed U/V data. If the UV data stream were deleted with the same clock gating pulses as the Y data stream, the UV sequence would not alternate U, V, U, V, . . . , etc. consistently. As an example, if a U sample were deleted before being written into the FIFO 358, the sequence would be something like U, V, U, V, y, U, V, etc. Therefore a second clock gating signal is required. This signal is called CGUV (or _CGUV when the signal is logically inverted). This UV Clock Gate is used only during compressions, occurs only half as often as the CGY pulses, and always deletes a UV sample pair. The results of an 8/5 compression are shown in FIGS. 51(a) and 51(b).

In this example it is evident how Clock Gate Write for Y (_CGY) and UV (_CGUV) differ. When the _CGY and _CGUV signals are high, samples are deleted. It should be noted that _CGUV always starts on a U sample and ends on a V sample. In this manner a UV pair is deleted together and avoids the situation where a V from one pair is deleted along with a U from the next pair. A comparison of the how the UV and Y data is read out of FIFOs 358 and 356 respectively for the 8:5 compression is illustrated in FIGS. 51(a) and 51(b) respectively. It can be seen that the UV data will skew up to 1 clock cycle with respect to the Y data. This is the consequence of not storing a U/V indicator data into the FIFO data stream. This UV data skew degrades the color component slightly. However, the degradation never becomes worse than a 4:1:1 multiplexed color component system, which is commonly used in high end television systems. The effective UV Nyquist frequency is periodically reduced to 2 MHz because of the UV pair decimation. This is still sufficient for handling "wide" I chrominance sources. As a result, the color component signals maintain very high quality even during UV pair decimation.

Compressing the video data requires that the clock gate write signals to the FIFOs 356 and 358 be different for Y and UV signal paths. Essentially, the U and V samples have to be deleted as pairs, because once a sample is deleted the information about the state of that sample (whether it was a U or V sample) is lost. If a 9th bit, for example, were added to the FIFO 358 to carry the UV state information, single U or V samples could be deleted. When the data is read from the FIFO 358, the UV could correctly be sorted by interpreting the state of the 9th bit. Since this sorting information is thrown away, the consequence is that the UV data must be deleted as a pair so that the sorting which occurs after reading the UV FIFO 358 can be very simple.

Sorting the decimated UV pairs requires only a 1-bit counter. This counter is synchronously reset to the U (zero) state, on the clock cycle which FIFO 358 reading starts. This 1-bit counter is enabled with the RD_EN_MN signal, which controls the reading of the main FIFOs 356 and 358. In compression mode, RD_EN_MN is continuously high once reading starts until reading stops on each horizontal line. The resulting signal UV_SEL_OUT is an alternating U/V indicator which drives the select line of the demultiplexer 353. In this way, UV data samples are successfully sorted after they are read out of the FIFO 358 even though UV synchronization information could not be stored for later recall while writing the FIFO 358.

When video expansions are performed, the writing of the FIFOs 356 and 358 occurs uninterrupted from the start of writing to the end of writing. The reading of the FIFOs will be paused, and sample values held (repeated), as they are read out of the FIFOs. This sample holding or repeating is performed by the clock gate read information which is part of the RD_EN_MN signal, and its complement, _RD_EN_MN.

In this situation an important difference should be noted, as compared to compression. The state of the UV sample is known as it is read from the FIFO 358. The UV data is written into the FIFO 358 continuously alternating U, V, U, V, . . . , etc. Therefore, when the data is read out of the FIFO 358 and paused, the 1-bit counter which creates the signal UV_SEL_OUT is paused to reflect the fact that the FIFO data has been held. This keeps the sorting of demultiplexer 353 correct.

The 1-bit counter is paused at the correct time because the RD_EN_MN signal is applied to the enable input of the 1-bit counter. This insures that as the FIFO 358 is paused, the UV_SEL_OUT signal is also paused. Performing expansions does not require that the read enable signals for the Y and UV FIFOs 356 and 358 be separate because the clock gate read for the UV data, CGUV, is now identical to the clock gate read for the Y data, CGY. Performing expansions proves easier than performing compressions. Moreover, the color component Nyquist frequency is not degraded during expansions and the 2:1:1 signal quality is fully maintained.

The multiplexed color component topology described herein has a number of advantages. The method is efficient and is ideally suited to work in conjunction with a wide bandwidth luminance raster mapping system. The circuit complexity is minimized while still maintaining a high degree of chrominance signal quality. These advantages are due in part top the following innovations. The UV pairs are deleted at the input to the UV FIFO 358. This eliminates the need for carrying clock gating information through the FIFO which would require that the FIFO be another bit wider than the actual UV data precision. A delay matching network is substituted for a UV interpolator, which would work in an analogous fashion to interpolator 337. This eliminates a very complicated mathematical function. Moreover, as the gate array is embodied in an integrated circuit, approximately 2,000 gates are saved. Finally, the UV worst case signal quality is never degraded below a 4:1:1 (Y, U, V) color channel during compressions and remains at 2:1:1 quality for expansions.

In accordance with the inventive arrangement shown in with FIGS. 8 and 11(a), the need for a delay matching circuit is eliminated. Instead, the FIFO is manipulated in a way which accomplishes the same results. FIGS. 52(a) and 52(b) illustrate portion of the luminance and color component signal paths respectively in the gate array 300. FIG. 52(a) represents the selectable topology corresponding to video compression, wherein the interpolator 337 precedes the FIFO 356. Only the FIFO 358 is shown for the color component path.

FIGS. 53(a)–53(l) illustrate an-example of video compression. For purposes of the example, it is assumed that the luminance and color components are correctly delay matched prior to analog to digital conversion and that the interpolator has a delay of 5 clock cycles, although an actual interpolator delay of 20 clock cycles has been encountered and the luminance and chrominance are not time aligned. The select line UV_MUX for the analog switch, or demultiplexer 344, is an 8 MHz signal derived by dividing the system clock by 2. With reference to FIG. 53(a), a one clock wide start of line SOL pulse synchronously resets the UV_MUX signal to zero at the beginning of each horizontal video line, as shown in FIG. 53(b). The UV_MUX line than toggles in state each clock cycle through the horizontal line. Since the line length is an even number of clock cycles, the state of the UV_MUX, once initialized, will consistently toggle 0, 1, 0, 1, . . . , without interruption. The UV and Y data streams out of the analog to digital converters 346 and 342 are shifted because the analog to digital converters each have 1 clock cycle of delay. In order to accommodate for this data shift, the clock gating information, _CGY shown in FIG. 53(e) and _CGUV shown in FIG. 53(f), from the interpolator control 349 (see FIG. 9) must be similarly delayed. The UV data UV_FIFO_IN which is shown in FIG. 53(d) and stored in the FIFO 358 leads the Y data Y_FIFO_IN shown in FIG. 53(c) because the luminance data passes through the interpolator 337 and the color components are not interpolated. The reading of the UV_FIFO data shown in FIG. 53(h) from the UV FIFO 358 is delayed by 4 clock cycles with respect to reading the Y_FIFO data shown in FIG. 53(g) from the Y FIFO 356 to adjust for this mismatch. The four clock period delay between the rising edge of the UV FIFO read enabling signal RD_EN_MN_UV shown in FIG. 53(j) and the rising edge of the Y FIFO read enabling signal RD_EN_MN_Y shown in FIG. 53(i) is so indicated. The resulting Y and UV data streams are shown in FIGS. 53(k) and 53(l) respectively. The worst Y versus UV mismatch is 1 clock cycle, which is the same result which can be achieved with a more complex system, such as that wherein the relative positions of a FIFO and a delay matching circuit can be interchanged.

It can be noted that the reading of the UV FIFO 358 was delayed by 4 clock cycles even though the interpolator delay in the example is 5 clock cycles. It turns out that the number of clock cycles to delay UV FIFO reading is best set to an even value not greater than the interpolator delay. As a C computer language expression, if the delay is designated DLY_RD_UV,:

DLY_RD_UV=(int)((int)INTERP_DLY÷2)*2;

where
INTERP_DLY is the number of clock cycles of delay in the interpolator.

In practice, the interpolator can have 20 clock cycles of delay (INTERP_DLY=20) and the luminance and chrominance (color components) are not matched. There are many possibilities for the luminance chrominance signals to become offset in time from one another. Usually, the color component signals lag behind the luminance signal due to chrominance demodulation. This raster mapping system takes advantage of the interpolator delay to overcome possible Y/UV mismatch. In the case of video compression DLY_RD_UV may be set from 0 to 31 clock cycles of delay in reading the UV FIFO 358. Since the luminance interpolator 337 inherently has 20 clock cycles of delay, and each clock cycle is approximately 62 nsec long, the raster mapping system as described can correct for up to 1.24 μsec (62 nsec×20) of color component delay with respect to the luminance signal. Moreover, the raster mapping system can correct for up to 682 nsec (62 nsec×[31−20]) of luminance delay with respect to the color component signals. This provides an extremely high degree of flexibility for interfacing to external analog video circuits.

Just as the interpolator can introduced a different delay in the luminance channel for video compression, the same can be true for video expansions. FIGS. 54(a) and 54(b) illustrate portion of the luminance and color component signal paths respectively in the gate array 300. FIG. 54(a) represents the selectable topology corresponding to video expansion, wherein the interpolator 337 follows the FIFO 356. The UV path including FIFO 358 remains unchanged. In the example of video expansion shown in FIGS. 55(a)-55(l), it is assumed that the interpolator has a delay of 5 clock cycles. The start of line SOL signal, the UV_MUX signal, the luminance data stream input Y_IN to FIFO 356 and the color component data stream input UV_IN to FIFO 358 are shown in FIGS. 55(a) through 55(d) respectively. In order to correctly time align the Y and UV data, the writing of the Y FIFO 356 can be delayed (DLY_WR_Y) or the reading of the UV FIFO 358 (DLY_RD_UV) can be delayed. Delaying reading of the UV FIFO is acceptable in this situation because the UV FIFO 358 does not require interpolator coefficients K and C. In the video compression mode, the writing could not be delayed because this would misalign the coefficients (K, C) with respect to the clock gating information and corrupt the luminance part of the interpolation. The correct setting for DLY_WR_Y which delays the writing of the Y FIFO by 4 clock cycles is indicated between the rising edge of the UV FIFO write enabling signal WR_EN_MN_UV shown in FIG. 55(f) and the rising edge of the Y FIFO write enabling signal WR_EN_MN_Y shown in FIG. 55(g). The clock gate signal _CG and Y_FIFO output signal are shown in FIGS. 55(i) and 55(j) respectively. The resulting Y, UV time alignment is shown by the relative positions of the Y_OUT and UV_OUT data streams shown in FIGS. 55(k) and 55(l) respectively.

The ability for the raster mapping system to compensate for external luminance/chrominance mismatch is just as great for video expansion as for video compression. This is a very important function of the raster mapping system, as it eliminates the need for a variable delay line at the input to the luminance channel to perform luminance/chrominance matching. The selection of a particular topology can be based on a variety of factors, including other circuit considerations Interpolation of the auxiliary signal takes place in the auxiliary signal path 306. The PIP circuit 301 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at $640f_H$) and 2 other bits. These two other bits hold either fast switch data (FSW_DAT) or part of a U or V sample (sampled at $80f_H$). The FSW_DAT values indicate which type of field was written into video RAM. Since there are two fields of data stored in the video RAM 350, and the entire video RAM 350 is read during the display period, both fields are read during the display scan. The PIP circuit 301 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM is inverted by deleting the top line of the field when the field is read out of memory. The result is that the small picture maintains correct interlace without a motion tear.

The clocks/sync circuit 320 generates read, write and enable signals needed for operating FIFOs 354, 356 and 358. The FIFOs for the main and auxiliary channels are enabled for writing data into storage for those portions of each video line which is required for subsequent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Generation of different special effects such as cropped side-by-side pictures are accomplished through manipulating the read and write enable control signals for the line memory FIFOs. The process for this display format is illustrated in FIGS. 7 and 8. In the case of cropped side-by-side displayed pictures, the write enable control signal (WR_EN_AX) for 2048×8 FIFO 354 of the auxiliary channel is active for (½)*(5/12)=5/12 or approximately 41% of the display active line period (post speed up), or 67% of the auxiliary channel active line period (pre speed up), as shown in FIG. 7. This corresponds to approximately 33% cropping (approximately 67% active picture) and the interpolator expansion of the signal by 5/6×. In the main video channel, shown in the upper part of FIG. 8, the write enable control signal (WR_EN_MN_Y) for the 910×8 FIFOs 356 and 358 is active for (½)*(4/3)=0.67 or 67% of the display active line period. This corresponds to approximately 33% cropping and a compression ratio of 4/3 being performed on the main channel video by the 910×8 FIFOs.

In each of the FIFOs, the video data is buffered to be read out at a particular point in time. The active region of time where the data may be read out from each FIFO is determined by the display format chosen. In the example of the side-by-side cropped mode shown, the main channel video is being displayed on the left hand half of the display and the auxiliary channel video is displayed on the right hand half of the display. The arbitrary video portions of the waveforms are different for the main and auxiliary channels as illustrated. The read enable control signal (RD_EN_MN) of the main channel 910×8 FIFOs is active for 50% of the display active line period of the display beginning with the Start of active video, immediately following the video back porch. The auxiliary channel read enable control signal (RD_EN_AX) is active for the other 50% of the display active line period beginning with the falling edge of the RD_EN_MN signal and ending with the beginning of the main channel video front porch. It may be noted that write enable control signals are synchronous with their respective FIFO input data (main or auxiliary) while the read enable control signals are synchronous with the main channel video.

The display format shown in FIG. 1(d) is particularly desirable as it enables two nearly full field pictures to displayed in a side by side format. The display is particularly effective and appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The operation can be described in terms of general ratios of speedup and cropping. The video display means can be considered to have a display format ratio of width to height of M:N, the first video signal source can be considered to have a display format ratio of A:B and the second video signal source can be considered to have a display format ratio of C:D. The first video signal can be selectively speeded up by a factor in a first range of approximately 1 to (M/N÷A/B) and selectively cropped horizontally by a factor in a second range of approximately 0 to [(M/N÷A/B)−1]. The second video signal can be selectively speeded up by a factor in a third range of approximately 1 to (M/N÷C/D) and selectively cropped horizontally by a factor in a fourth range of approximately 0 to [(M/N÷C/D)−1].

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

$$4/3 = (16/9)/(4/3)$$

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

A field synchronization system for avoiding read-/write pointer collisions and maintaining interlace integrity is explained more fully in connection with FIGS. 28–36. The picture-in-picture processor operates in such a manner that the auxiliary video data is sampled with a 640$f_H$ clock locked to the horizontal synchronizing component of the incoming auxiliary video signal. This operation enables orthogonally sampled data to be stored in the video RAM 350. Data must be read out of the video RAM at the same 640$f_H$ rate. The data cannot be orthogonally displayed from the video RAM without modification due to the generally asynchronous nature of the main and auxiliary video sources. In order to facilitate synchronization of the auxiliary signal to the main signal, a line memory with independent write and read port clocks is disposed in the auxiliary signal path after the output of the video RAM 350.

More particularly, as shown in FIG. 28, the output of the video RAM 350 is an input to the first of two 4-bit latches 352A and 352B. The VRAM_OUT output is in 4-bit data blocks. The 4-bit latches are used to recombine the auxiliary signal back into 8-bit data blocks. The latches also reduce the data clock rate from 1280 $f_H$ to 640$f_H$. The 8-bit data blocks are written into the FIFO 354 by the same 640$f_H$ clock used to sample the auxiliary video data for storage in the video RAM 350. The size of FIFO 354 is 2048×8. The 8-bit data blocks are read out of the FIFO 354 by the 1024$f_H$ display clock, which is locked to the horizontal synchronizing component of the main video signal. This basic configuration, which uses a multiple line memory with independent read and write port clocks, enables data which was orthogonally sampled to be displayed orthogonally. The 8-bit data blocks are divided into 6-bit luminance and color difference samples by demultiplexer 355. The data samples may then be interpolated as necessary for the desired format display ratio and written as video data output.

Since the reading and writing of data from the auxiliary channel FIFO is asynchronous there is the possibility of read/write pointer collisions. Read/write pointer collisions can occur when old data is read out of the FIFO before new data has an opportunity to be written into the FIFO. Read/write pointer collisions also occur when new data overwrites the memory before the old data has an opportunity to be read out of the FIFO. Interlace integrity must also be preserved.

A sufficiently large memory must be chosen in the first instance in order to avoid read/write pointer collision in the auxiliary channel FIFO. For displaying normal format display ratio video cropped by 33%, the auxiliary FIFO, which is 2048×8 in size, is capable of storing 5.9 lines of video data, calculated as follows, where N is the number if times and L is the length of each line:

N=(2/3) * (0.82)*(640)=350 based on 82% active line period L=2048/350=5.9

An aspect of the invention recognizes that precession rates greater than 2 lines/field are not likely to be encountered. Therefore, a design criteria of a 5 line FIFO for the auxiliary channel can be sufficient to prevent read/write pointer collisions.

The memory usage of the auxiliary channel FIFO can be mapped out as shown in FIG. 29. A block diagram for a simplified circuit formed by D-type flip/flops for generating line delays ($Z^{-1}$) and reset pulses for controlling writing and reading in the FIFO 354 in the auxiliary signal path is shown in FIG. 30. At the beginning of a new main signal field, the write pointer is reset to the start of the FIFO. This reset pulse, denoted WR_RST_AX is the combination of V_SYNC_MN sampled by H_SYNC_AX. In other words, WR_RST_AX occurs at the first horizontal synchronizing pulse of the auxiliary video signal which occurs after a vertical synchronizing pulse of the main signal. Two main signal horizontal lines later the read pointer is reset to the start of the FIFO 354. This reset pulse is denoted RD_RST_AX. In other words, RD_RST_AX occurs at the third horizontal synchronizing pulse of the main video signal which occurs after a vertical synchronizing pulse of the main signal, or stated still otherwise, at the second horizontal synchronizing pulse of the main signal which occurs after the WR_RST_AX pulse.

Since the main and auxiliary signals are asynchronous, there is some ambiguity about exactly where the write pointer is when the read pointer is reset. It is known that the write pointer is leading the read pointer by at least two lines. However, if the frequency of the auxiliary channel horizontal sync is higher than the frequency of the main channel horizontal sync, then the write pointer will have advanced past the 2 line marker shown. It is in this way that a pointer collision is avoided for all signals with less than 2 lines/field precession rate. The auxiliary channel FIFO 354 is partitioned into 5 line pieces through appropriately timed read and write reset signals. In this scheme, the read and write pointers are initialized at the beginning of each displayed field at least 2 lines apart from each other.

If the FIFO were not a complete 5 lines long, the system would sacrifice the memory distance from the write pointer to the read pointer. This is the case for different squeeze modes, for example a 16% squeeze:

16% squeeze
N=(5/6) * (0.82) * 640=437
L=2048 (5 * 437)=4.7

In these cases, the FIFO proves to be less than 5 lines long. In the 16% squeeze, the actual FIFO length is 4.7 lines. The (0.8) factor in the N equation of the 33% squeeze reflects an operational limitation of the CPIP chip.

Since the FIFO read and write resets are spaced by a minimum of two lines of active video, the sacrifice always comes at the expense of allowing the read pointer to catch up with the write pointer. Moreover, only 80% of the video line is considered active because the picture-in-picture processor is not capable of storing more than 512 video samples in the video RAM 350. In practice, this still provides a good active video line. In these cases, the precession rate is being sacrificed for more visible picture content. In addition, there is more distortion in the auxiliary video. In the worst case, up to one line per field of precession can be tolerated between the main and auxiliary video sources. This is still more than is necessary for most video sources, and the precession rate tolerance is sacrificed on those feature modes which can be expected, to be the least used.

Since the FIFO read and write resets are spaced by a minimum of two lines of active video, the sacrifice always comes at the expense of allowing the read pointer to catch up with the write pointer. Moreover, only 80% of the video line is considered active because the picture-in-picture processor is not capable of storing more than 512 video samples in the video RAM 350. In practice, this still provides a good active video line. In these cases, the precession rate is being sacrificed for more visible picture content. In addition, there is more distortion in the auxiliary video. In the worst case, up to one line per field of precession can be tolerated between the main and auxiliary video sources. This is still more than is necessary for most video sources, and the precession rate tolerance is sacrificed on those feature modes which can be expected, to be the least used.

Another problem stemming from the asynchronous reading and writing of the FIFO is that of maintaining interlace integrity of the auxiliary channel video. Since the display is locked to the main channel video, the current field type being displayed, that is the upper or lower field, will be determined by the main signal. The field type which is stored in the video RAM 350 memory and ready to be read out at the start of the main channel field may or may not be the same as the displayed field type. It may be necessary to change the auxiliary field type stored in the video RAM 350 to match that of the main channel display.

The picture-in-picture processor 320 and the gate array 300 quantize 262.5 line fields of the NTSC signal into 263 line upper fields (sometimes referred to odd fields) and 262 line lower fields (sometimes called even fields). This is due to fact that vertical synchronizing component is sampled with pulses representing horizontal synchronizing component. This is illustrated by the diagram of FIG. 31. An upper/lower field type indicator has a value 1 for upper fields and a value 0 for lower fields. The upper fields include odd lines 1 through 263. The lower fields include even lines 2 through 262. In FIG. 32, the first field type indicator U/L MAIN SIGNAL represents the field type of the main video channel. The signal HSYNC_AX represents the horizontal synchronizing components for each line of the auxiliary channel.

The field type indicator U/L(A) represents the field type stored in the video ram 350 if each auxiliary channel line were written in "normally". The term normal is used here to indicate that the odd lines 1–263 are written in to the video RAM 350 as the upper field is being received and decoded. The field type indicator U/L(B) represents the field type stored in the video RAM 350 if the first line of the upper field is not written into the video RAM 350 during the reception of an upper field. Instead, the first line is actually tacked onto the last line (number 262) of the lower field. This effectively inverts the field type since line 2 will be the first displayed line and line 3 will be the second displayed line in the frame. The received upper field now becomes the lower field and vice-versa. The field type indicator U/L(C) represents the field type stored in the video RAM 350 if the last line of the upper field is added to the video RAM 350 during the reception of the lower field. This effectively inverts the field type, since line 263 will be the first displayed line and line 1 will be the second displayed line.

The addition and subtraction of lines in modes B and C does not degrade the auxiliary channel picture because these lines occur during vertical retrace or overscan. The order of the displayed lines is shown in FIG. 34, where solid lines represent upper field lines and dotted lines represent lower field lines.

As the main and auxiliary channel signals precess, the U/L MAIN SIGNAL will shift to the left or the right with respect to the auxiliary channel U/L(A,B,C) field type indicators. In the position shown in the diagram, data should be written into the video RAM 350 using mode A, because the decision edge is in zone A. Mode A is appropriate because when the picture-in-picture processor receives vertical synchronizing component, it will write the same field type into the video RAM 350 as will be required by the display to read from the video RAM 350 starting with V_SYNC_MN (main channel vertical synchronizing component). As the signals precess, the mode will change according to their relative positions. The valid modes are shown graphically at the top of FIG. 32 and in the table of FIG. 33. There is an overlap between modes B and C, since most of the time that mode B is valid, mode C is also valid, and vice-versa. This is true for all but 2 lines out of 262 lines. Either of modes B or C can be utilized when both are valid.

A block diagram of a circuit 700 for maintaining interlace integrity according to this inventive arrangement is shown in FIG. 36. The output signals of circuit 700 are write and read reset control signals for the video RAM 350, the FIFO 354 in the auxiliary signal path and the FIFO 356 in the main signal path, as shown in FIG. 28. The field type of the main video signal is determined from a pair of signals, VSYNC_MN AND HSYNC_MN. The field type of the auxiliary video signal is determined from a corresponding pair of signals, VSYNC_AX AND HSYNC_AX. Each pair of signals has a predetermined phase relationship which is set in the gate array. This relationship is shown in FIGS. 35(a)–35(c), which apply to both pairs of signals. In each case, HSYNC is a square wave, whose rising edge corresponds to the start of a horizontal line of the respective signal. In each case, VSYNC has only one rising edge per field, which corresponds to the start of a vertical field of the respective signal. The relationship between the rising edges of the respective pairs of signals is tested by circuit 700 to determine what steps, if any, are necessary to match the field type of the auxiliary signal to the field type of the main signal. In order to prevent ambiguity, the leading edges of the main pair of signals are never closer than ⅛ of a horizontal line period. The leading edges of the auxiliary pair of signals are never closer than 1/10 of a horizontal line period. This prevents jitter of the leading edges relative to one another. This relationship is assured by the timing circuits in the gate array.

The main signal pair VSYNC_MN and HSYNC_MN are inputs to a first field type circuit 702, which comprises two D-type flip/flops. In one case, HSYNC_MN is sampled by VSYNC_MN, that is, VSYNC_MN is the clock input. The output of this flip/flop is an upper/lower field indicator UL_MN for the main signal, which can be a logical HI for an upper field type and a logical LO for a lower field type, although this is arbitrary. In the other case, VSYNC_MN is sampled by HSYNC_MN, just as in flip/flop 852 explained in connection with FIG. 30. This provides an output VH, which is the vertical synchronized to the horizontal.

The auxiliary signal pair VSYNC_AX and HSYNC_AX are inputs to a first field type circuit 710, which also comprises two D-type flip/flops. In one case, HSYNC_AX is sampled by VSYNC_AX, that is, VSYNC_AX is the clock input. The output of this flip/flop is an upper/lower field indicator UL_AX for the auxiliary signal, which can be a logical HI for an upper field type and a logical LO for a lower field type, although this is arbitrary. In the other case, VSYNC_AX is sampled by HSYNC_AX, just as in flip/flop 852 explained in connection with FIG. 30. This provides an output VH, which is the vertical synchronized to the horizontal.

The field type determination for both signals is shown in FIGS. 35(a)–35(c). If the rising start of field edge occurs in the first half of the horizontal line period, as in FIG. 35(b), the field is a lower field type. If the rising start of field edge occurs in the second half of the horizontal line period, as in FIG. 35(c), the field is an upper field type.

The V$_H$ for the main signal and HSYNC_MN are inputs to delay circuits 704, 706 and 708, which provide horizontal line period delays to assure the proper phase relationship of the output signals WR_RST_FIFO_MN, RD_RST_FIFO_MN and RD_RST_FIFO_AX. The delay operation, which can be implemented by D-type flip/flops, is similar to the circuit shown in FIG. 30. Two to three horizontal line periods of delay are provided between the write and read pointers.

The upper/lower field type indicator UL_MN corresponds to U/L MAIN SIGNAL shown at the top of FIG. 32 and is one input to a UL_SEL comparator 714. The other inputs to comparator 714 are supplied by UL_AX test generator 712. Test generator 712 has the UL_AX field indicator as an input, as well as HSYNC_AX as a clock input. Test generator 712 provides signals U/L(A), U/L(B) and U/L(C) shown in the bottom of FIG. 16, corresponding to the three possible modes A, B and C. Each of the signals U/L(A), U/L(B) and U/L(C) is compared with UL_MN, at the time of the decision edge of U/L_MN, also shown in FIG. 32. If UL_MN matches U/L(A), the field types match and no action to maintain interlace integrity is necessary. If UL_MN matches U/L(B), the field types do not match. It is necessary to delay writing the upper field by one line to maintain interlace integrity. If UL_MN matches U/L(C), the field types do not match. It is necessary to advance writing the lower field by one line to maintain interlace integrity.

The results of this comparison are an input to RST_AX_SEL selector circuit 718. The other inputs are the three vertical synchronizing signals RST_A, RST_B and RST_C generated by RST_AX_GEN generator 716. The three vertical synchronizing signals RST_A, RST_B and RST_C have different phases relative to one another in order to implement the corrective action, or no corrective action, to maintain interlace integrity according to the output of the comparator 714. Delay circuit 722 resynchronizes the selected vertical synchronizing signal with the auxiliary video input to generate WR_RST_VRAM_AX. Delay circuit 720 performs a similar function for generating RD_RST_VRAM_AX and WR_RST_FIFO_AX. As seen in FIG. 32, modes B and C overlap most of the time. In fact, only two out of every 525 comparisons will require only one of modes B or C, rather than either. The comparator 714 can be arranged to favor mode C over mode B when both modes are valid. This choice can be arbitrary, or based on other circuit considerations.

Figure 4A:
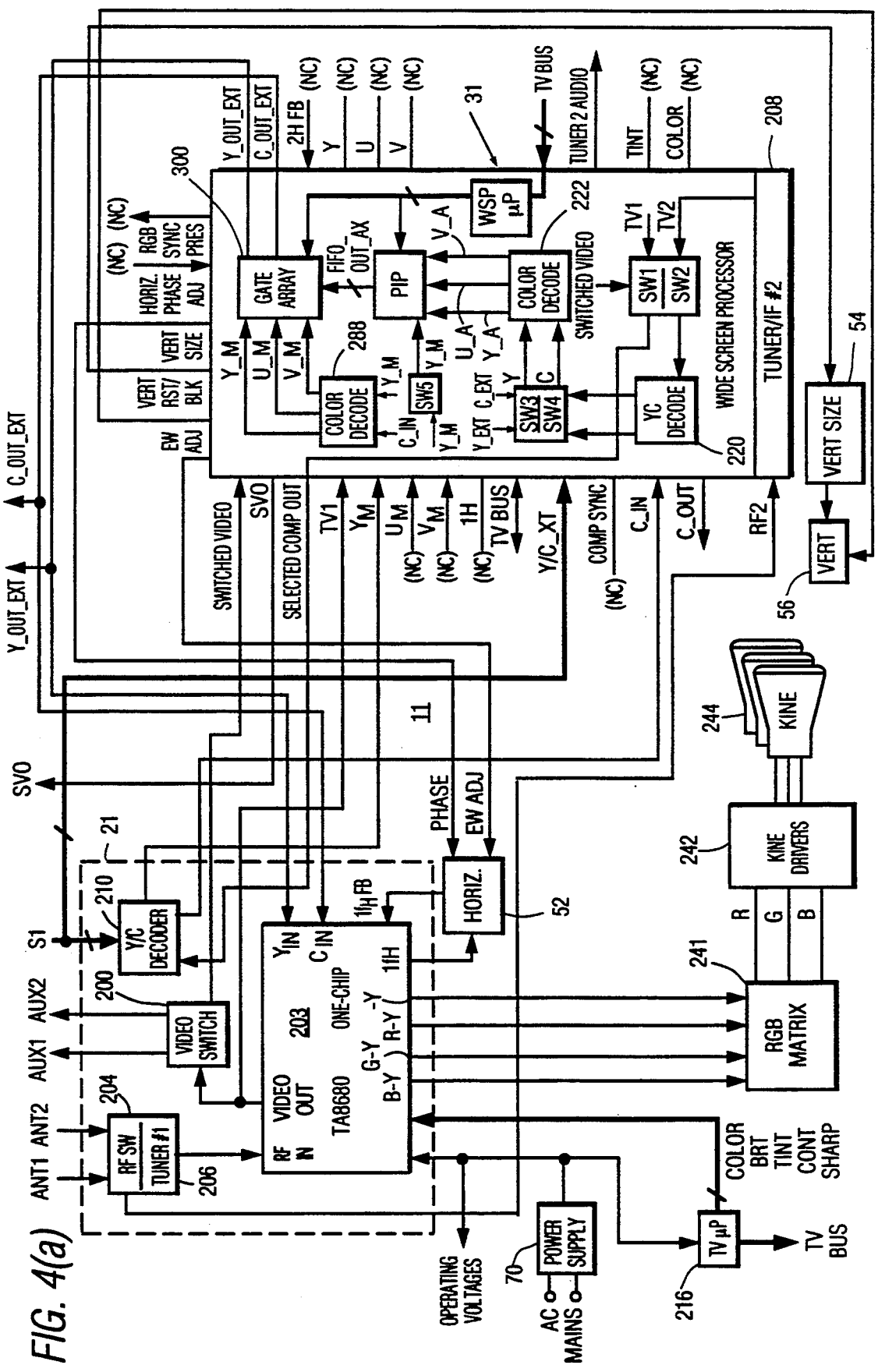
FIG. 4(a) is a block diagram of a wide screen television in accordance with aspects of this invention and adapted for operation at $1f_H$ horizontal scanning.
Figure 4B:
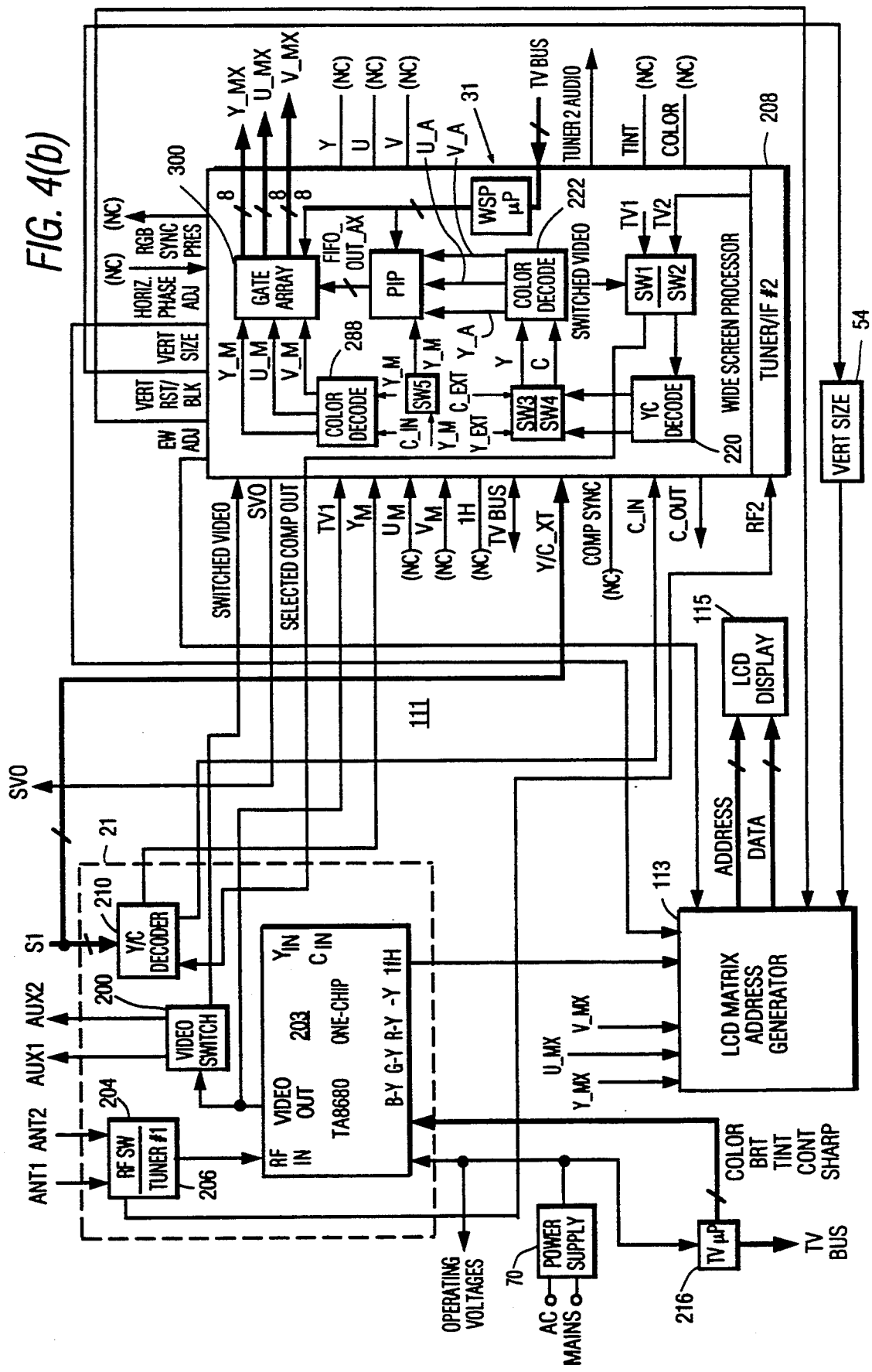
FIG. 4(b) is a block diagram of a wide screen television in accordance with aspects of this invention and adapted for operation with a liquid crystal display system.

The circuit 111 shown in FIG. 4(b) suggests how the circuit 11 of FIG. 4(a) might be modified to incorporate a liquid crystal display (LCD) system. The raster mapping techniques utilized in the digital signal processing explained in detail above are also appropriate for a liquid crystal display system. The pixel map generated by the LCD matrix address generator 113 is based upon the digital multiplexed output of the gate array, Y_MX, U_MX and V_MX. The LCD matrix address generator 113 drives an liquid crystal display means 115.

Data reduction or compression, and data restoration or expansion, can be accomplished by alternative methods, in accordance with various inventive arrangements. In accordance with one alternative, the auxiliary signal is "dithered" by a resolution processing circuit 370 and "dedithered" by resolution processing circuit 357. Resolution processing circuit 370 may also be thought of as a data reduction circuit and resolution processing circuit 357 may also be thought of as a data restoration circuit. Dithering is a process wherein an n-bit signal has an m-bit dithered sequence added thereto, after which the m least significant bits are truncated. A 1-bit dithering circuit and corresponding 1-bit dedithering circuit are shown in FIGS. 39 and 40 respectively. A 2-bit dithering circuit and corresponding 2-bit dedithering circuit are shown in FIGS. 41 and 42 respectively.

With reference to FIGS. 39 and 40, a summing circuit 372 combines an n-bit signal with a 1-bit dither sequence. An advantageous 1-bit dither sequence is 01010101, etc. After adding the dither sequence to the 1-bit signal, the least significant bit is truncated by circuit 374. The n-1 bit dithered signal is then processed by pix-in-pix module 320, latches 352A and 352B and FIFO 354. The subsequent output of the pip decoding circuit 306B is an n-1 bit dithered signal. In data restoration circuit 357 the n-1 bit dithered signal is supplied to a summing circuit 802 and one input of an AND gate 804. A signal on the other input of AND gate 804 masks the least significant bit of the dithered signal. The output of AND gate 804 is supplied directly to one input of exclusive OR gate 801 and is delayed by one clock, or one pixel, by circuit 806, before being supplied as the other input to exclusive OR gate 808. The output of exclusive OR gate 808 is one input to AND gate 810 and the input to Y interpolator 359, the input forming the new least significant bit of the dedithered signal. The other input of AND gate 810 is a signal having the same dither sequence and the same phase as the dithering signal applied to summing junction 372. The output AND gate 810 is a subtractive input to summing circuit 802. The output of summing circuit 802 is combined with the additional bit supplied by the output of exclusive OR gate 808, providing an n-bit, dedithered signal as an input to Y interpolator 359.

With reference to FIG. 41, a 2-bit dithering circuit 370' comprises a summing circuit 376, which combines and n-bit signal with a 2-bit dither sequence. In accordance with an inventive arrangement, the dither signal can be defined by any repetitive sequence of the numbers 0, 1, 2, 3 in any order within the sequence. This definition includes the following sequences, as listed in Table 1.

TABLE 1

| | | | |
|---|---|---|---|
| 0123 | 1023 | 2013 | 3012 |
| 0132 | 1032 | 2031 | 3021 |
| 0213 | 1230 | 2103 | 3120 |
| 0231 | 1203 | 2130 | 3102 |
| 0312 | 1302 | 2301 | 3201 |
| 0321 | 1320 | 2310 | 3210 |

A 2-bit dither sequence which is particularly advantageous is 02130213, etc., which is illustrated in FIG. 41. The n-bit signal which is the output of summing circuit 376 has its two least significant bits truncated by circuit 378. The n-2 bit dithered signal is then processed by pix-in-pix processor 320, latches 352A and 352B, FIFO 354 and pip decoding circuit 306B.

It appears that the quarter-frequency component is usually more objectionable than the half-frequency component, even though the quarter-frequency component has half the amplitude of the half-frequency component. Accordingly, a dedithering scheme can be chosen to suppress only the quarter-frequency component. A first signal path of the dedithering circuit is for delay and amplitude matching. A second signal path includes a combination inverted bandpass filter and limiter. The inverted bandpass filter cancels the frequency at the center of the passband when added to the delay and amplitude matched original signal. The limiter assures that only amplitudes of dither size will be cancelled. This dedithering arrangement has no effect upon the half sample frequency component of the dithered signal. The half-frequency signal component is low enough in amplitude and high enough in frequency to have sufficiently low visibility to avoid causing a problem.

Such a dedithering circuit 306D' is shown in FIG. 42. The n2 bit signal at the output of pip decoding circuit 306B is supplied as an input to a two clock, or two pixel, delay circuit 822, a two clock, or two pixel, delay circuit 814 and a summing circuit 812. The output of delay circuit 814 is a subtractive input to summing circuit 812, the output of which is an n-1 bit signal. The n-1 bit dithered signal is an input to limit circuit 816. Output values of the limit circuit are in this case confined to [−1, 0, 1, ], that is the absolute value of one. The output of limiting circuit 816 is a 2-bit signal, supplied as an input to two clock, or two pixel, delay circuit 818 and a subtractive input to summing circuit 820. Delay circuit 818 and summing circuit 820 form a bandpass filter having a gain of two at the center frequency, which is ¼ of the sample rate. The 2-bit signal is a twos complement signal. The output of summing circuit 820 is a 3-bit signal, which is a subtractive input to summing circuit 826. The n-2 bit output of delay circuit of 822 is an input to multiplier 824. The output of multiplier 824 is an n-bit signal, wherein the two least significant bits are equal to 0. The values for the two least significant bits (and some correction) are supplied by the summation in circuit 826. The output of summing circuit 826 is an n-bit partially dedithered signal, which is an input to Y interpolator 359.

The resolution, or perceived quality, of the dedithered video signal can be improved under some circumstances by skewing the dither sequence. The dither sequence, whether a one or two bit sequence, repeats continuously on a given line but is phase shifted on different lines. Many possible skewing schemes are possible. Two skewing sequences can be particularly advantageous in hiding artifacts in the display due to the dithering process itself. These skewing sequences are shown in FIG. 43. The one and two pixel, field to field skews are those in which all the lines of one field have the same phase and all the lines of the next field are skewed one or two pixels with respect to the first field. The field to field skews on 2-bit dithered signals work best for frozen pictures. Some line structure can be visible during live video, where there are flat areas in motion. The one pixel skew is particularly advantageous for 2-bit dithers if the signal will be dedithered, but the two pixel skew is presently preferred if the signal will not be dedithered. Whether or not the signal should be dedithered depends upon the display format.

An alternative to dithering for data reduction is paired pixel compression, which will be explained with reference to FIG. 44. A field is depicted at the top of FIG. 44, the field including lines 1, 2, 3, etc. The pixels of each line are represented by letters. Each pixel denoted "P" will be retained, whereas each pixel denoted "R" will be replaced. The permanent and replaced pixels are skewed by one pixel from line to line. In other words, in the odd number lines, the replaced pixels are the second, fourth, sixth, etc. In the even number lines, the replaced pixels are the first, third, fifth, etc. The two primary alternatives are to substitute for each replaced pixel either a 1 bit code or a 2 bit code. The bits for the codes are taken from the number of bits available for defining the permanent pixels. The number of bits available for defining the pixels is limited by the storage capacity of the video processor. In this case, the CPIP chip and the video RAM 350 impose a limit of an average of 4 bits per pixel. If a 1-bit code is substituted for each replaced pixel, then 7 bits are available for each permanent pixel. Similarly, if a 2-bit code is substituted for each replaced pixel, then 6 bits are available to describe each permanent pixel. In either event, each pair of successive pixels (one permanent and one replaced) requires a total of 8 bits. A total of 8 bits per pair is an average of only 4 bits per pixel. The data reduction is in the range of 6:4 to 7:4. The replacement sequence is illustrated in a portion of the field including three successive lines: $n-1$, $n$, $n+1$. Pixels to be replaced are designated R1, R2, R3, R4, and R5. Pixels to remain are designated A, B, C and D.

In accordance with a 1-bit coding scheme, a zero will be substituted for a replacement pixel if it is closer in value to the pixel above it than it is closer in value to the average of the pixels on each side. For the example in FIG. 44, the 1-bit replacement code for pixel R3 will be zero if the value of pixel R3 is closer to the value of the average of pixels B and C than to the value of pixel A. Otherwise, the 1-bit replacement code will be 1. When the data is reconstructed, pixel R3' will be equal in value to the average of the values of pixels B and C if the 1-bit code is 0. If the 1-bit code is equal to 1, then the value of pixel R3' will be the same as the value of pixel A.

A replacement and reconstruction sequence for a 2-bit code is also illustrated. For pixel R3, the 2-bit replacement code is equal to 0 if the value of R3 is closest in value to the value of pixel A. The 2-bit replacement code is equal to 1 if the value of R3 is closest in value to the average of values A and B. The 2-bit replacement code is equal to 2 if the value of R3 is closest in value to the average of values A and C. The 2-bit replacement code is equal to 3 if the value of R3 is closest in value to the average of values B and C. The reconstruction sequence follows the replacement sequence. If the 2 bit code is 0, the value of pixel R3' is equal to the value of A. If the 2-bit code is equal to 1, the value of pixel R3' is equal to the average of the values of A and B. If the 2-bit code is equal to 2, the value of pixel R3' is equal to the average of the values of pixels A and C. If the 2-bit code is equal to 3, then the value of pixel R3' is equal to the average of the values of pixels B and C.

A 1-bit code is advantageous insofar as the permanent pixels are described with 1 bit more resolution. The 2-bit code is advantageous in that the replaced pixels are described with more resolution. Basing calculations on the values of only two lines, that is for example, $n-1$ and n, or n and $n+1$, is advantageous in minimizing the necessary line storage capacity. On the other hand, a more accurate replacement sequence might be generated if the value D is included in the calculations, but at the cost of requiring an additional line of video storage capacity. Paired pixel compression can be particularly effective for providing good horizontal and vertical resolution; in some cases, better than dithering and dedithering. On the other hand, the resolution of diagonal transitions is generally not as good as dithering and dedithering.

In accordance with an inventive arrangement, a number of data reduction and data restoration schemes will be available, including for example paired pixel compression and dithering and dedithering. Moreover, different dithering sequences involving different numbers of bits and different paired pixel compressions involving different number of bits will also be available. The particular data reduction and restoration scheme can be selected by the WSP μP in order to maximize resolution of the displayed video for each particular kind of video display format.

The wide screen processor also has the capability to control the vertical deflection to perform a vertical zoom function. The topology of the wide screen processor is such that both auxiliary and main channel horizontal raster mapping (interpolation) functions are independent of each other and independent of vertical zoom (which manipulates the vertical deflection). Because of this topology, the main channel may be expanded both horizontally and vertically to maintain a correct aspect ratio main channel zoom. However, unless the auxiliary channel interpolator settings are changed, the PIP (small picture) will zoom vertically but not horizontally. Therefore, the auxiliary channel interpolator can be made to perform larger expansions to maintain a correct image aspect ratio of the PIP small picture as the vertical is expanded.

A good example of this process occurs when the main channel is displaying 16×9 letterbox material, as explained in more detail below. Briefly, the main horizontal raster mapping is set to 1:1 (no expansion, no compression). The vertical is zoomed 33% (that is; expanded by 4/3) to eliminate the black bars associated with letterbox source material. The main channel image aspect ratio is now correct. The auxiliary channel nominal setting, for 4×3 source material with no vertical zoom, is 5/6. A different value for the expansion factor X is determined as follows:

$$X = (5/6)*(4/3) = 10/9$$

When the auxiliary channel interpolator 359 is set for 10/9, the correct small picture image aspect ratio is maintained and the objects inside the PIP appear without aspect ratio distortion.

It is a particular advantage of wide format display ratio televisions that letterbox signals can expanded to fill the wide format display ratio display screen, although it may be necessary to interpolate the signal to provide additional vertical resolution. In accordance with an aspect of the invention, an automatic letterbox detection circuit is provided, which automatically implements expansion of the 4×3 format display ratio signal which includes the 16×9 format display ratio letterbox display. The automatic letterbox detector is explained in detail in connection with FIGS. 45-49.

In order to increase the vertical height of the letterbox signal, the vertical scan rate of display video-is increased so that the black regions at the top and bottom of the picture are eliminated, or at least substantially reduced. The automatic letterbox detector is based on the assumption that the video signal will correspond generally to that shown in diagram form in FIG. 45. Regions A and C have no active video, or least video luma levels which are less than a predetermined luma threshold. Region B has active video, or at least video luma levels which are more than the predetermined luma threshold. The respective time intervals of regions A, B and C are a function of the letterbox format, which can range from 16×9 to 21×9. The time duration of regions A and C is approximately 20 lines each for 16×9 letterbox format. The letterbox detector examines the luma levels for regions A and/or C. If active video, or at least a minimum video luma level, is found in regions A and/or C, the letterbox detector provides an output signal, for example a logical 0, indicating a normal 4×3 format display ratio NTSC signal source. However, if video is detected in region B, but not in regions A and C, then the video is presumed to be a letterbox signal source. In this case, the output signal would be a logical 1.

Operation of the detector can be improved by hysteresis, as shown diagrammatically in FIG. 46. Once a letterbox signal has been detected, a minimum number of fields of nonletterbox signal must be detected before the display is changed to that necessary for normal 4×3 signals. Similarly, once a normal 4×3 signal has been detected, letterbox format must be detected for minimum number of fields before switching the display to a wide screen mode. A circuit 1000 for implementing this technique is shown in FIG. 47. The circuit 1000 comprises aline counter 1004, a field counter 1006 and a detector circuit 1002, in which the algorithm described above is performed to analyze the video signal.

In another inventive arrangement, letterbox detection is accomplished by calculating two gradients for each line in the video field. Four values are required to calculate the two gradients: maximum and minimum values of the current line, and maximum and minimum values of the previous line. The first gradient, designated the positive gradient, is formed by subtracting the minimum value of the previous line from the maximum value of the current line. The second gradient, designated the negative gradient, is formed by subtracting the minimum value of the current line from the maximum value of the previous line. Either of the gradients may have positive or negative values depending on scene content, but the negative values of both gradients may be ignored. This is because only one gradient may be negative at a time, and the magnitude of the gradient with the positive value will always be greater than or equal to the magnitude of the gradient with the negative value. This simplifies the circuitry by eliminating the need to calculate an absolute value of the gradients. If either gradient has a positive value which exceeds a programmable threshold, video is considered to be present on either the current line or on the previous line. These values can be used by a microprocessor to make a determination of whether or not the video source is in the letterbox format.

A circuit 1010 for implementing this method of letterbox detection is shown in block diagram form in FIG. 48. The circuit 1010 comprises a luma input filter, a line maximum (max) detector 1020, a line minimum (min) detector 1022, and an output section 1024. The luma input filter comprises finite impulse response (FIR) stages 1012 and 1014 as well as adders 1016 and 1018. The letterbox detection circuit 1010 operates on the digital luma data Y_IN from the wide screen processor. An input filter is utilized in order to improve noise performance and make detection more reliable. The filter is essentially two cascaded FIR stages, having a transfer function as follows:

$$H(z) = (\tfrac{1}{4})*(1+Z^{-1})*(1+Z^{-3}).$$

The output of each stage is truncated to eight bits (divided by two) to maintain a DC gain of one.

The line max detector 1020 includes two registers. The first register contains the maximum pixel value (max pix) at the current point in the line period. It is initialized at the beginning of every line period by a one clock wide pulse designated SOL (Start of Line) to a value of 80h. The value of 80h represents the minimum possible value for an eight bit number in two's complement format. The circuit is enabled by a signal, designated LTRBX EN, which goes high for approximately 70% of the active video line. The second register contains the maximum pixel value (max line) for the entire previous line, and is updated once per line period. Incoming luma data Y_IN is compared to the current maximum pixel value stored in the max pix register. If it exceeds the register value, the max pix register is updated on the next clock cycle. At the end of the video line, max pix will contain the maximum value over the entire portion of the line for which it was enabled. At the beginning of the next video line, the value of the max pix register is loaded into the max line register.

The line minimum detector 1022 works in an identical manner except that the min line register will contain the minimum pixel value for the previous line. The min pix value is initialized to a value of 7 Fh, which is the maximum possible pixel value for an eight bit number in the two's complement format.

The output section 1024 will take the max line register value and the min line register value, and store them in eight bit latches that are updated once per line. Two gradients are then calculated, namely the positive gradient and the negative gradient. On the first line in a field where either of these gradients is positive and greater than the-programmable threshold, an enable signal is generated which allows a first line register to be loaded with the current line count value. On every line where either of the gradients is positive and exceeds the programmable threshold, another enable, signal is generated which allows a last line register to be loaded with the current line count value. In this manner the last line register will contain the last line in the field where the threshold was exceeded. Both of these enable signals are only allowed to occur between lines 24 and 250 in each field. This avoids false detections based on closed captioning information and on VCR head switching transients. At the beginning of every field, the circuit is reinitialized, and the values in the first line and last line registers are loaded into respective letterbox end registers. The LTRBX__BEG and LTRBX__END signals mark the beginning and end respectively of a letterbox signal.

FIG. 49 illustrates an automatic letterbox detector as part of a vertical size control circuit 1030. The vertical size control circuit comprises a letterbox detector 1032, a vertical display control circuit 1034 and a 3-state output device 1036. Alternatively, the vertical blanking and vertical reset pulses can be transmitted as separate signals. In accordance with an inventive arrangement, the automatic letterbox detection circuit can automatically implement vertical zoom or expansion of the 4×3 format display ratio signal which includes the 16×9 format display ratio letterbox display. When the output signal VERTICAL SIZE ADJ becomes active, the vertical deflection height is increased by 4/3 by vertical size circuit 500 shown in FIG. 22, which enables the active video portion of the letterbox signal to fill the wide screen without image aspect ratio distortion. In yet another alternative, not illustrated in the drawings, the automatic letterbox detector may comprise a circuit for decoding a code word or signal carried by a letterbox signal source which identifies the signal as letterbox format.

The vertical display control circuit 1034 also controls which part of the overscanned raster will be displayed on the screen, a feature referred to as vertical panning. If the vertically overscanned video signal is not in letterbox format, the conventional display format picture can be zoomed, that is expanded, to simulate a wide screen format. In this case, however, the portions of the picture cropped by the 4/3 vertical overscan will contain active video information. It is necessary to vertically crop ⅓ of the picture. Absent further controls, the top 1/6 and bottom 11/6 will always be cropped. However, picture content may dictate that more of the top than the bottom of the picture is better cropped, or vice versa. If all action is at ground level, for example, a viewer might prefer to crop more sky. A vertical panning capacity enables a choice as to which part of the zoomed picture will be shown and which part will be cropped.

Vertical panning is explained with reference to FIGS. 23 and 24(a)–(c). The three level composite vertical blanking/reset signal is shown at the top of FIG. 23. These signals can be generated separately. The vertical blanking pulse begins when the signal L__COUNT is equal to VRT__BLNK0 and ends when L__COUNT is equal to VRT__BLNK1. The vertical reset pulse starts when L__COUNT is equal to VRT__PHASE and lasts for 10 horizontal lines. The L__COUNT is the output of a ten bit counter used to keep track of horizontal half lines with respect to the leading edge of VSYNC__MN. VSYNC__MN is the synchronized version of VDRV__MN, which is the vertical synchronizing component of the main signal provided to the gate array. VRT__BLNK0 and VERT__BLNK1 are provided by the microprocessor depending upon the vertical panning command. VRT__PHASE programs the relative phase of the VERT__RST output with respect to the rising edge of the vertical synchronizing component in the COMP__SYNC output. The COMP__SYNC output is the output of a J-K flip/flop. The state of the flip[/-flop is determined by decoding the outputs of L__COUNT and H__COUNT. H__COUNT is the horizontal position counter. The L__COUNT counter is used to segment the COMP__SYNC signal into three segments corresponding to the horizontal synchronizing pulse, the equalization pulse and the vertical synchronizing pulse.

A vertical deflection current for no overscan, which actually refers to the normal 6% overscan, is shown by dotted lines, as is the corresponding vertical blanking signal. The width of the vertical blanking pulse for no overscan is C. The vertical synchronizing pulse is in phase with the vertical reset pulse. A vertical deflection current for the overscan mode is shown by a solid line, as is the corresponding vertical blanking pulse, having pulse width D.

If the bottom overscan A is equal to the top overscan B, the display will be as shown in FIG. 24(a). If the vertical reset pulse is generated so as to lag the vertical synchronizing pulse, the bottom overscan A is less than the top overscan B, resulting in the display shown in FIG. 24(b). This is a downward vertical pan, displaying the lower part of the picture and blanking the top third of the picture. Conversely, if the vertical reset pulse is generated so as to lead the vertical synchronizing pulse, the bottom overscan A is more than the top overscan B, resulting in the display shown in FIG. 24(c). This is an upward vertical pan, displaying the upper part of the picture and blanking the bottom third of the picture. The relative phase of the vertical synchronizing signal and the vertical reset signal is controllable by the WSP $\mu$P 340, to enable vertical panning during overscan modes of operation. It will be appreciated that the overscanned raster remains vertically centered, or symmetric, on the picture tube or screen during vertical panning. It is the blanking interval which can be vertically moved, or positioned, asymmetrically with respect to the center of the raster, so as to blank more of the picture at the top than the bottom, or vice versa.

The wide screen television according to various inventive arrangements can expand and compress video in the horizontal direction by using adaptive interpolator filters. The interpolators for the luminance components of the main and auxiliary signals may be skew correction filters, of the kind described in U.S. Pat. No. 4,694,414—Christopher. A four point interpolator as described therein, for example, comprises a two point linear interpolator and an associated filter and multiplier connected in cascade to provide amplitude and phase compensation. In total, four adjacent data samples are used to calculate each interpolated point. The input signal is applied to the two-point linear interpolator. The delay imparted to the input is proportional to the value of a delay control signal (K). The amplitude and phase errors of the delayed signal are minimized by the application of a correction signal obtained by an additional filter and multiplier connected in cascade. This correction signal provides peaking which equalizes the frequency response of the two point linear interpolation filter for all values of (K). The original four point interpolator is optimized for use with signals having a pass band of fs/4, where fs is the data sample rate.

Alternatively, and in accordance with inventive arrangements, both channels can use what is termed a two stage interpolative so process. The frequency response of the original variable interpolation filter can be improved by using such a two stage process. This process is hereinafter referred to as a two stage interpolator. A two stage interpolator according to an inventive arrangement comprises a 2n+4 tap finite impulse response (FIR) filter with fixed coefficients and a four point variable interpolator, as is illustrated by FIG. 56-57. The FIR filter output is spatially located midway between the input pixel samples, as shown in FIG. 56. The output of the FIR filter is then combined by interleaving with the original data samples, which are delayed, to create an effective 2 fs sample rate. This is a valid assumption for frequencies in the pass band of the FIR filter. The result is that the effective pass band of the original four point interpolator is significantly increased.

The compensated variable interpolation filter of the prior art provides accurately interpolated samples as long as the frequency components of the signal are no greater than approximately one fourth the sample rate, ¼ fs. The two-stage approach can be used for signals having frequency components substantially greater than ¼ fs, as shown by the block diagram for a two stage interpolator 390 in FIG. 58. A signal DS_A of digital samples at a sampling rate fs is an input to a finite impulse response (FIR) filter, for example a fixed FIR filter 391. The finite impulse response filter 391 generates from the signal DS_A a second signal DS_B of digital samples which are also at the sampling rate fs, but which are temporally located between the values of the first signal DS_A, for example at the midpoint between each value. Signal DS_A is also an input to a delay circuit 392, which produces a signal DS_C of digital samples, identical to signal DS_A but time delayed by (N+1)/fs. The data streams DS_B and DS_C are combined by interleaving in multiplexer 393, resulting in a data stream of values DS_D at twice the sampling rate, 2 fs. Data stream DS_D is an input to a compensated variable interpolator 394.

In general terms, the fixed FIR filter is designed to accurately produce sample values corresponding to time locations exactly half-, way in between the incoming sample positions. These are then interleaved with delayed but otherwise unmodified samples, producing a data stream with a 2 fs sample rate. The FIR filter is most conveniently implemented using an even number of symmetrically weighted taps. An eight-tap filter, for example, having tap weights of:

−1/32, 5/64, −11/64, §, §, −11/64, 5/64, −1/32 will accurately interpolate signals having frequency components up to about 0.4 fs. Since the data rate is doubled to 2 fs by the interleaving, the signal being processed by the variable interpolator never contains frequency components higher than ¼ the sample rate.

An advantage of the two-stage interpolator is to allow accurate interpolations for signals with bandwidths approaching ½ the sample rate. Thus, the system is most appropriate for display modes requiring time expansion, such as zoom, where the object is to maintain as much of the original bandwidth as possible. This can be pertinent in a wide screen television, particularly in the auxiliary channel, where the auxiliary signal is initially sampled at a fairly low rate, for example 10 MHz. Preserving as much bandwidth as possible can be important.

A two stage interpolator 390' appropriate for a zoom application is shown in block diagram form in FIG. 59. Components in common with the interpolator 390 shown in FIG. 17 have the same reference numeral as do the designations of the data streams. The object of the two stage interpolator 390' is to zoom the incoming image horizontally by a factor of m, where m is greater than 2.0. Thus, if the data in and data out signals are occurring at the same sample rate of fIN, there needs to be m output samples generated for every input sample. The signal is stored in a FIFO line memory 395 at fIN rate, and a portion is then read out as data stream DS_A at a reduced rate of fs. The fs clock is composed of a subset of fIN clock pulses, and does not have a uniform period.

Data stream DS_B, corresponding to sample values half-way in between the existing samples of data stream DS_A are estimated using the fixed FIR filter 391, and are then interleaved with the delayed samples of data stream DA_C to form the double rate data stream DS_D. Data stream DS_D, having twice the original sample density, is then processed by the variable interpolator 394 to produce a sample value for each fIN period. The accumulator circuit, including latch 398 and summer 399 produces an output which increments by r=2/m each fIN clock period. The fractional part controls the variable interpolator by supplying the K value from latch 398. The integer carry output (CO) generates the 2 fs clock, through latch 397, for reading of the FIFO 395 and shifting data through the FIR filter 391, the delay circuit 392, the multiplexer 393 and the interpolator 394. Divider 396 provides the fs signal from the 2 fs signal.

In accordance with further aspects of the invention, interpolators can be implemented which have the advantage of providing the buffering of the auxiliary and main channel video without additional line memory. The main channel line memory therefore becomes a display memory as well. A requirement of existing variable interpolation filters is a need for two multiplications, as is apparent from consideration of the filter shown in FIG. 12 of U.S. Pat. No. 4,694,414. The first multiplication is by a factor C, a 2-bit number. The second multiplication is by a factor K. Factor K is a 5-bit number, allowing for the case where K=16/16. There are two possible ways to avoid the need for a 5-bit multiplication. First, multiply by 1-K, instead of multiplying by K; and, never choose K=0 as a display point. Alternatively, multiply by K; and, never choose K=1 as a display point.

A simplified multiplier for a 1/16 or 11/32 resolution interpolator is shown in FIG. 61. The multiplier allows a variable "a" to be multiplied by a 5 bit variable "b", where "b"=($b_4$, $b_3$, $b_2$, $b_1$, $b_0$). The term $b_0$ is the least significant bit (LSB) and the term $b_4$ is the most significant bit (MSB). The values of "b" will be limited to whole numbers between 0 and 16 inclusive, although a similar technique can be used to build more complicated multipliers. For example, a multiplier for whole numbers between 0 to 32 can be derived from the same principle. The conditional multiplier by 2 multiplies the output of the preceding adder by 2 when b=10000. The number "a" is an n-bit number for the illustrated embodiment. The conditional multiply by 2 function can be implemented, for example, by a shift register or a multiplexer.

The values of K and C can be put into a memory block and, dependent upon the speedup required, a counter can index the read pointer to call out the desired memory location and load K and C into the interpolator multipliers. It is very advantageous, for this reason, to encode the value of C into the value of K, such that a single 4-bit or 5-bit word can convey both K and C values. It will be appreciated that C=f(K). A table of appropriate K and C values is shown in FIG. 62, where K is a 5 bit number. A number of OR gates can be used in the configuration shown in FIG. 63 to directly determine the values of C. The values are shown in the table of FIG. 64.

Additional implementations are possible to achieve various function of C=f(K), as shown by the alternative decoder in FIG. 65. For example, with this decoding scheme, only a few gates can eliminate the need for an on chip look-up table or additional registers to hold the C values. Factor K can be more easily decoded using the circuit shown in FIG. 66.

Two stage interpolation as explained in connection with FIGS. 56–58 can be optimized to surpass 0.25 fs, where fs is the original sample frequency, in an alternative fashion to that explained in connection with FIG. 59. The frequency curves in FIG. 67 show that for all values of K=[0, $\frac{1}{8}$, 2/8...1], the deviation in frequency response at 0.25 fs, in terms of magnitude, is 0.5 dB. Visible artifacts can be expected to occur when the amplitude response of the various interpolation filters are more than 0.5 dB apart. Certain simulations suggest that visible artifacts can occur when the amplitude responses are more than 1.0 dB apart. Thus, the horizontal interpolator's individual response for selected values of K should form an envelope of responses such that for no frequency the response curves are more than 1.0 dB apart as shown in FIG. 67. The critical frequency at which artifacts can be expected to become visible is designated fc. As a practical matter, the cutoff frequency or divergence of the frequency response curves should be minimized as much as possible below fc.

In order to extend the frequency bandwidth of the interpolator according to another aspect of the invention, a 2n+4 tap compensation network can be provided, which will extend the value of fc for the overall horizontal interpolator. Moreover, such a compensation network can be implemented without adding an additional control variable, and therefore an additional degree of freedom.

The following compensation network for a linear interpolator can extend the critical frequency fc of the overall interpolator to 0.7×fs/2 or 0.35 fs, using the criteria of a 0.5 dB maximum allowed envelope. If the 1.0 dB criteria is used, then the curves diverge at fs=0.75×fs/2=0.375 fs. Furthermore, if the values of K=0, 1 are avoided in the design, such that they need not be chosen, the frequency bandwidth can be extended to even slightly beyond this fc. Moreover, the amount of peaking is controllable by choosing the value of C.

An eight point interpolator can be formed by a linear interpolator, and an eight tap FIR filter to provide amplitude and phase compensation. The overall interpolator can be described by:

$$C/2 - Z^{-}(C^{3/2}) + Z^{-2}(K+C) + Z^{-3}(1-K+C) -- Z^{-4} Z(3/2)(C) + (C/2)(Z^{-5}), \text{ for values of } K=[0, 1/16, 2/16, \ldots 1].$$

The relationship between K and C is shown in the table and graph of FIGS. 68 and 69. The set of curves evidence less than 1.5 dB ripple in the pass band. The critical frequency is at fc=0.7×fs/2 for this compensation network.

This aspect of the invention can be extended to an eight tap compensation network that provides additional useable bandwidth. The eight point interpolator can be formed by an eight tap FIR compensation filter and a two point linear interpolator, as shown in FIG. 70.

Three such compensation networks can be defined by the following:

(1)
$$-C/4 + Z^{-1}(\tfrac{3}{4})(C) + Z^{-2}(-3/2)(C) + Z^{-3}(K+C) + (1-K+C)Z^{-4} + Z^{-5}(-3/2)(C) + Z^{-6}(\tfrac{3}{4})(C) + Z^{-7}(-C/4);$$

(2)
$$-C/8 + Z^{-1}(\tfrac{3}{8})(C) + Z^{-2}(-12/8)(C) + Z^{-3}(K+C) + Z^{-4}(1-K+C) + Z^{-5}(-12/8)(C) + Z^{-6}(\tfrac{3}{8})(C) + Z^{-7}(-C/8); \text{ and,}$$

(3)
$$-C/8 + Z^{-1}(C/2) + Z^{-2}(-11/8)(C) + Z^{-3}(K+C) + Z^{-4}(1-K+C) + Z^{-5}(-11/8)(C) + Z^{-6}(C/2) + Z^{-7}(-C/8);$$

where K=[0, 1/16, 2/16, ... 1].

Each has its own distinct characteristic bandpass and advantages. Table of K and C values are not shown for the embodiment of FIG. 70. A value of C can be chosen which will yield the best set of curves for any particular compression or expansion as a whole.

The control signal sends a value of K to the linear interpolator. The value of K is decoded to yield a value of C for the compensation network multiplier. The FIR coefficients are the multipliers for C in the overall interpolator equations. For example, equation (1) above can have tap weights of [$-\tfrac{1}{4}$, $\tfrac{3}{4}$, $-3/2$, 1, 1, $-3/2$, $\tfrac{3}{4}$, $-\tfrac{1}{4}$].

This aspect of the invention can be extended generally to 2n tap FIR filters used as compensation networks, although it can become increasingly more difficult to use only two linear multipliers for calculating the linear interpolation and the associated compensation network. An alternative to a ten tap FIR filter, for example, is to provide an eight tap fixed FIR filter for taps $Z^{-1}$ to $Z^{-6}$, with taps $Z^0$ and $Z^{-7}$ dependent upon either the value of K or C. This is feasible because as K approaches the value of $\tfrac{1}{2}$ from either direction, that is K=0 or K=1, the frequency response needs added compensation to extend its band pass.

A block diagram for a specific circuit 1150 for implementing an eight tap, two stage filter using a four point interpolator is shown in FIG. 60. The video luminance signal to be expanded or compressed is an input to a horizontal delay line circuit 1152. The outputs of the delay line $Z^0$, $Z^{-1}$, $Z^{-2}$, $Z^{-3}$, $Z^{-4}$, $Z^{-5}$, $Z^{-6}$ and $Z^{-7}$ are inputs to an eight tap FIR filter 1154. The FIR filter generates at least one set of intermediate samples, designated I, for example between each of the real samples, designated Z. Results can sometimes be improved by using a plurality of FIR filters to generate a plurality of sets of intermediate points, although this significantly increases the complexity of the system. Such additional FIR filters, each of which requires a $Z^{-1}$ delay circuit, are shown by the multiple representations of FIR filter 1154 and $Z^{-1}$ delay circuit 1158. Outputs $Z^{-3}$, $Z^{-4}$ and $Z^{-5}$ are also inputs to the delay matching circuit 1156. The $I^0$ output is a direct input to a data selecting circuit 1160, as is a version $I^{-1}$ thereof delayed by circuit 1158. The outputs $Z-(3+n)$, $Z-(4+n)$ and $Z-(5+n)$ are also input to data selector circuit 1160. The inputs to data selector circuit 1160 are chosen for being the most symmetric with respect to the delay. The number of such inputs is one more than the number of points of the interpolator of the second stage, in this case, a four point interpolator 1162. The relative temporal position of the inputs to data selector 1160 is as follows:

$$Z-(3+n), I^0, Z-(4+n), I^{-1}, Z-(5+n).$$

Data selector circuit 1160 can be an array of multiplexers, for example, controlled by the MUX_SEL control signal. The selectable sets are indicated diagrammatically and are so arranged that each interpolation of the interpolator 1162 is based on two real points and two intermediate points. The outputs Y0, Y1, Y2 and Y3 of data selecting circuit 1160 correspond to one of the two selectable sets, and are the inputs to the four point interpolator 1162. Operation of the multiplexer control signal MUX_SEL will be a function of the K values, that is, MUX_SEL=f(K). The MUX_SEL selection depends upon which of the original points the intermediate point falls between. The output Yout of the interpolator 1162, which operates responsive to the K and C control values, is an expanded or compressed video luminance signal.

What is claimed is:

1. A display system, comprising:
   display means having a first format display ratio;
   means for mapping an output video signal onto said display means, said output video signal representing a picture which is dimensionally adjustable on said display means by operation of said mapping means;
   a plurality of video signals, each of said video signals having one of different format display ratios;
   means for processing at least two of said plurality of video signals, as necessary, to be compatible with one another and with said display means;
   switching means for coupling first and second ones of said video signals as inputs to said processing means;
   means for selecting, as said output video signal, between: one of said first and second ones of said video signals as processed, such that said picture represented by said output video signal is a single picture display; and, a combination of said first and second ones of said video signals as processed, such that said picture represented by said output video signal is a multiple picture display; and,
   means for controlling said mapping means, said processing means and said selecting means, to adjust each picture represented in said output video signal in format display ratio and image aspect ratio, during both said single and multiple picture displays.

2. The display system of claim 1, wherein said first format display ratio is a wide format display ratio.

3. The display system of claim 1, wherein one of said plurality of video signals has said first format display ratio of said display means.

4. The display system of claim 3, wherein said first format display ratio is a wide format display ratio.

5. The display system of claim 1, wherein one of said plurality of video signals has a format display ratio different from said first format display ratio of said display means.

6. The display system of claim 5, wherein said first format display ratio is a wide format display ratio.

7. The display system of claim 1, wherein two of said plurality of video signals have a format display ratio different from said first format display ratio of said display means.

8. The display system of claim 7, wherein said first format display ratio is a wide format display ratio.

9. The display system of claim 1, wherein one of said plurality of video signals has said first format display ratio of said display means and another one of said plurality of video signals has a format display ratio different from said first format display ratio of said display means.

10. The display system of claim 9, wherein said first format display ratio is a wide format display ratio.

11. The display system of claim 1, wherein said processing means comprises means for selectively cropping and means for selectively interpolating each of said first and second ones of said plurality of video signals.

12. The display system of claim 1, wherein said mapping means comprises means for generating a raster for a cathode ray tube.

13. The display system of claim 1, wherein said mapping means comprises means for generating an address matrix for a liquid crystal display.

14. The display system of claim 1, wherein said picture represented by said output video signal is independently adjustable in size in mutually perpendicular directions, said mapping means providing picture size adjustment in one of said directions and said processing means providing picture size adjustment in said other one of said directions.

15. The display system of claim 1, wherein said picture represented by said output video signal is independently adjustable in size in horizontal and vertical directions, said mapping means providing picture size adjustment in said vertical direction by controlling vertical deflection height and said processing means providing picture size adjustment in said horizontal direction by interpolation of video data samples.

16. The display system of claim 1, wherein said mapping means and said video display means are adapted for operation with noninterlaced video signals having a horizontal scanning rate of $nf_H$, where $f_H$ is a conventional horizontal scanning rate and n is an integer, and further comprising means for converting video signals having an interlaced format and a horizontal scanning rate of $f_H$ to video signals having a noninterlaced video format and said horizontal scanning rate of $nf_H$.

17. The display system of claim 1, further comprising second selecting means for selecting between said output video signal and an another input video signal which is coupled to said mapping means along a signal path which bypasses said processing means.

18. A display system, comprising:
- display means having a generally wide format display ratio;
- means for mapping an output video signal onto said display means, said output video signal representing a picture which is dimensionally adjustable on said display means by operation of said mapping means;
- a plurality of video signals, each of said video signals having either a generally conventional format display ratio or said generally wide format display ratio of said display means;
- first and second video processors, each including means for cropping and interpolating video signals, for respectively manipulating at least two of said plurality of video signals, as necessary;
- switching means for coupling first and second ones of said video signals as inputs to said video processors;
- means for selecting, as said output video signal, between: one of said first and second ones of said video signals as processed, such that said picture represented by said output video signal is a single picture display; and, a combination of said first and second ones of said video signals as processed, such that said picture represented by said output video signal is a multiple picture display; and,
- means for controlling said mapping means, said first and second video processors and said selecting means, to adjust each picture represented in said output video signal in format display ratio and image aspect ratio as necessary to selectively implement a plurality of multiple picture display formats on said video display means, some of said plurality of display formats being representative of various ones of said video signals having format display ratios which are different from one another and at least one of which is different from said first format display ratio of said video display means.

19. The display system of claim 18, wherein each picture in each of said plurality of display formats is substantially without image aspect ratio distortion.

20. The display system of claim 18, wherein said plurality of display formats comprises:
- a wide format display ratio main picture and an overlaid auxiliary picture having a conventional format display ratio; and,
- a conventional format display ratio main picture and an overlaid auxiliary picture having a wide format display ratio.

21. The display system of claim 20, wherein each picture in each of said plurality of display formats is substantially without image aspect ratio distortion.

* * * * *